United States Patent
Jimbo et al.

(10) Patent No.: US 8,288,995 B2
(45) Date of Patent: Oct. 16, 2012

(54) ASSEMBLED BATTERY CHARGING METHOD AND BATTERY CHARGING SYSTEM

(75) Inventors: Hiroyuki Jimbo, Aichi (JP); Harumi Murochi, Aichi (JP); Tomoya Kikuchi, Aichi (JP); Yasuyuki Yoshihara, Aichi (JP)

(73) Assignee: Panasonic Corporation, Osaka (JP)

( * ) Notice: Subject to any disclaimer, the term of this patent is extended or adjusted under 35 U.S.C. 154(b) by 273 days.

(21) Appl. No.: 12/918,697

(22) PCT Filed: Dec. 22, 2009

(86) PCT No.: PCT/JP2009/007121
§ 371 (c)(1),
(2), (4) Date: Aug. 20, 2010

(87) PCT Pub. No.: WO2010/079563
PCT Pub. Date: Jul. 15, 2010

(65) Prior Publication Data
US 2010/0327810 A1  Dec. 30, 2010

(30) Foreign Application Priority Data

Jan. 7, 2009 (JP) .................. 2009-001280
Oct. 29, 2009 (JP) .................. 2009-248724
Oct. 29, 2009 (JP) .................. 2009-248725

(51) Int. Cl.
*H02J 7/00* (2006.01)
(52) U.S. Cl. .................. 320/126; 320/137; 320/147
(58) Field of Classification Search .................. 320/126
See application file for complete search history.

(56) References Cited

U.S. PATENT DOCUMENTS

| | | | | |
|---|---|---|---|---|
| 5,206,579 A * | 4/1993 | Kawate et al. | ............. | 320/148 |
| 5,469,043 A * | 11/1995 | Cherng et al. | ............. | 320/161 |
| 5,508,598 A * | 4/1996 | Al-Abassy | ............. | 320/129 |
| 6,087,810 A * | 7/2000 | Yoshida | ............. | 320/139 |
| 6,107,782 A * | 8/2000 | Imai et al. | ............. | 320/150 |
| 6,133,712 A * | 10/2000 | Yeon | ............. | 320/145 |
| 6,211,651 B1 | 4/2001 | Nemoto | | |
| 6,373,224 B1 * | 4/2002 | Goto et al. | ............. | 320/119 |
| 6,515,456 B1 * | 2/2003 | Mixon | ............. | 320/160 |
| 7,202,635 B2 * | 4/2007 | Patino et al. | ............. | 320/160 |
| 7,692,410 B2 * | 4/2010 | Coleman et al. | ............. | 320/160 |
| 7,729,811 B1 * | 6/2010 | Weir et al. | ............. | 700/295 |

(Continued)

FOREIGN PATENT DOCUMENTS

| | | |
|---|---|---|
| JP | 55-053140 | 4/1980 |
| JP | 01-144330 | 6/1989 |
| JP | 01-248459 | 10/1989 |

(Continued)

*Primary Examiner* — Arun Williams
(74) *Attorney, Agent, or Firm* — McDermott Will & Emery LLP

(57) ABSTRACT

The present invention provides a battery charging system that includes: an assembled battery, in which a plurality of secondary batteries are connected in parallel using valve-regulated lead-acid batteries in which separators impregnated with electrolyte are arranged between mutually opposed plate-like positive electrodes and negative electrodes; and a plurality of charging units that are provided corresponding to the respective secondary batteries and that charge the corresponding secondary battery, respectively, wherein each of the charging units executes multistage constant-current charging in which constant-current charging is repeated a preset plurality of times for supplying current of a prescribed set current value to each corresponding secondary battery until the terminal voltage of the each corresponding secondary battery reaches a prescribed charging cutoff voltage, and also the set current value is reduced each time the constant-current charging is repeated.

24 Claims, 29 Drawing Sheets

U.S. PATENT DOCUMENTS

| | | | |
|---|---|---|---|
| 7,830,126 B2 * | 11/2010 | Kawahara et al. | 320/160 |
| 8,030,901 B2 * | 10/2011 | Nozu et al. | 320/139 |
| 2005/0271935 A1 * | 12/2005 | Fleming et al. | 429/160 |
| 2007/0111089 A1 * | 5/2007 | Swan | 429/160 |
| 2008/0054847 A1 * | 3/2008 | Elias et al. | 320/130 |
| 2010/0104927 A1 * | 4/2010 | Albright | 429/50 |
| 2011/0027653 A1 * | 2/2011 | Ho et al. | 429/225 |

FOREIGN PATENT DOCUMENTS

| | | |
|---|---|---|
| JP | 08-329988 | 12/1996 |
| JP | 11-089104 | 3/1999 |
| JP | 2000-333381 | 11/2000 |
| JP | 2005-073328 | 3/2005 |
| JP | 2006-064683 | 3/2006 |
| JP | 2006-114312 | 4/2006 |

* cited by examiner

FIG. 20

OUTSIDE AIR TEMPERATURE Ta: 25.6°C

| | SECONDARY BATTERY 1a | SECONDARY BATTERY 1b | SECONDARY BATTERY 1c |
|---|---|---|---|
| SURFACE TEMPERATURE Ts | 30.6°C | 35.8°C | 31.2°C |
| INTERNAL TEMPERATURE Ti | 31.6°C | 33.9°C | 32.3°C |
| DIFFERENCE Tis BETWEEN INTERNAL TEMPERATURE AND SURFACE TEMPERATURE | 1.0°C | -1.9°C | 1.1°C |
| DIFFERENCE Tsa BETWEEN OUTSIDE AIR TEMPERATURE AND SURFACE TEMPERATURE | 5.0°C | 10.2°C | 5.6°C |
| DIFFERENCE Tss BETWEEN SURFACE TEMPERATURE OF SECONDARY BATTERY 1a AND SURFACE TEMPERATURE OF EACH BATTERY | 0.0°C | 5.2°C | 0.6°C |

FIG. 21

| | SECONDARY BATTERY 1a | SECONDARY BATTERY 1b | SECONDARY BATTERY 1c |
|---|---|---|---|
| CHARGING CUTOFF VOLTAGE Ve | 14.4-0.03(Tr+1-25) | 14.4-0.03(Tr+5.2-1.9-25) | 14.4-0.03(Tr+0.6+1.1-25) |
| CHARGING CUTOFF VOLTAGE Ve AT Tr = 30.6°C | 14.202 | 14.133 | 14.181 |

FIG. 23

OUTSIDE AIR TEMPERATURE Ta: 26.3°C
POWER SUPPLY SURFACE TEMPERATURE Tp: 49.2°C

|  | SECONDARY BATTERY 1a | SECONDARY BATTERY 1b | SECONDARY BATTERY 1c |
|---|---|---|---|
| SURFACE TEMPERATURE Ts | 30.6°C | 31.3°C | 34.0°C |
| INTERNAL TEMPERATURE Ti | 31.6°C | 32.3°C | 31.5°C |
| DIFFERENCE Tis BETWEEN INTERNAL TEMPERATURE AND SURFACE TEMPERATURE | 1.0°C | 1.0°C | -2.5°C |
| DIFFERENCE Tsa BETWEEN OUTSIDE AIR TEMPERATURE AND SURFACE TEMPERATURE | 3.1°C | 4.2°C | 5.8°C |
| DIFFERENCE Tss BETWEEN SURFACE TEMPERATURE OF SECONDARY BATTERY 1a AND SURFACE TEMPERATURE OF EACH BATTERY | 0.0°C | 1.5°C | 4.0°C |

FIG. 24

| | SECONDARY BATTERY 1a | SECONDARY BATTERY 1b | SECONDARY BATTERY 1c |
|---|---|---|---|
| CHARGING CUTOFF VOLTAGE Ve | 14.4−0.03(Tr+1−25) | 14.4−0.03(Tr+1.5+1−25) | 14.4−0.03(Tr+4−2.5−25) |
| CHARGING CUTOFF VOLTAGE Ve AT Tr = 30.6°C | 14.202 | 14.157 | 14.187 |

ASSEMBLED BATTERY CHARGING METHOD AND BATTERY CHARGING SYSTEM

RELATED APPLICATIONS

This application is the U.S. National Phase under 35 U.S.C. §371 of International Application No. PCT/JP2009/007121, filed on Dec. 22, 2009, which in turn claims the benefit of Japanese Application No. 2009-001280, filed on Jan. 7, 2009, Japanese Application No. 2009-248724, filed on Oct. 29, 2009 and Japanese Application No. 2009-248725, filed on Oct. 29, 2009, the disclosures of which Applications are incorporated by reference herein.

TECHNICAL FIELD

The present invention relates to a method for charging an assembled battery composed of valve-regulated lead-acid batteries, and to a battery charging system for charging this type of assembled battery.

BACKGROUND ART

Amidst growing trends toward reducing carbon dioxide emissions and depletion of petroleum resources, there is a pressing need for the development of compact vehicles that use only lead-acid batteries and other secondary batteries as motive power sources. In particular, since lead-acid batteries are able to withstand use under harsh conditions and have a suitable weight, they are considered to be useful as, for example, motive power sources of transport vehicles.

Lead-acid batteries undergo electrolysis of water in the electrolyte (sulfuric acid) when overcharged. On the basis of this phenomenon, lead-acid batteries consist of fluid-type lead-acid batteries allow water that has been lost due to electrolysis of water to be replenished, and valve-regulated lead-acid batteries that eliminate the need to replenish water by returning electrolyzed oxygen gas as water. Fluid-type lead-acid batteries have typically been used in the past as motive power sources of forklifts and other transport vehicles due to their suitability to use under harsh conditions despite the need to replenish water.

The configuration of an assembled battery composed of a plurality of fluid-type lead-acid batteries consist of either connecting a plurality of fluid-type lead-acid batteries in series (for example, connecting 60 batteries in series), or connecting series circuits, in which a plurality of fluid-type lead-acid batteries are connected in series, in parallel (for example, connecting 10 series circuits, which connect 6 batteries in series, in parallel).

When considering charging the batteries using the configurations described above, the former configuration is only able to use charging apparatuses having high-voltage specifications for charging, and results in problems such as having to increase the voltage of commercial power supplies. On the other hand, in the case of the latter configuration, a commercial current can be used as is since a charging apparatus having low-voltage specifications can be used for charging. Since fluid-type lead-acid batteries demonstrate a decrease in efficiency when charged at a high hour rate in excess of a 2 hour rate, they use a comparatively small charging current. Thus, in a configuration in which a plurality of series circuits of fluid-type lead-acid batteries are connected in parallel as in the latter configuration, it is comparatively easy to supply charging current in parallel to each series circuit.

In addition, fluid-type lead-acid batteries are less susceptible to the effects of component resistance, and thus in the case of connecting a plurality of fluid-type lead-acid battery series circuits in parallel as in the latter configuration as well, differences in resistance values between each series circuit are small, thereby enabling differences in charging current values distributed to each circuit to be reduced to a negligible level. Consequently, in the case of fluid-type lead-acid batteries, there are few disadvantages to employing the latter configuration, making it more advantageous than the former configuration.

On the other hand, since reactive resistance, which has a greater effect than component resistance, is inversely proportional to electrolyte volume, valve-regulated lead-acid batteries, in which electrolyte volume is lower than that of fluid-type lead-acid batteries, are susceptible to increases in reactive resistance. Consequently, valve-regulated types are more susceptible to variations in internal resistance (component resistance+reactive resistance). Consequently, valve-regulated lead-acid batteries are less suitable for charging in parallel as compared with fluid-type lead-acid batteries.

Thus, fluid-type lead-acid batteries are able to demonstrate favorable charging by charging each fluid-type lead-acid battery in parallel by connecting a plurality of series circuits of fluid-type lead-acid batteries in parallel. Consequently, the use of a method consisting of connecting a charging apparatus to each series circuit while connected in parallel and controlling charging of each series circuit separately (see, for example, Patent Document 1) as a method for charging an assembled battery in which series circuits composed of fluid-type lead-acid batteries are connected in parallel has been avoided since, in addition to being complex, also has the risk of causing variations in charging capacity between each series circuit due to errors within the rated current range of each charging apparatus.

Patent Document 1: Japanese Patent Application Laid-open No. S55-053140

DISCLOSURE OF THE INVENTION

Recently, accompanying the growing number of opportunities for continuous use of forklifts and other transport vehicles at factories operating on a 24-hour basis, there has been a pressing demand for the use of valve-regulated lead-acid batteries not requiring water replenishment as motive power sources. When an assembled battery was configured in which series circuits connecting a plurality of valve-regulated lead-acid batteries in series were connected in parallel in order to respond to this demand, significant reductions in capacity were found to be observed due to repeated charging.

An object of the present invention is to propose an assembled battery charging method and a battery charging system that is able to reduce decreases in capacity when repeatedly charging an assembled battery using valve-regulated lead-acid batteries.

According to one aspect of the present invention, a battery charging system is provided with: an assembled battery, in which a plurality of secondary batteries are connected in parallel using valve-regulated lead-acid batteries in which separators impregnated with electrolyte are arranged between mutually opposed plate-like positive electrodes and negative electrodes; and a plurality of charging units that are provided corresponding to the respective secondary batteries and that charge the corresponding secondary battery, respectively, wherein each charging unit executes multistage constant-current charging in which constant-current charging is repeated a preset plurality of times for supplying current of a prescribed set current value to each corresponding secondary battery until the terminal voltage of the each corresponding secondary battery reaches a prescribed charging cutoff voltage, and also the set current value is reduced each time the constant-current charging is repeated.

In addition, according to another aspect of the present invention, an assembled battery charging method is a method for charging an assembled battery in which a plurality of secondary batteries are connected in parallel using valve-regulated lead-acid batteries in which separators impregnated with electrolyte are arranged between mutually opposed plate-like positive electrodes and negative electrodes, including: a charging step of executing, by a plurality of charging units provided corresponding to the respective secondary batteries, multistage constant-current charging by repeating constant-current charging a preset plurality of times for supplying current of a prescribed set current value to each corresponding secondary battery until the terminal voltage of the each corresponding secondary battery reaches a prescribed charging cutoff voltage, and also by reducing the set current value each time the constant-current charging is repeated.

According to this configuration, when carrying out multistage constant-current charging of an assembled battery in which a plurality of secondary batteries are connected in parallel using valve-regulated lead-acid batteries, constant-current charging, in which current of a prescribed set current value is supplied to each secondary battery until the terminal voltage thereof reaches a prescribed charging cutoff voltage, is repeated a plurality of times while reducing the charging current value each time. This being the case, during the initial constant-current charging when the charging current value is large, since increases in terminal voltage are faster for secondary batteries in which stratification has progressed (in which stratification is serious) than in secondary batteries in which stratification has not progressed (in which stratification is mild), constant-current charging is completed in a short period of time.

If initial constant-current charging during which the secondary batteries are charged at a large current value is completed in a short period of time, since the amount of electricity that charges secondary batteries in which stratification is serious due to constant-current charging at the start of multistage constant-current charging is lower than that of secondary batteries in which stratification is mild, in secondary batteries in which stratification is serious, the shortage is charged by constant-current charging in which the charging current value at the end of multistage constant-current charging is small. This being the case, since the period during which secondary batteries in which stratification is serious are charged at a small current value becomes longer than that of secondary batteries in which stratification is mild, the overall charging time by multistage constant-current charging becomes longer than secondary batteries in which stratification is mild. Thus, charging time of secondary batteries in which stratification is serious becomes longer, while charging time of secondary batteries in which stratification is mild becomes shorter.

Here, since stratification is eliminated the longer the charging time, even if there are mutual variations in the degree of stratification among a plurality of secondary batteries connected in parallel, as a result of charging time becoming longer and stratification being eliminated to a greater degree in secondary batteries in which stratification is serious than in those in which stratification is mild, variations in the degree of stratification are reduced. As a result of variations in stratification being reduced between each secondary battery, the degree of stratification in the valve-regulated lead-acid battery having the most serious stratification is reduced, thereby diminishing the risk of decreases in battery capacity attributable to stratification. This being the case, the risk of a decrease in battery capacity of the entire assembled battery is also diminished.

BRIEF DESCRIPTION OF THE DRAWINGS

FIG. 6 is a schematic diagram representing charging behavior for each secondary battery during n-stage constant-current charging, wherein FIG. 6A shows the behavior of secondary batteries in which the degree of stratification is mild, while

FIG. 20 is an explanatory drawing for explaining an example of temperature information stored in a storage unit.

FIG. 21 is an explanatory drawing showing an example of a charging cutoff voltage set corresponding to each secondary battery by a processing unit.

FIG. 23 is an explanatory drawing for explaining an example of temperature information stored in a storage unit.

FIG. 24 is an explanatory drawing showing an example of charging cutoff voltages set corresponding to each secondary battery by a processing unit.

BEST MODE FOR CARRYING OUT THE INVENTION

Figure 1:
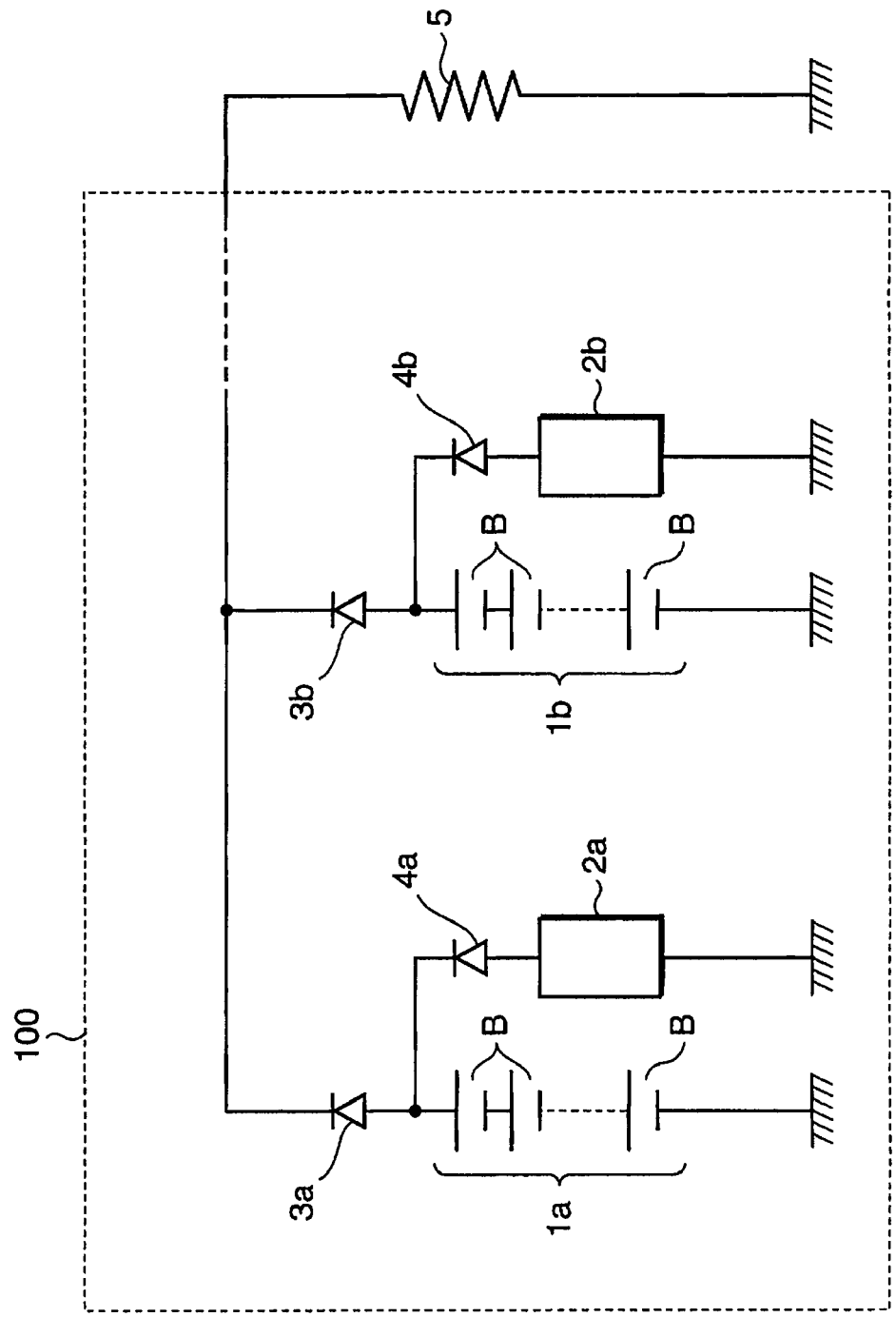
FIG. 1 is a block diagram representing a first embodiment of a battery charging system to which is applied the assembled battery charging method according to the present invention.

The following provides an explanation of a best mode for carrying out the present invention using the drawings. Furthermore, configurations indicated using the same reference numerals in each drawing indicate the same configurations, and explanations thereof are omitted.

The charging reaction of a lead-acid battery involves returning lead sulfate, which is a discharge product of the positive electrode and negative electrode, to lead dioxide or sponge lead, and sulfuric acid is formed at that time. The formed sulfuric acid temporarily raises the concentration of electrolyte in the vicinity of the active material. Since the highly concentrated electrolyte has a higher specific gravity than the surrounding electrolyte, it settles to the bottom of the battery due to gravity.

As a result, a phenomenon occurs by which the concentration of electrolyte in the bottom of the battery increases while the concentration of electrolyte at the top of the battery decreases (to be referred to as stratification). In electrolyte in which the concentration of sulfuric acid has increased due to stratification, a phenomenon typically referred to as sulfation, in which crystals of lead sulfate increase in size and accumulate, occurs and this decreases the charge acceptance of the active material. Allowing charging to be repeated randomly without being aware of this phenomenon shortens the life of the battery due to a sudden decrease in battery capacity.

As a result of conducting extensive studies, the inventors of the present invention found that the above-mentioned stratification changes each time corresponding to the ambient temperature at which a valve-regulated lead-acid battery is placed. More specifically, in the case the ambient temperature is low, stratification easily becomes prominent for the presumed reasons indicated below.

Namely, oxygen gas that has been generated from the positive electrode at the end of charging is replaced by electrolyte contained in pores of the positive electrode active material, and together with this electrolyte being pushed to the outside (towards the separator), a portion of the bubbles of oxygen gas released from the surface of the positive electrode rise within the separator impregnated with electrolyte and agitate the electrolyte, and this is thought to eliminate electrolyte stratification. Although the degree of occurrence of stratification is lower in valve-regulated lead-acid batteries as compared with fluid-type lead-acid batteries, since the amount of electrolyte agitated by oxygen gas is also low, it is difficult to obtain the effect of eliminating stratification as described above.

In addition, in the case the ambient temperature is low (such as below 10° C.), the amount of oxygen gas generated at the positive electrode at the end of charging is even lower in comparison with a high ambient temperature (such as above 40° C.), thereby preventing the stratification elimination effect described above from being adequately obtained. In valve-regulated lead-acid batteries for which a large number thereof are used in an assembled battery and which are required to be charged in a short period of time, even if stratification is extremely low in comparison with fluid-type lead-acid batteries, the effect on the entire assembled battery is considerable.

In addition, the effect of ambient temperature on battery deterioration was found to be greater for valve-regulated lead-acid batteries than for fluid-type lead-acid batteries. One reason for this is that, if charging is carried out under the same charging cutoff voltage conditions regardless of the temperature, the amount of time until the charging cutoff voltage is reached increases the higher the temperature, or in other words, the amount of electricity charged increases, and the electrolyte concentration increases as a result of overcharging progressing and causing a large amount of electrolysis of water. When the electrolyte increases in concentration, corrosion of the positive electrode grid is accelerated resulting in a short battery life. In valve-regulated lead-acid batteries, electrolyte concentration cannot be made uniform by water replenishment and charging as in fluid-type lead-acid batteries.

Consequently, in an assembled battery using a plurality of valve-regulated lead-acid batteries, the occurrence of variations in the temperature of each valve-regulated lead-acid battery also causes the occurrence of variations in the degree of stratification in each valve-regulated lead-acid battery. When each valve-regulated lead-acid battery is charged and discharged in the same manner with variations in the degree of stratification still present, sulfation occurs in those valve-regulated lead-acid batteries in which stratification has progressed, charge acceptance of the active material lowers and the battery capacity of those valve-regulated lead-acid batteries decreases. This being the case, battery capacity of the entire assembled battery also decreases.

In the case a plurality of valve-regulated lead-acid batteries are connected in series in particular, since the amount of electricity that can be charged and discharged of all the series circuit ends up being restricted by the valve-regulated lead-acid battery contained in the series circuit in which battery capacity has decreased the most, the decrease in battery capacity caused by variations in stratification becomes more prominent.

On the basis of these findings, the present invention enables the following effects to be obtained by employing the configuration described below in an assembled battery in which a plurality of valve-regulated lead-acid batteries (secondary batteries) are connected in parallel to a load, and particularly an assembled battery in which a plurality of series circuits (secondary batteries), in which a plurality of valve-regulated lead-acid batteries are connected in series, are connected in parallel to a load.

Firstly, the each secondary battery, having respectively different ambient temperatures, can be charged compatibly since charging apparatuses are respectively connected to each secondary battery (secondary battery). As was previously described, if a charging apparatus is connected to each secondary battery, there is the risk of variations in the amount of electricity charged for each secondary battery due to error within the rated current range of each charging apparatus. However, differing from the case of a fluid-type lead-acid battery, charging a secondary battery composed of a valve-regulated lead-acid battery with a single charging apparatus by connecting in parallel under conditions of having different ambient temperatures (namely, different degrees of stratification) results in variations in the amount of electricity charged being greater than variations in the accuracy of the charging apparatus.

Secondly, the following effects are obtained as a result of carrying out n-stage (multistage) constant-current charging by having each charging apparatus detect the charging voltage of each secondary battery.

First, although the concentration of sulfuric acid, which is used as electrolyte, increases the closer to the bottom of the battery due to stratification, since tabs (power collectors) of the positive electrode and negative electrode are provided at the top of the batteries, the charging reaction (reaction in which the sulfuric acid component returns to the electrolyte from lead sulfate, which is the discharge product) proceeds easier the closer to the top of the batteries (namely, sulfuric acid returns more easily to the electrolyte the closer to the top of the batteries). Although it is preferable to gradually return sulfuric acid from the top of the batteries to the electrolyte over time in order to reliably eliminate stratification, it is preferable to apply known n-stage constant-current charging (charging in which the current value is decreased in a stepwise manner at the point the charging voltage of the secondary batteries has increased to a prescribed control voltage) in order to shorten charging time.

However, carrying out n-stage constant-current charging by having each charging apparatus detect the charging voltage of each secondary battery extends the required charging time in those secondary batteries in which stratification is prominent. Namely, since the internal resistance is higher in those secondary batteries in which stratification is prominent than in other secondary batteries, the charging voltage quickly reaches the control value during the first stage of charging immediately after charging begins (when the current value is the highest), and on the other hand, the amount of electricity charged increases in the second stage or later in which the charging current gradually decreases, thereby resulting in prolongation of the required charging time those secondary batteries in comparison with other secondary batteries.

Although stratification is reliably eliminated in proportion to required charging time in secondary batteries in which stratification occurs easily in this manner, stratification is not adequately eliminated in secondary batteries resistant to the occurrence of stratification due to the short required charging times. Due to this difference, the degrees of stratification between each secondary battery are consequently aligned, and problems attributable to differences in the amount of electricity charged for each secondary battery (over-discharging and variations in charging capacity in the next round of charging) are diminished. This second effect is considered to be a unique effect demonstrated in valve-regulated lead-acid batteries having prominent stratification in the case of having applied the charging method according to the present invention.

The following provides an explanation of specific embodiments according to the present invention.

First Embodiment

The assembled battery charging method and battery charging system according to a first embodiment of the present invention use an assembled battery charging method in which, for example, series circuits (secondary batteries), in which a plurality of valve-regulated lead-acid batteries are connected in series, are connected in parallel to a load. In this charging method, charging apparatuses are respectively connected to each series circuit, each charging apparatus detects the charging voltage of each series circuit, and n-stage constant-current charging is carried out in which constant-current charging is repeated a plurality of times by changing the current value n−1 times (where n is an integer of 2 or more).

FIG. 1 is a block diagram representing a first embodiment of a battery charging system to which the assembled battery charging method according to the present invention is applied. A battery charging system 100 shown in FIG. 1 is provided with secondary batteries 1a and 1b, charging apparatuses (charging units) 2a and 2b, and diodes 3a, 3b, 4a and 4b. The secondary batteries 1a and 1b are respectively configured by connecting a plurality of valve-regulated lead-acid batteries B in series. A load 5 is connected outside the battery charging system 100.

The secondary battery 1a, which is composed of a plurality of valve-regulated lead-acid batteries, is connected in parallel to the secondary battery 1b composed in a similar manner to compose an assembled battery. The charging apparatuses 2a and 2b are separately connected to the secondary batteries 1a and 1b, respectively. During discharge, current from the secondary batteries 1a and 1b is supplied to the load 5 through the diodes 3a and 3b. During charging, current from the charging apparatuses 2a and 2b is supplied to the secondary batteries 1a and 1b through diodes 4a and 4b with the diodes 3a and 3b closed.

Figure 2:
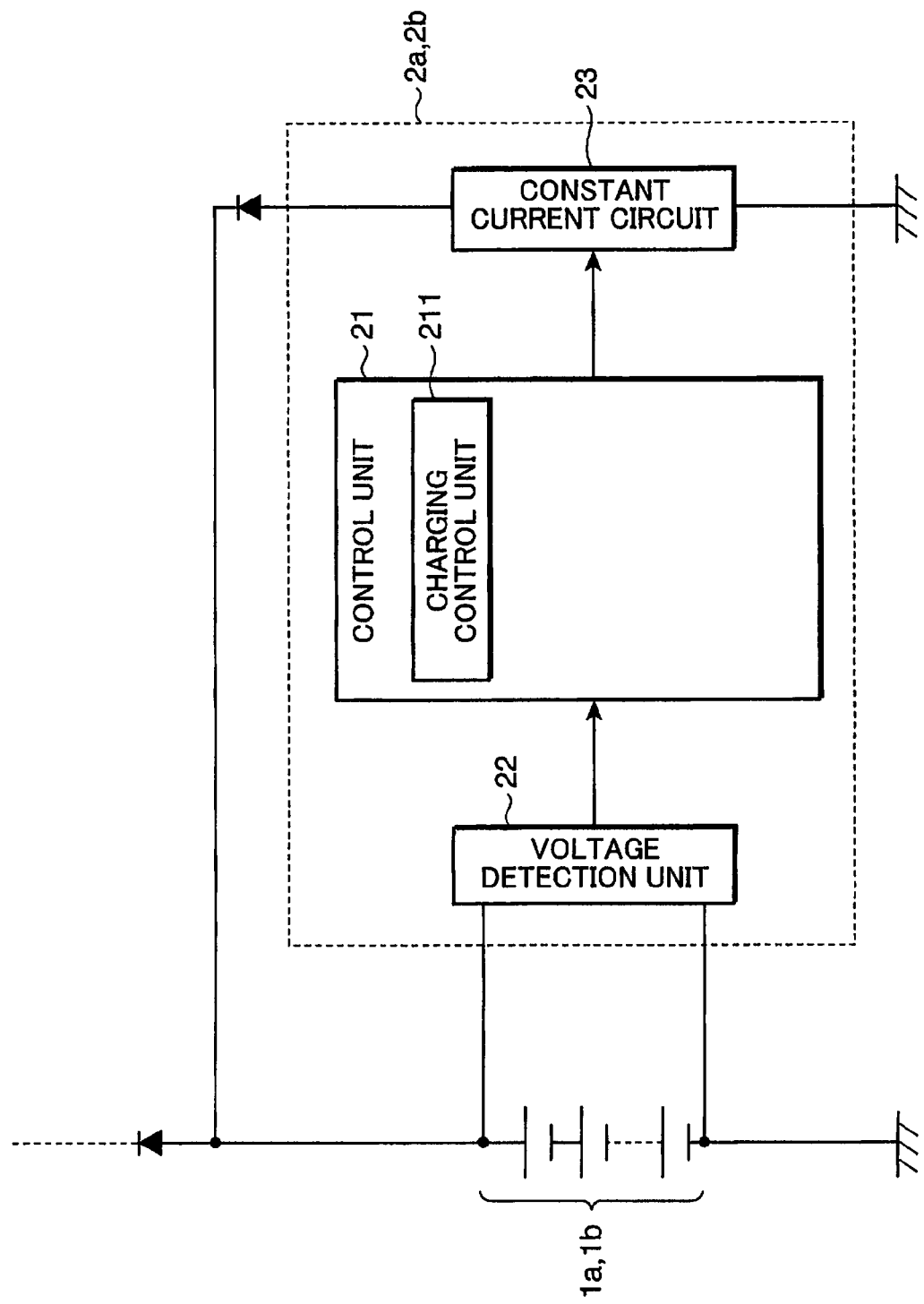
FIG. 2 is a block diagram showing an example of the configuration of the charging apparatuses shown in FIG. 1.

FIG. 2 is a block diagram showing an example of the configuration of the charging apparatuses 2a and 2b shown in FIG. 1. The charging apparatuses 2a and 2b shown in FIG. 2 are composed using, for example, an analog-digital converter, and are composed by being provided with a voltage detection unit 22 that detects terminal voltages of the secondary batteries 1a and 1b, a constant current circuit 23 that outputs charging current for charging the secondary batteries 1a and 1b, and a control unit 21. The constant current circuit 23 is composed of, for example, a switching power supply circuit.

The control unit 21 is composed by being provided with, for example, a central processing unit (CPU) that executes prescribed arithmetic processing, a read only memory (ROM) in which is stored a prescribed control program, a random access memory (RAM) that temporarily stores data, and peripheral circuits thereof. The control unit 21 functions as a charging control unit 211 by, for example, executing the control program stored in the ROM.

The charging control unit 211 controls output current values of the constant current circuit 23 corresponding to a terminal voltage V of the secondary batteries 1a and 1b detected by the voltage detection unit 22.

Furthermore, the number of secondary batteries connected in parallel and the number of charging apparatuses corresponding thereto may be a plurality thereof and are not limited to two. In addition, the secondary batteries 1a and 1b are not limited to those in which a plurality of valve-regulated lead-acid batteries B are connected in series, but rather may also be each composed of a single valve-regulated lead-acid battery B. The following explanation is provided using as an example the case in which the number of secondary batteries and the number of charging apparatuses is two.

Figure 3:
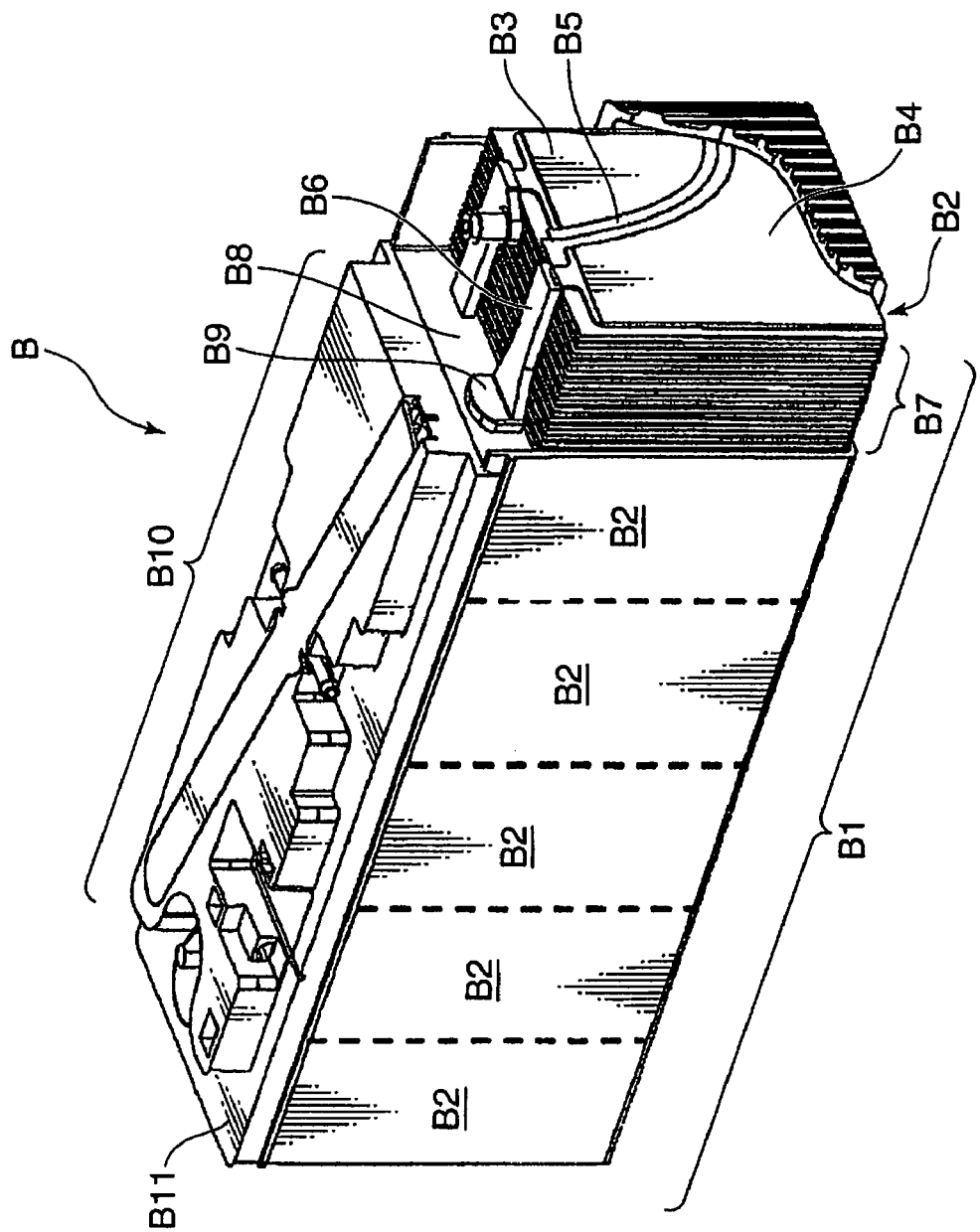
FIG. 3 is a block diagram showing an example of the valve-regulated lead-acid battery shown in FIG. 1.

FIG. 3 is a block diagram showing an example of the valve-regulated lead-acid battery B shown in FIG. 1, and is configured by connecting a plurality of cells B2 in the same direction in a battery case B1 made of polypropylene resin. In each cell B2, a positive electrode plate B3 and a negative electrode plate B4 are laminated with a separator B5 consisting mainly of glass fiber interposed there between. An electrode plate group B7, in which plates of the same polarity are integrated into a single unit with a strap B6, is housed in the battery case B1.

This battery plate group B7 is connected to a battery plate group of an adjacent cell by a connector B9 through a sidewall B8. Moreover, a cover B11, which has an exhaust structure B10 extending from each cell, is integrally welded to the top of the battery case B1 to compose the valve-regulated lead-acid battery B. In addition, the separator B5 is impregnated with electrolyte.

Figure 4:
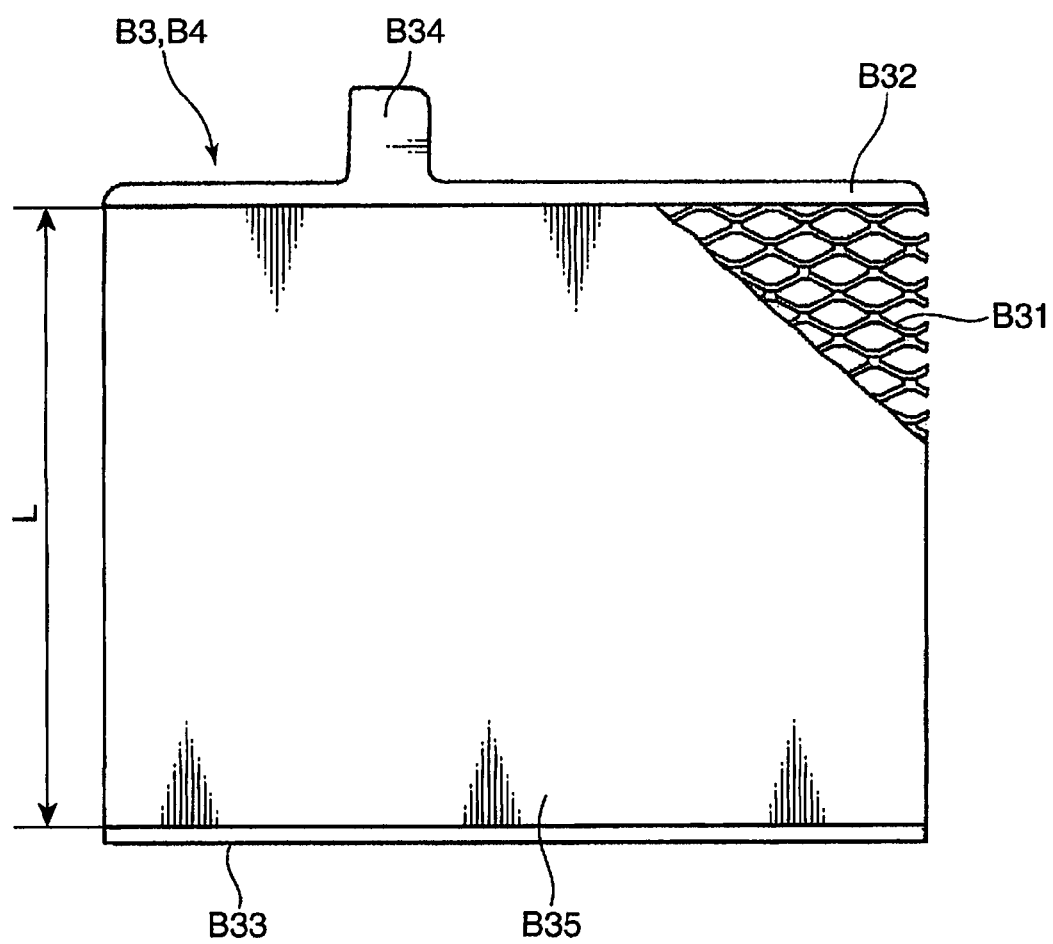
FIG. 4 is a block diagram showing an example of the positive electrode plate and negative electrode plate shown in FIG. 3.

FIG. 4 is a block diagram showing an example of the positive electrode plate B3 and the negative electrode plate B4 shown in FIG. 3. The positive electrode plate B3 and the negative electrode plate B4 have an upper frame B32 provided on the upper end of a lattice-like inner frame B31, a lower frame B33 provided on the lower end of the inner frame B31 and a power collector tab B34 connected to the upper frame B32, and an active material B35 is filled (coated) onto the inner frame B31 (and a portion of the upper frame B32 and lower frame B33), and a portion (most part) of the positive electrode plate B3 and the negative electrode plate B4 is covered with the active material B35.

In this case, if the positive electrode plate B3 and the negative electrode plate B4 are arranged so that the upper frame B32 and the lower frame B33 are in the vertical direction, a length L shown in FIG. 4 becomes the length in the direction of gravity of the portion covered by the active material B35. The length L of the positive electrode plate B3 and the negative electrode plate B4 is, for example, 100 to 200 mm.

Figure 5:
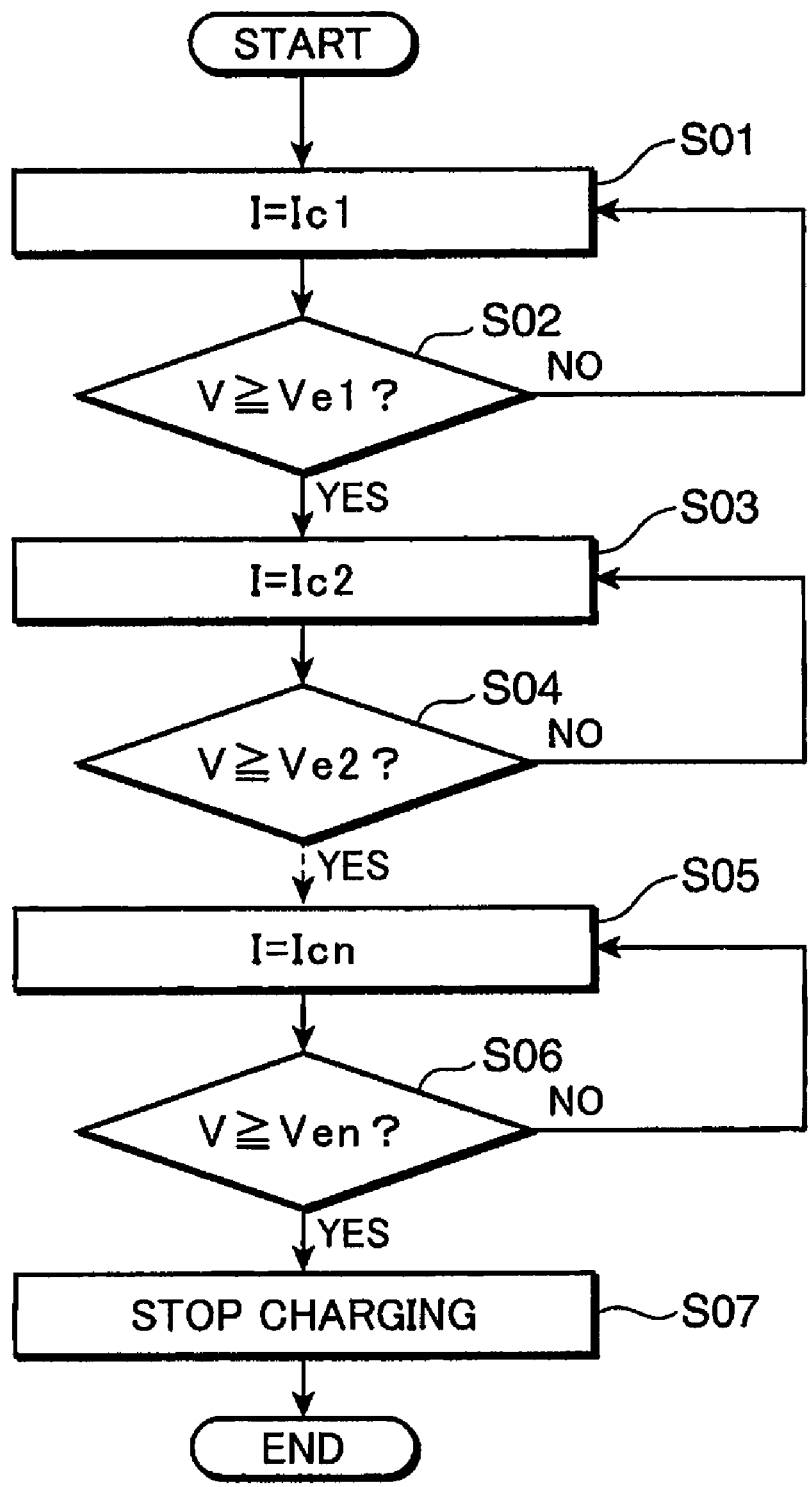
FIG. 5 is a flow chart showing an example of the operation of the charging apparatus shown in FIG. 1.

FIG. 5 is a flow chart showing an example of the operation of the charging apparatus $2a$ shown in FIG. 1, or in other words, an example of multistage (n-stage) constant-current charging according to this assembled battery charging method. Furthermore, since the charging apparatus $2b$ operates in the same manner and in parallel with the charging apparatus $2a$, an explanation thereof is omitted. The charging apparatuses $2a$ and $2b$ execute multistage constant-current charging as described below according to a control operation carried out by the charging control unit 211 respectively provided therein.

First, charging current values Ic1 to Icn, which are used in a plurality of times (n times) of constant-current charging, are stored in advance in, for example, ROM of the control unit 21 in the charging apparatuses $2a$ and $2b$. A charging current I is such that the first stage of constant-current charging has the largest current value (Ic1), the current value (Ic2) in the second stage of constant-current charging is smaller than the current value (Ic1), and the final nth stage of constant-current charging has the smallest current value (Icn).

First, in Step S01, the charging current I is set to a charging current value Ic1 by the charging apparatus $2a$, a first-stage constant-current charging C1 is begun, and the secondary battery $1a$ is charged. In Step S02, a judgment is made as to whether or not the voltage V of the secondary battery $1a$ connected to the charging apparatus $2a$ is equal to or greater than a first-stage charging cutoff voltage Ve1, and if V is less than Ve1 (NO in Step S02), first-stage constant-current charging C1 is continued, while if V is equal to or greater than Ve1 (YES in Step S02), first-stage constant-current charging C1 ends.

Next, in Step S03, the charging current I is set to a charging current value Ic2 by the charging apparatus $2a$, and a second-stage constant-current charging C2 is begun. In Step S04, a judgment is made as to whether or not the voltage V of the connected secondary battery $1a$ is equal to or greater than a second-stage charging cutoff voltage Ve2, and if the voltage V is less than Ve2 (NO in Step S04), the second-stage constant-current charging C2 is continued, while if the voltage V is equal to or greater than Ve2 (YES in Step S04), the second-stage constant-current charging C2 ends.

After repeating these steps, in Step S05, an nth-stage constant-current charging Cn is begun. In Step S06, a judgment is made as to whether or not the voltage V of the connected secondary battery $1a$ is equal to or greater than an nth-stage charging cutoff voltage Ven, and if the voltage V is less than Ven (NO in Step S06), the nth-stage constant-current charging Cn is continued, while if the voltage V is equal to or greater than Ven (YES in Step S06), operation proceeds to Step S07 and charging ends.

In the present invention, charging apparatuses connected to each series circuit individually carry out the above-mentioned n-stage constant-current charging. For example, the charging apparatus $2b$ executes multistage constant-current charging for the secondary battery $1b$ in the same manner as the above-mentioned Steps S01 to S07. The effects resulting from this will be subsequently described in detail. Furthermore, although the charging cutoff voltage of the same stage preferably does not differ for each series circuit, the charging cutoff voltages Ve1, Ve2 and Ven of each stage may be the same or different.

For example, if the charging cutoff voltages Ve1, Ve2 and Ven of each stage are set to the full charging voltages of secondary batteries $1a$ and $1b$, the secondary batteries $1a$ and $1b$ can be fully charged. In the subsequent explanation, the charging cutoff voltages Ve1 to Ven are collectively referred to as charging cutoff voltage Ve.

Here, lead-acid batteries have the property of being more susceptible to deterioration caused by the flow of charging current as the state of charge (SOC) increases. Consequently, if constant-current charging is carried out at the same current value from a state in which SOC is nearly 0% to a state of being nearly fully charged, it is necessary to carry out constant-current charging at a small current value so that the lead-acid battery is not deteriorated even at the end of charging when the battery is nearly fully charged.

However, by carrying out multistage constant-current charging while decreasing the charging current value in a stepwise manner in the manner of the charging apparatuses $2a$ and $2b$ shown in FIG. 1, the charging current value can be increased more when SOC at the start of charging is small than when SOC at the end of charging is large, thereby making it possible to shorten charging time.

Figure 6A:
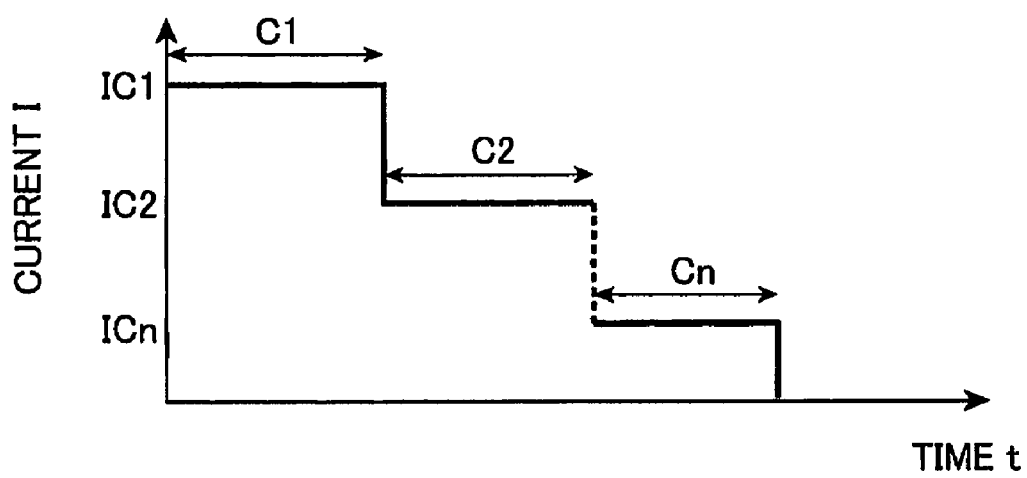
Figure 6B:
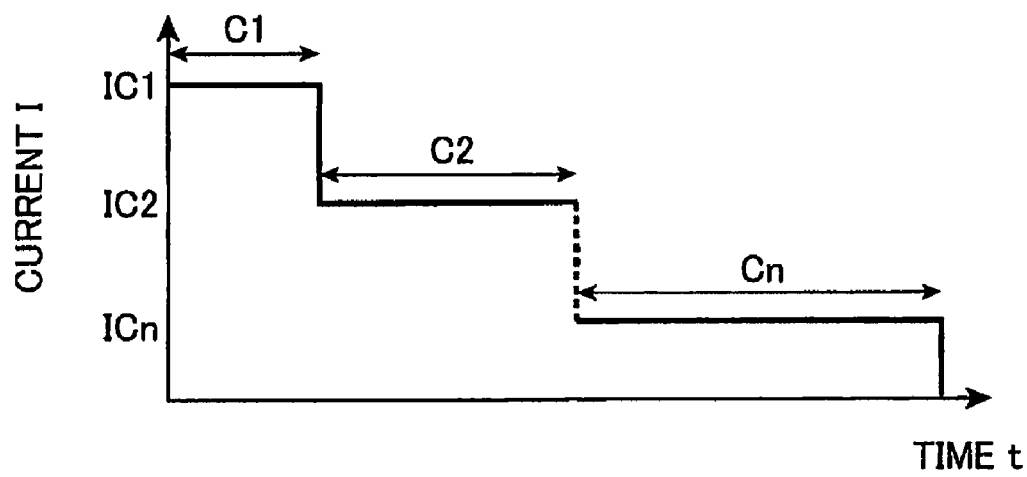
FIG. 6B shows the behavior of secondary batteries in which stratification is serious.

FIG. 6 is a schematic diagram representing charging behavior for each secondary battery during n-stage constant-current charging, FIG. 6A indicates the behavior of secondary batteries in which the degree of stratification is mild, while FIG. 6B shows the behavior of secondary batteries in which stratification is serious. Furthermore, charging current (I) is shown on the vertical axis and required charging time (t) is shown on the horizontal axis in FIGS. 6A and 6B.

Since the internal resistance of a secondary battery in which the degree of stratification is mild is comparatively small, voltage generated as a result of charging current flowing through the internal resistance is small. As a result, as shown in FIG. 6A, the required time (C1) to reach a control value (Ve1 in Step S02 of FIG. 5) is comparatively long during first-stage constant-current charging C1 during which the secondary battery is charged at a large charging current. In a secondary battery adequately charged (charged for a long period of time) by first-stage constant-current charging C1 in which the charging current value is set to a large value in this manner, the required time (duration of constant-current charging C2 to Cn) to reach a control value (Ve2 in Step S04 ... and Ven in Step S06 of FIG. 5) during the subsequent constant-current charging C2 to Cn from the second stage to the nth stage is comparatively short, and as a result, required charging time (C1+C2+ ... Cn−1+Cn) is shorter for secondary batteries in which the degree of stratification is mild than secondary batteries in which the degree of stratification is serious.

Since the internal resistance of a secondary battery in which the degree of stratification is serious is comparatively large, voltage generated as a result of charging current flowing through the internal resistance is large. As a result, as shown in FIG. 6B, the required time (C1) for the terminal voltage V of the secondary battery to reach a control value is comparatively short during first-stage constant-current charging C1 during which the secondary battery is charged at a large charging current. In a secondary battery not adequately charged during the first stage in this manner, since the effects of internal resistance decrease as the current value becomes smaller, the required time (duration of constant-current charging C2 to Cn) to reach a control value during constant-current charging C2 to Cn from the second stage to the nth stage is comparatively long, and as a result, required charging time (C1+C2+ ... Cn−1+Cn) is longer for secondary batteries in which the degree of stratification is serious than secondary batteries in which the degree of stratification is mild.

For example, in the case the battery charging system 100 shown in FIG. 1, in a form in which the secondary battery 1*b* is arranged at a location more easily exposed to outside air than the secondary battery 1*a* composed of a valve-regulated lead-acid battery, is assumed to be used as a motive power source of a transport vehicle in a cold weather climate, stratification becomes more serious in the secondary battery 1*b* since it reaches a lower temperature. Namely, the progress of execution of multi-stage constant-current charging for the secondary battery 1*a* corresponds to FIG. 6A, while the progress of execution of multi-stage constant-current charging for the secondary battery 1*b* corresponds to FIG. 6B, and the required charging time of the secondary battery 1*a* demonstrating mild stratification is shorter than that of the secondary battery 1*b* demonstrating serious stratification.

It is preferable to gradually return sulfuric acid from the top of the battery to the electrolyte over time in order to reliably eliminate stratification. In other words, according to the battery charging system 100, since charging time for the secondary battery 1*a* demonstrating mild stratification is shorter than the charging time for the secondary battery 1*b* demonstrating serious stratification, in contrast to the action of eliminating stratification being smaller for the secondary battery 1*a* demonstrating mild stratification than the secondary battery 1*b* demonstrating serious stratification, therefore making elimination of stratification of the secondary battery 1*a* inadequate, the action of eliminating stratification of the secondary battery 1*b* demonstrating serious stratification becomes large.

However, as a result thereof, the varying degrees of stratification between each of the secondary batteries are aligned, and as a result, problems attributable to differences in the amount of electricity charged for each secondary battery, such as over-discharging in secondary batteries in which the degree of stratification is serious, or variations in the amount of electricity charged for each secondary battery, which become larger as the number of charging and discharging cycles increases (leading to overworking of a specific secondary battery), are diminished. This second effect is considered to be an effect unique to valve-regulated lead-acid batteries demonstrating prominent stratification.

As a result of reducing variations in stratification between each secondary battery in this manner, even in the valve-regulated lead-acid battery in which stratification has progressed the most, the risk of a reduction in battery capacity caused by sulfation is diminished as a result of reducing the degree of stratification of that valve-regulated lead-acid battery. This being the case, the risk of a reduction in battery capacity of the entire assembled battery is also diminished.

Furthermore, in the case of multistage constant-current charging, since it possible to set a charging current that is close to the maximum limit but does not cause lead-acid battery deterioration corresponding to SOC in each stage of constant-current charging, charging time becomes shorter the greater the number of stages. However, the effects of eliminating stratification in valve-regulated lead-acid batteries end up decreasing as charging time shortens. Thus, the number of stages is preferably set to a number of stages (plurality of times) that suitably reduces charging current according to the balance between stratification elimination effects and charging time shortening effects.

Second Embodiment

An assembled battery charging method and battery charging system according to a second embodiment of the present invention sustains the final constant-current charging Cn for a prescribed supplemental charging time tn regardless of the terminal voltage V of a secondary battery.

During n-stage constant-current charging in which a current value is changed n times, since the nth constant current of the final nth stage of charging is frequently set to an extremely small value, changes in the voltage V of the secondary battery versus time are also extremely small. Consequently, there is increased susceptibility to the effects of noise in the vicinity of the charging cutoff voltage Ven, resulting in increased likelihood of error when determining the charging cutoff voltage according to voltage (determination of charging cutoff voltage by a comparison between the charging cutoff voltage Ven and the voltage V in Step S06 of FIG. 5). Therefore, by ending the finally executed constant-current charging Cn after sustaining for a prescribed supplemental charging time m regardless of the terminal voltage V of the secondary battery, there is no longer a need to execute a comparison between charging cutoff voltage Ven and voltage V, which requires a precise determination, and charging ending conditions can be determined comparatively accurately without being influenced by subtle changes in voltage, thereby reducing the risk of an erroneous determination of charging ending conditions.

Furthermore, although variations may also be considered in which supplemental charging time tn is set corresponding to the charging time required by constant-current charging C1 or the temperatures of the secondary batteries 1*a* and 1*b*, explanations of such variations will be provided in other embodiments to be subsequently described.

Next, an explanation is provided of the effect of making the height of a positive electrode and negative electrode in a valve-regulated lead-acid battery 100 mm or more. Furthermore, in the present description, the height of the positive electrode and negative electrode refers to the height of the portion of a power collector, which is one element of the electrode plate, that is filled with active material, or in other words, the length in the direction of gravity of the portion of the electrode plate covered with active material, and does not include the height dimension of those portions not filled with active material, such as the electrode tab and upper frame and lower frame coupled thereto. However, the filled thickness of the active material is defined to be larger than the thickness of the power collector, although this does not apply to the case in which all or a portion of the upper frame and lower frame is filled with the active material.

Figure 7:
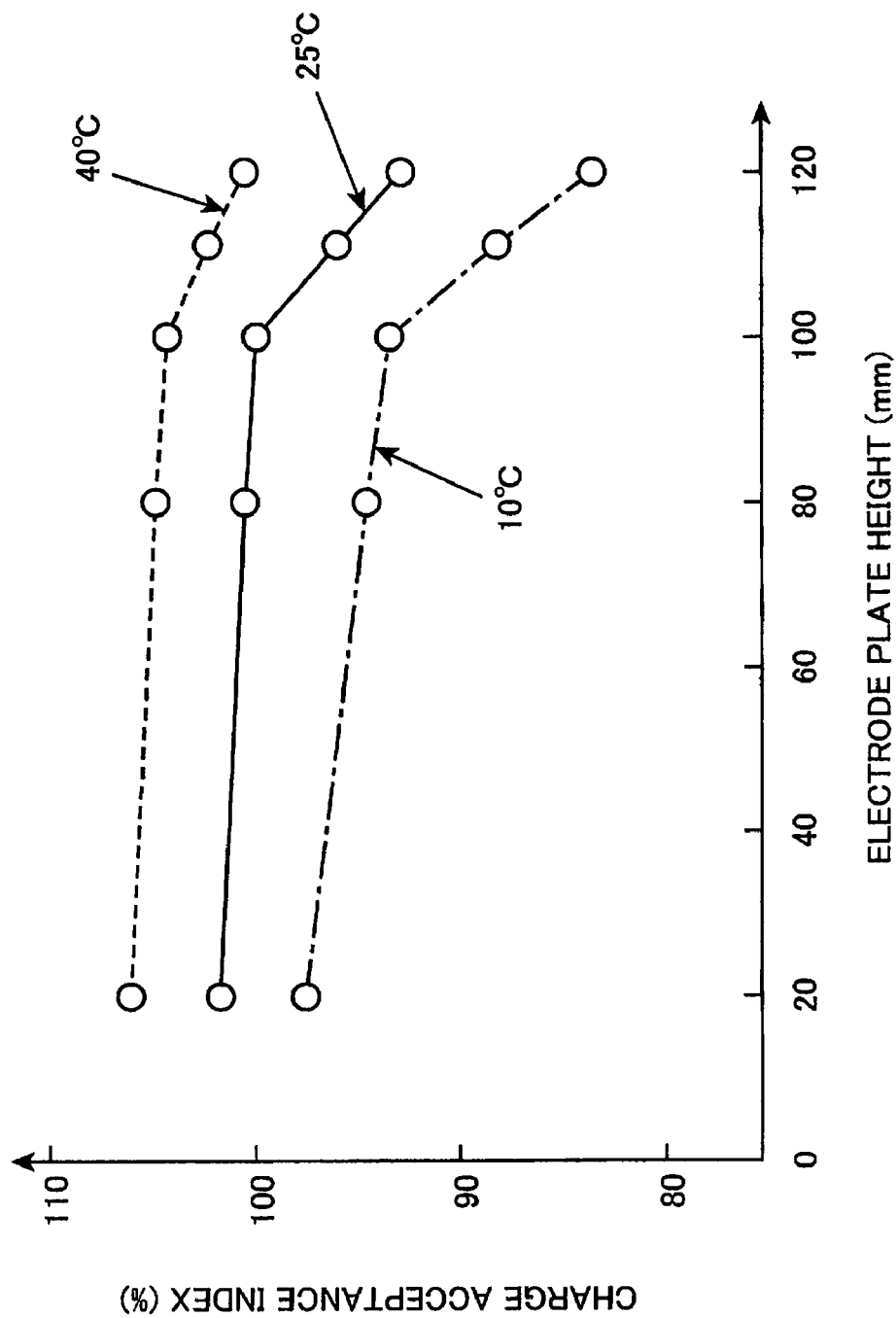
FIG. 7 is a drawing indicating the correlation between the height of positive and negative electrodes and charge acceptance in a valve-regulated lead-acid battery.

FIG. 7 is a drawing indicating the correlation between the height of positive and negative electrodes and charge acceptance in a valve-regulated lead-acid battery, with a charge acceptance index plotted as a percentage (%) on the vertical axis, and electrode plate height of a positive electrode and negative electrode of a valve-regulated lead-acid battery, or in other words, the height of the portion filled with active material (mm) in the present description, plotted on the horizontal axis.

Furthermore, in the present description, charge acceptance is represented with a charge acceptance index, and the respective definitions thereof are indicated below.

First, a secondary battery composed of valve-regulated lead-acid batteries having various electrode plate heights is continuously constant-current discharged to 1.75 V/cell at each battery temperature and at a 3 hour rate current followed by measurement of discharge capacity Qd of the secondary battery.

Subsequently, each secondary battery was charged in five stages at the temperature during discharge using a charging current of 0.8 CA for the first stage and sequentially switching the charging current from 0.8 CA to 0.6 CA, 0.4 CA, 0.2 CA and 0.1 CA when the cell voltage has reached 2.4 V/cell, and the amount of electricity charged Qc1 charged in the first stage of this five-stage charging was measured. Here, 1 CA=1 It. In addition, 1 It (battery capacity (Ah)/1 (h)) is the current value for which the residual capacity of the secondary battery reaches zero in 1 hour in the case of having discharged the nominal capacity of the secondary battery at the current value of 1 It.

The ratio (Qc1/Qd) of the amount of electricity charged Qc1 to the above-mentioned discharge capacity Qd was defined as charge acceptance η. Moreover, the charge acceptance η of a secondary battery composed of a valve-regulated lead-acid battery at a battery temperature of 25° C. and having an electrode plate height of 100 mm was defined as a reference charge acceptance η, and the percentage of the charge acceptance η of secondary batteries at various temperatures and electrode plate heights based on ηr was determined and plotted on the vertical axis of FIG. 7 as charge acceptance indices (%).

As has been described above, since the amount of electrolyte in a valve-regulated lead-acid battery is lower than that in a fluid-type lead-acid battery, it is difficult to alleviate differences in sulfuric acid concentration between the bottom and top of the battery (difficult to diffuse $SO_4^{2-}$). In particular, as shown in FIG. 7, in the case of a valve-regulated lead-acid battery in which the positive electrode and negative electrode height is 100 mm or more, it becomes particularly difficult to alleviate the difference in sulfuric acid concentration between the bottom and top of the battery, thereby resulting in prominent stratification and lowering charge acceptance particular in low-temperature environments. In addition, high-rate charging using large current values becomes difficult.

However, according to the battery charging system 100, in the case of assuming n-stage constant-current charging in the manner of using this high-rate charging for the first stage, as has been repeatedly stated previously, the required charging time of a valve-regulated lead-acid battery (secondary battery) placed in a low-temperature environment becomes longer than the required charging time of a valve-regulated lead-acid battery (secondary battery) placed in a high-temperature environment, and the degree of stratification for each secondary battery is aligned. The results shown in FIG. 7 indicate that, although stratification becomes more prominent in a valve-regulated lead-acid battery in which the heights of the positive electrode and negative electrode are 100 mm or more, stratification only occurs slightly in a valve-regulated lead-acid battery in which the electrode plate heights are less than 100 mm.

This being the case, in contrast to stratification only occurring slightly in an assembled battery in which a plurality of valve-regulated lead-acid batteries having electrode plate heights of less than 100 mm are combined, in an assembled battery in which valve-regulated lead-acid batteries having electrode plate heights of 100 mm or more are combined, as a result of prominent stratification in each valve-regulated lead-acid battery, variations in stratification between each of the valve-regulated lead-acid batteries increases. Thus, although it not always necessary to use a valve-regulated lead-acid battery having electrode plate heights of 100 mm or more for the valve-regulated lead-acid battery B in the battery charging system 100, the use of a valve-regulated lead-acid battery having electrode plate heights of 100 mm or more, for which variations in the degree of stratification are greater than in the case of using a valve-regulated lead-acid battery having electrode plate heights of less than 100 mm, enhances the advantage of the effect of reducing variations in stratification (normalizing the degree of stratification) in the battery charging system 100.

Third Embodiment

An assembled battery charging method and battery charging system according to a third embodiment of the present invention is an assembled battery charging method in which, for example, series circuits (secondary batteries), in which a plurality of valve-regulated lead-acid batteries are connected in series, are connected in parallel to a load, wherein charging apparatuses are respectively connected to each series circuit, each charging apparatus detects the charging voltage of each series circuit, and in carrying out n-stage constant-current charging in which constant-current charging is repeated a plurality of times by changing the current value n−1 times (where n is an integer of 2 or more), the amount of electricity charged in each series circuit is changed based on the thermal history of each series circuit.

According to this configuration, in consideration of the thermal history through which each series circuit has gone through (for example, the manner in which the assembled battery has been used and in what type of region, and ultimately to what degree of ambient temperature differences have occurred between each series circuit) being a factor that is difficult to predict, the amount of electricity applied in each series circuit is changed without relying only on the most recent ambient temperature. As a result, series circuits in which stratification is serious (series circuits that a long history in a low-temperature environment) can be accurately determined, and the degree of elimination of stratification between series circuits can be aligned to a greater extent by more actively promoting a stratification elimination reaction (oxygen gas generation reaction) by increasing the amount of electricity applied to the series circuits which is determined.

Furthermore, the amount of electricity charged refers to the amount of electricity actually accumulated in a secondary battery (valve-regulated lead-acid battery), while the amount of electricity applied refers to the amount of electricity supplied from a charging apparatus to a secondary battery.

Figure 8:
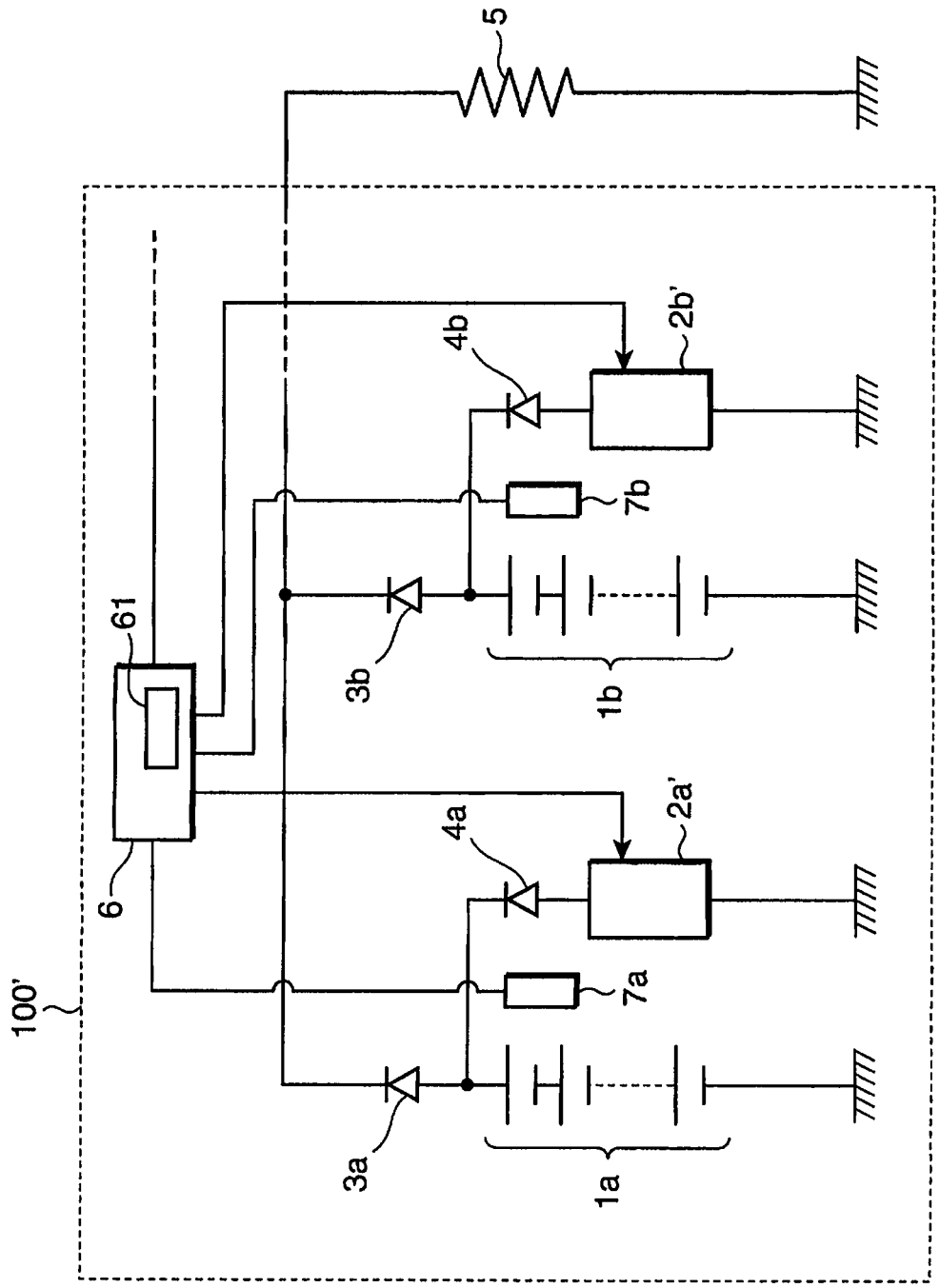
FIG. 8 is a block diagram showing an example of a battery charging system according to a third embodiment of the present invention.

The following provides an explanation of a specific embodiment according to the third embodiment. FIG. 8 is a block diagram showing an example of a battery charging system according to the third embodiment.

A battery charging system 100' shown in FIG. 8 differs from the battery charging system 100 shown in FIG. 1 in that the battery charging system 100' is further provided with a processing unit 6 (applied electricity amount setting unit), temperature measurement units 7a and 7b and a current detection unit to be described later, and the battery charging system 100' employs a different configuration for charging apparatuses 2a' and 2b'. Since other constituents are the same as those of the battery charging system 100 shown in FIG. 1, an explanation thereof is omitted, and the following explanation is only provided for those characteristic aspects of the present embodiment.

The temperature measurement units 7a and 7b are temperature sensors composed by using, for example, thermistors or thermocouples. The temperature measurement units 7a and 7b are, for example, arranged in close proximity to the secondary batteries 1a and 1b, and detect the temperatures of the secondary batteries 1a and 1b, respectively. Furthermore, the temperature measurement units 7a and 7b may detect the temperatures of the secondary batteries 1a and 1b directly by being arranged, for example, within the battery case B1 or on an outer wall of the valve-regulated lead-acid battery B, or may detect the temperatures of the secondary batteries 1a and 1b indirectly by detecting temperatures in the vicinity of the secondary batteries 1a and 1b.

The processing unit 6 is a control circuit composed by using, for example, a microcomputer. The processing unit 6 corresponds to an example of an applied electricity amount setting unit. The processing unit 6 respectively calculates integrated values of the temperatures of the secondary batteries 1a and 1b measured by the temperature measurement units 7a and 7b for a preset setting period as thermal history values Hr indicating thermal history, and sets the charging cutoff voltages Ve1 to Ven in the charging apparatuses 2a' and 2b' such that the total amount of electricity applied during multistage constant-current charging is decreased as the thermal history value Hr of a secondary battery be larger.

More specifically, the processing unit 6 is provided with a storage unit 61 (first storage unit) composed by, for example, ROM, and a table of thermal history values, which is a look up table (LUT) in which thermal history values Hr are correlated with charging cutoff voltages Ve1 to Ven, is stored in advance in the storage unit 61 such that the charging cutoff voltages Ve1 to Ven decrease as the thermal history value Hr (accumulated value, maximum value) be larger.

Here, since the total amount of electricity applied that is supplied to the secondary batteries 1a and 1b during multistage constant-current charging executed by the charging apparatuses 2a' and 2b' increases as the charging cutoff voltages Ve1 to Ven be higher, the charging cutoff voltages Ve1 to Ven serve as information indicating the total amount of electricity applied. In addition, thermal history values Hr are calculated from temperatures detected by the temperature measurement units 7a and 7b and correspond to information relating to each temperature.

Since the processing unit 6 sets the charging cutoff voltages Ve1 to Ven in the charging apparatuses 2a' and 2b' to smaller values as the thermal history value Hr be lager by referencing the table of thermal history values, the amount of electricity applied is controlled such that the total amount of electricity applied during multistage constant-current charging is decreased as the thermal history value Hr of a secondary battery be larger.

In addition, a time period until a new round of multistage constant-current charging is started after the previous round of multistage constant-current charging has been executed by the charging apparatuses 2a and 2b is set for above-mentioned setting period.

Figure 9:
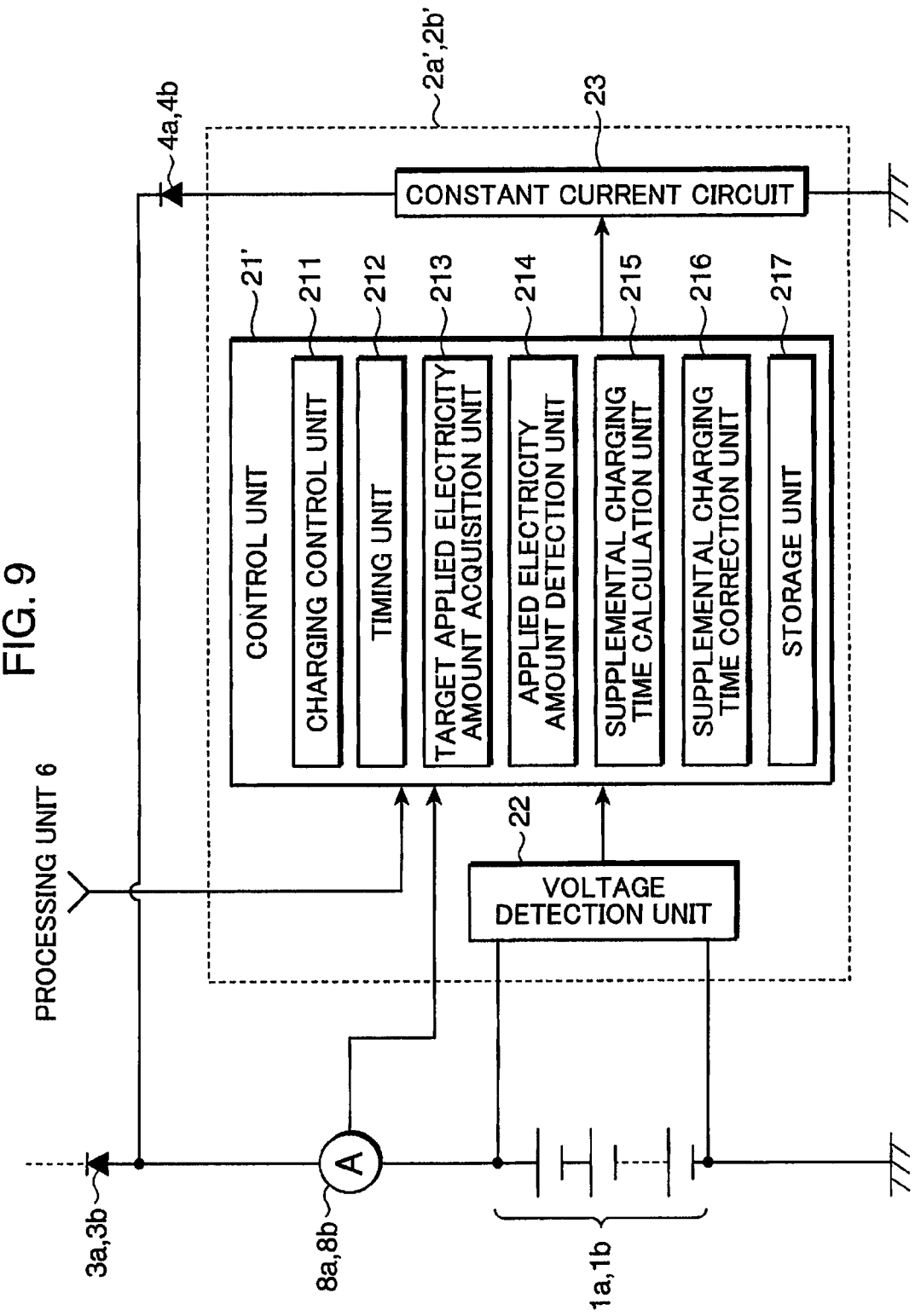
FIG. 9 is a block diagram showing an example of the configuration of the charging apparatus shown in FIG. 8.

FIG. 9 is a block diagram showing an example of the configuration of the charging apparatuses 2a' and 2b' shown in FIG. 8. The charging apparatuses 2a' and 2b' shown in FIG. 9 have a different configuration for a control unit 21' than that of the charging apparatuses 2a and 2b shown in FIG. 2. The control unit 21' differs from the control unit 21 shown in FIG. 2 in that it is further provided with a timing unit 212, a target applied electricity amount acquisition unit 213, an applied electricity amount detection unit 214, a supplemental charging time calculation unit 215, a supplemental charging time correction unit 216, and a storage unit 217 (second storage unit).

Furthermore, although the timing unit 212, the target applied electricity amount acquisition unit 213, the applied electricity amount detection unit 214, the supplemental charging time calculation unit 215, the supplemental charging time correction unit 216 and the storage unit 217 are respectively provided in the charging apparatuses 2a' and 2b' in the example indicated above, a configuration may be employed in which each of these units is provided in the processing unit 6, and supplemental charging times to corresponding to each secondary battery obtained by the supplemental charging time calculation unit 215 and the supplemental charging time correction unit 216 are transmitted from the processing unit 6 to the control unit 21' in the charging apparatuses 2a' and 2b'.

In addition, a charging control unit 211' differs from the charging control unit 211 shown in FIG. 2 in that multistage constant-current charging is executed based on the charging cutoff voltages Ve1 to Ven set by the processing unit 6, and in that the final constant-current charging Cn is sustained regardless of the terminal voltage V of a secondary battery for a supplemental charging time calculated by the supplemental charging time calculation unit 215 or further corrected by the supplemental charging time correction unit 216.

The timing unit 212 is composed using, for example, a timer circuit, and measures the duration tc1 of the initially executed constant-current charging C1 among the constant-current charging repeated during multistage constant-current charging.

The storage unit 217 is composed using, for example, ROM, and stores in advance a table of the amounts of electricity applied in the form of a look up table (LUT), in which duration tc1 is correlated with the amount of electricity applied Qf, which is the amount of electricity applied required to fully charge the secondary batteries 1a and 1b. Namely, since the duration tc1 of the constant-current charging C1 becomes longer as the SOC of the secondary batteries 1a and 1b at the start of execution of the first constant-current charging C1 be smaller, a correlation exists between the SOC of the secondary batteries 1a and 1b and the duration tc1. In addition, since the amount of electricity applied Qf increases as the SOC of the secondary batteries 1a and 1b be smaller, a correlation also exists between duration tc1 and the amount of electricity applied Qf. Therefore, the correlation between the duration tc1 and the amount of electricity applied Qf is measured experimentally, for example, and stored in advance in the storage unit 217 as a table of the amounts of electricity applied.

In addition, the storage unit 217 stores in advance a table of charging efficiency coefficients, which is a look up table (LUT) in which thermal history values Hr are correlated with charging efficiency coefficients Kc. The charging efficiency coefficient Kc is the inverse (Qc/Qr) of charging efficiency (Qr/Qc), which is the ratio of the amount of electricity charged Qr that is actually charged the secondary batteries 1a and 1b to the amount of electricity applied Qc that is supplied from the charging apparatuses 2a' and 2b' to the secondary batteries 1a and 1b.

The valve-regulated lead-acid battery B has the property of increased resistance to the occurrence of stratification and improved charging efficiency as the temperature becomes higher. Thus, as the thermal history value Hr becomes larger, charging efficiency improves and the charging efficiency coefficient Kc becomes smaller. This correlation between thermal history values Hr and charging efficiency coefficients Kc is preliminarily determined experimentally, for example, and stored in the storage unit 217 as a table of charging efficiency coefficients.

As a result of the control unit 21' executing a control program stored in ROM, for example, the control unit 21' functions as the target applied electricity amount acquisition unit 213, the applied electricity amount detection unit 214, the supplemental charging time calculation unit 215 and the supplemental charging time correction unit 216.

Furthermore, although not shown in FIG. 8, a current detection unit 8a is connected between the secondary battery 1a and the diode 3a, and a current detection unit 8b is connected between the secondary battery 1b and the diode 3b.

The current detection units 8a and 8b are composed using, for example, current detection elements such as shunt resistors or Hall elements for detecting current, or using an analog-digital converter and the like. The current detection units 8a and 8b detect current flowing to the secondary batteries 1a and 1b, and output a signal indicating the current value thereof to the control unit 21'.

The target applied electricity amount acquisition unit 213 references the storage unit 217, and acquires an amount of electricity applied, which is stored in correlation with the duration tc1 measured by the timing unit 212, as a target amount of electricity applied Qt, which is a target value of the amount of electricity applied that is to be supplied to the secondary batteries 1a and 1b during multistage constant-current charging.

The applied electricity amount detection unit 214 detects the amount of applied electricity Qc that is supplied to the secondary batteries 1a and 1b from the constant current circuit 23 by, for example, calculating the current values detected by the current detection units 8a and 8b for each unit time during the time from the start of multistage constant-current charging to prior to the start of the finally executed constant-current charging Cn.

The supplemental charging time correction unit 216 references the table of charging efficiency coefficients stored in the storage unit 217, and corrects the target amount of electricity applied Qt by multiplying the charging efficiency coefficient Kc, which is correlated with the thermal history value Hr calculated by the processing unit 6, by the target amount of electricity applied Qt acquired by the target applied electricity amount acquisition unit 213.

Here, since the thermal history values Hr and the charging efficiency coefficients Kc are correlated in the table of charging efficiency coefficients such that the charging efficiency coefficients Kc become smaller as the thermal history values Hr become larger, the amount of applied electricity is corrected such that the target amount of electricity applied Qt becomes smaller as thermal history values Hr become larger. When the target amount of electricity applied Qt becomes smaller, since the supplemental charging time tn calculated by the supplemental charging time calculation unit 215 becomes smaller as will be described later, the supplemental charging time correction unit 216 carries out correction such that the supplemental charging time tn ultimately becomes shorter as the thermal history value Hr becomes larger by correcting the target amount of electricity applied Qt. Furthermore, the supplemental charging time correction unit 216 is not limited to this example of correcting the target amount of electricity applied Qt, but rather may also directly correct the supplemental charging time tn calculated by the charging time calculation unit 215.

The charging time calculation unit 215 calculates the supplemental charging time tn using the following formula (1) based on the target amount of electricity applied Qt either acquired by the target applied electricity amount acquisition unit 213 or corrected by the supplemental charging time correction unit 216, the amount of electricity applied Qc detected by the applied electricity amount detection unit 214, and the charging current value (set constant current value) Icn in the finally executed constant-current charging Cn.

$$\text{Supplemental charging time } tn = (Qt - Qc)/Icn \tag{1}$$

Figure 10:
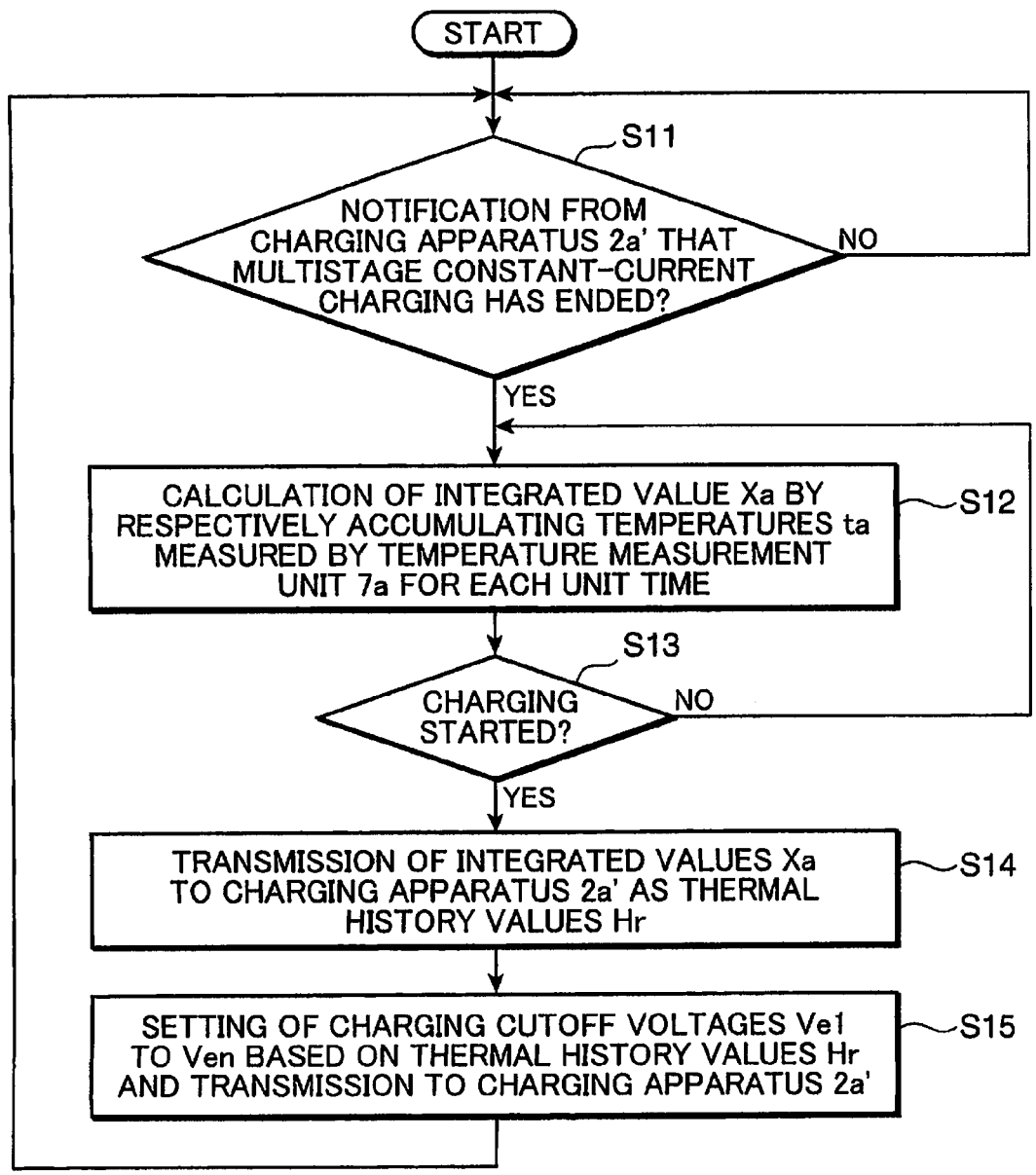
FIG. 10 is a flow chart showing an example of an operation for calculating thermal history values by the processing unit shown in FIG. 8.

Next, an explanation is provided of the operation of the battery charging system 100' configured in the manner described above. FIG. 10 is a flow chart showing an example of an operation for calculating thermal history values Hr for the secondary battery 1a by the processing unit 6 shown in FIG. 8. First, the processing unit 6 waits until there is a notification that multistage constant-current charging has ended from the charging apparatus 2a' (NO in Step S11), and when that notification is received (YES in Step S11), operation proceeds to Step S12 and the processing unit 6 begins calculation of integrated value Xa.

In Step S12, the processing unit 6 calculates the integrated value Xa by respectively accumulating temperatures to measured by the temperature measurement unit 7a for each unit time (Step S12). The processing unit 6 than continues to accumulated the integrated values Xa until a new round of charging is started by the charging apparatus 2a' (NO in Step S13). When charging is started (YES in Step S13), the integrated values Xa accumulated thus far are transmitted to the charging apparatus 2a' as thermal history values Hr (Step S14).

Here, since the valve-regulated lead-acid battery B is thought to be more susceptible to the occurrence of stratification as the temperature becomes lower, the thermal history values Hr can be used as indicators that represent the degree of stratification of the secondary battery 1a. In other words, stratification is considered to progress the smaller the thermal history value Hr.

Moreover, the processing unit 6 then references the table of thermal history values, acquires the charging cutoff voltages Ve1 to Ven stored in correlation with the thermal history values Hr, and transmits those voltages to the charging apparatus 2a' (Step S15).

Figure 11:
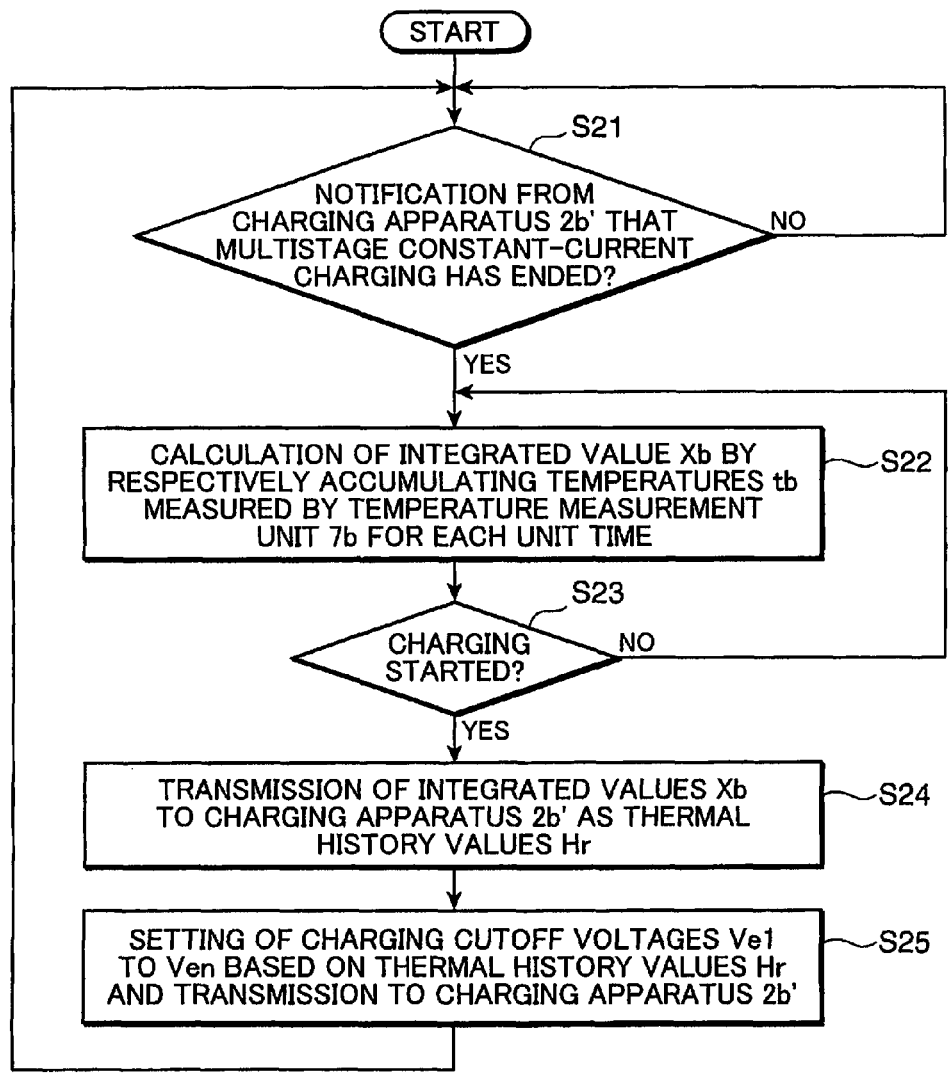
FIG. 11 is a flow chart showing an example of an operation for calculating thermal history values by the processing unit shown in FIG. 8.

On the other hand, the processing unit 6 executes Steps S21 to S25 shown in FIG. 11 in parallel with the Steps S11 to S15, executes the same processing as Steps S11 to S15 for the secondary battery 1b and the charging apparatus 2b', and transmits the thermal history values Hr and charging cutoff voltages Ve1 to Ven corresponding to the temperature of the secondary battery 1b to the charging apparatus 2b'.

Furthermore, in the case thermal history values Hr have not been calculated at the star of charging (YES in Step 13 and Step S23) as a result of, for example, not even one round of multistage constant-current charging having been executed, the processing unit 6 may transmit preset standard thermal history values Hr and charging cutoff voltages Ve1 to Ven to the charging apparatuses 2a' and 2b'.

As has been described above, as a result of the processing of Steps S11 to S15 and Steps S21 to S25, the processing unit 6 is able to control the amounts of electricity applied by the charging apparatuses 2a' and 2b' such that the total amount of electricity applied during multistage constant-current charging is decreased as the thermal history value Hr of a secondary battery be larger.

In addition, according to the battery charging system 100', after having executed multistage constant-current charging in the same manner as the battery charging system 100, variations in the degree of stratification between each secondary battery are reduced. Thus, if thermal history values Hr were tentatively calculated by cumulatively accumulating temperatures unrelated to the execution status of multistage constant-current charging, thermal history values Hr would be calculated that include temperature conditions during the period in which variations in stratification had already been eliminated by execution of multistage constant-current charging, thereby resulting in the risk of the thermal history values Hr not accurately reflecting the degree of stratification.

However, since the processing unit 6 calculates the thermal history values Hr during a setting period from the end of the previous round of multistage constant-current charging to the start of the next round of multistage constant-current charging in Steps S11 to S14 and Steps S21 to S24, effects of stratification thought to have been eliminated by the previous round of multistage constant-current charging are excluded from the thermal history values Hr, thereby making it possible to improve the accuracy at which the degree of stratification is reflected in the thermal history values Hr.

Furthermore, the setting period is not limited to that from the end of the previous round of multistage constant-current charging to the start of the next round of multistage constant-current charging, but rather may also be, for example, a preliminarily set fixed period.

Figure 12:
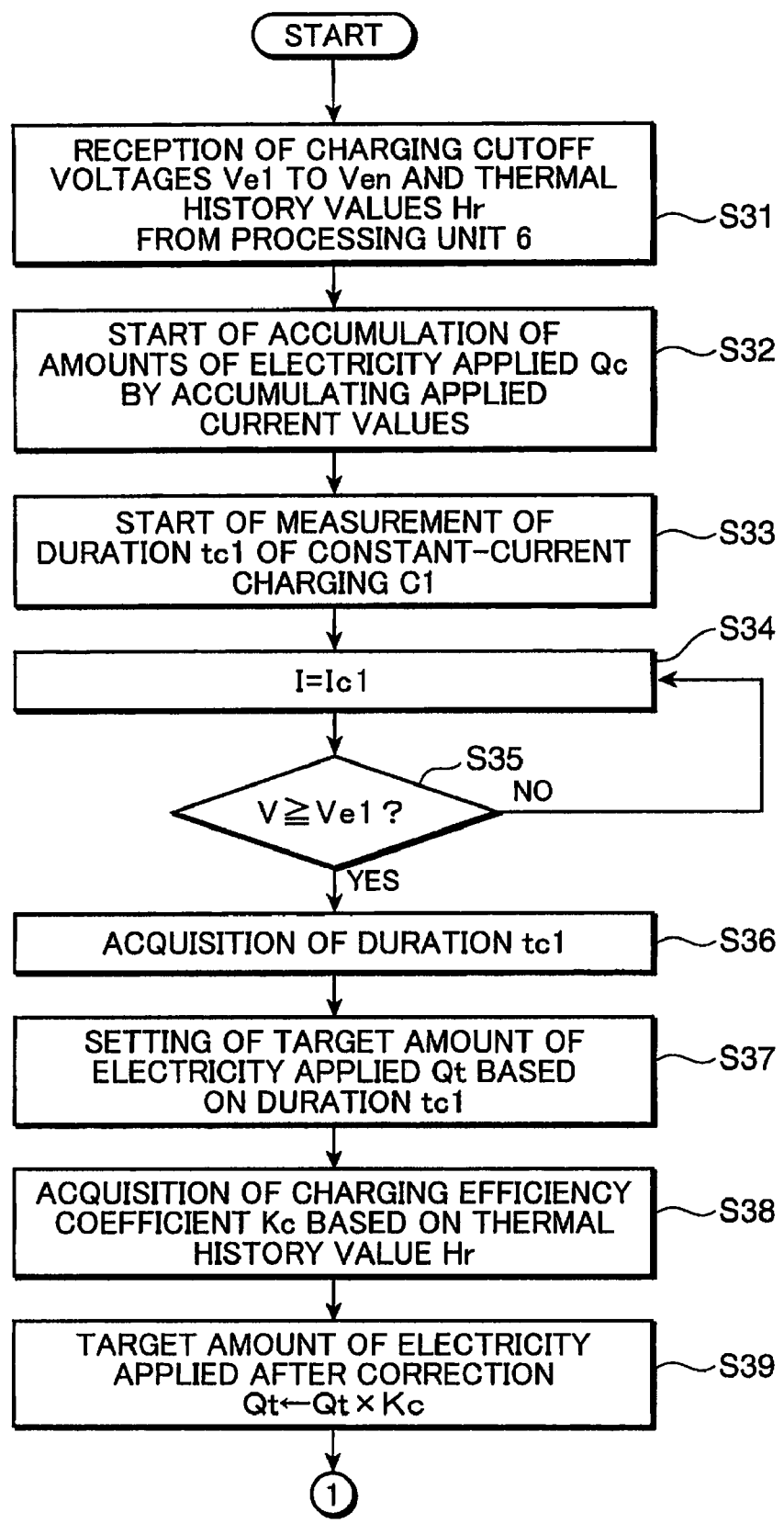
FIG. 12 is a flow chart showing an example of the operation of the charging apparatus shown in FIG. 9.
Figure 13:
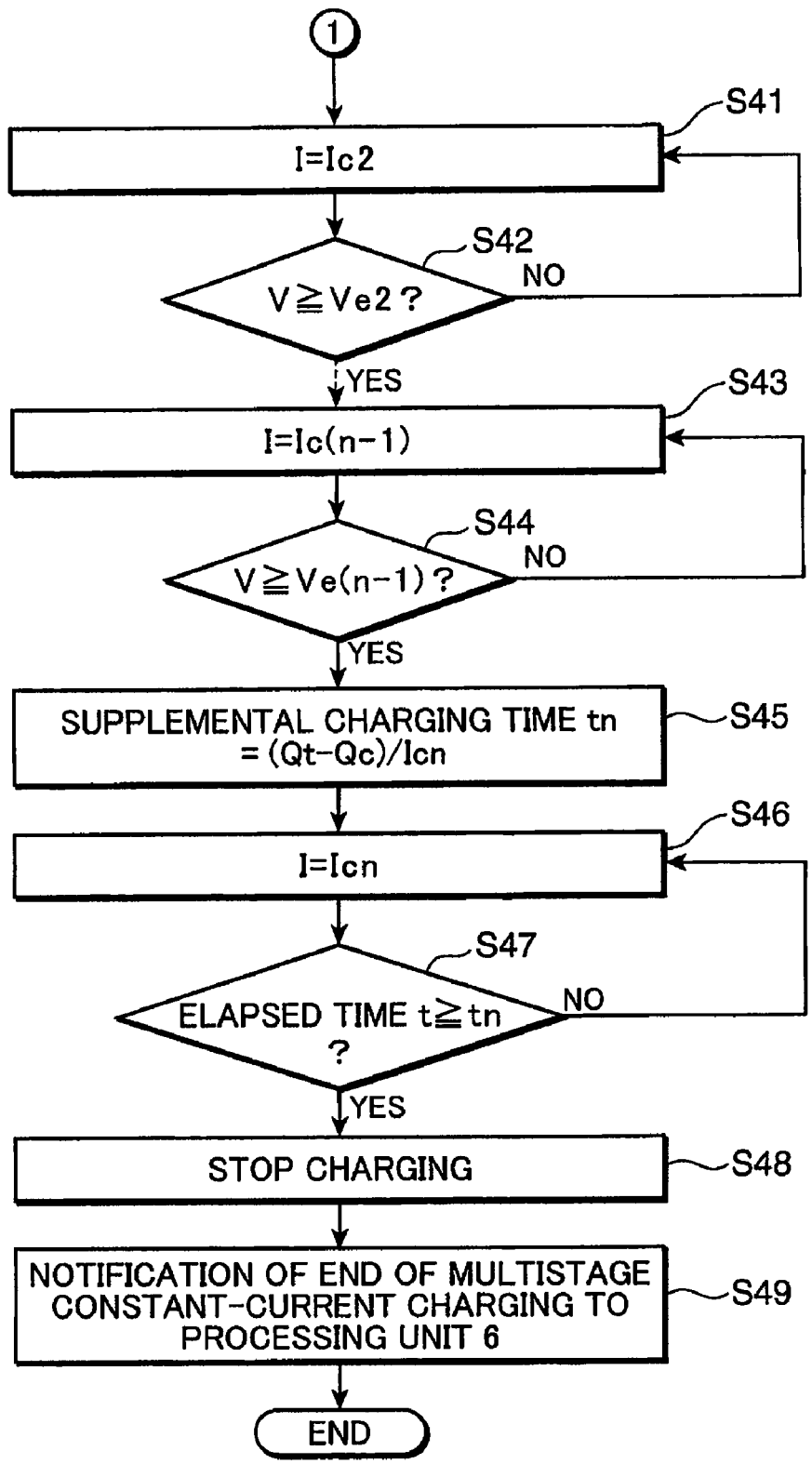
FIG. 13 is a flow chart showing an example of charging by the charging apparatus shown in FIG. 9.

FIGS. 12 and 13 are flow charts showing an example of the operation of the charging apparatuses 2a' and 2b' shown in FIG. 9. The charging apparatuses 2a' and 2b' respectively execute the processing shown in FIGS. 12 and 13 in parallel. The following provides a collective explanation of the operations of the charging apparatuses 2a' and 2b'.

Figure 14:
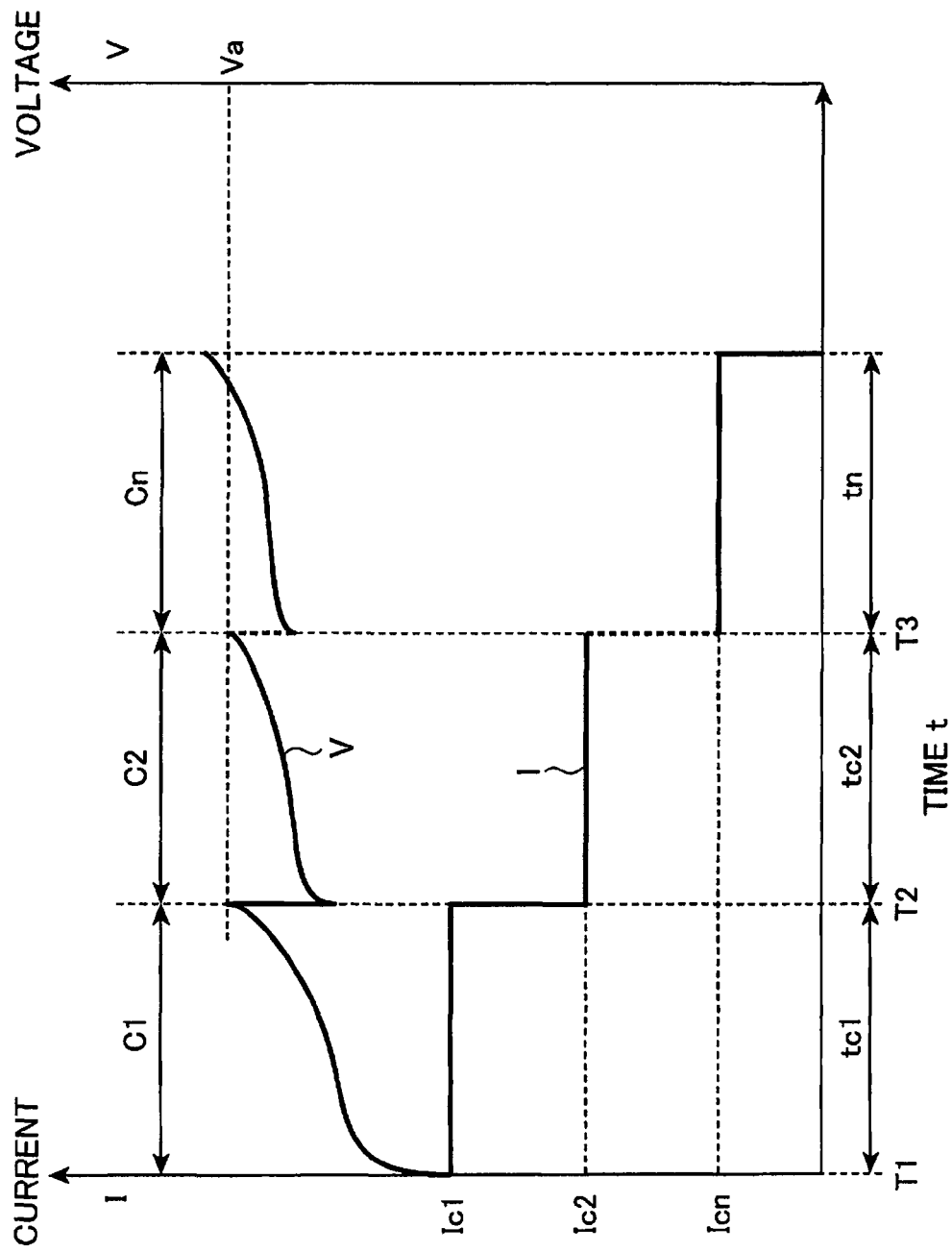
FIG. 14 is an explanatory drawing showing an example of changes in terminal voltage V and charging current I of a secondary battery accompanying charging by the charging apparatus shown in FIG. 8.
Figure 15:
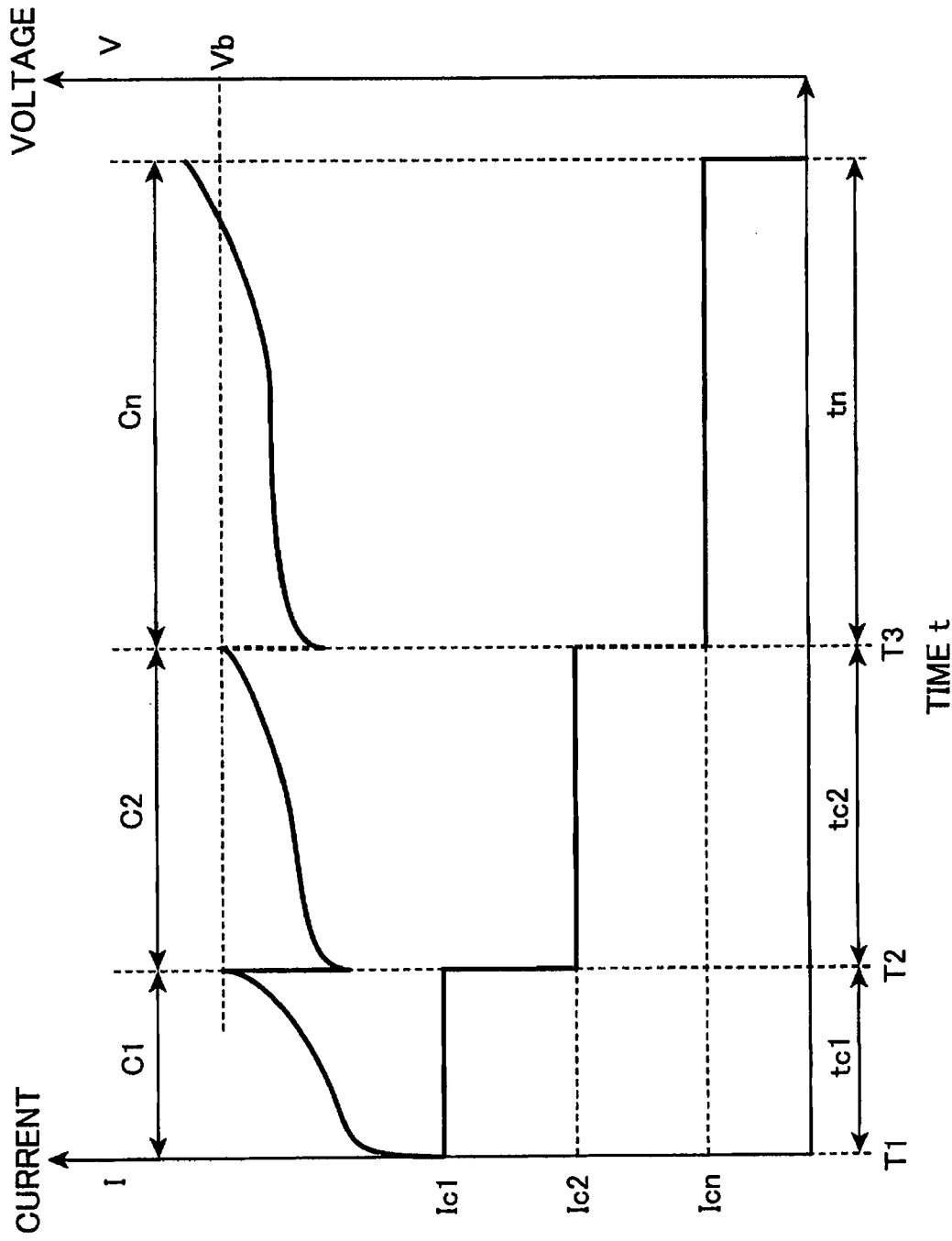
FIG. 15 is an explanatory drawing showing an example of changes in terminal voltage V and charging current I of a secondary battery accompanying charging by the charging apparatus shown in FIG. 8.

In addition, FIG. 14 is an explanatory drawing showing an example of changes in the terminal voltage V and charging current I of the secondary battery 1a accompanying charging by the charging apparatus 2a' shown in FIG. 9. FIG. 15 is an explanatory drawing showing an example of changes in the terminal voltage V and charging current I of the secondary battery 1b accompanying charging by the charging apparatus 2b'. FIGS. 14 and 15 show examples in which stratification has progressed further in the secondary battery 1b (FIG. 15) than in the secondary battery 1a (FIG. 14).

First, the control unit 21' receives the thermal history values Hr and the charging cutoff voltages Ve1 to Ven from the processing unit 6 prior to the start of charging of the secondary batteries 1a and 1b (Step S31).

Next, current values detected by the current detection units 8a and 8b are accumulated, for example, for each unit time by the applied electricity amount detection unit 214, accumulation of the amounts of electricity applied Qc is begun (Step S32), and measurement of the duration Tc1 of the constant-current charging C1 is started by the timing unit 212 (Step S33).

In Step S34, the charging current I output from the constant current circuit 23 is set to the charging current value Ic1 by the charging control unit 211, the first-stage constant-current charging C1 is started (at time T1), and the secondary batteries 1a and 1b are charged (Step S34). Next, a judgment is made by the charging control unit 211 as to whether or not the voltage V of the secondary batteries 1a and 1b is equal to or greater than the first-stage charging cutoff voltage Ve1, if the terminal voltage V is less than Ve1, the first-stage constant-current charging C1 is continued (NO in Step S35), while if the terminal voltage V is equal to or greater than Ve1, the first-stage constant-current charging C1 is ended (YES in Step S35, time T2).

Here, in the case, for example, the secondary battery 1a is placed in a temperature environment at a higher temperature than the secondary battery 1b, as a result of the thermal history value Hr calculated for the secondary battery 1a by the processing unit 6 having a larger value than that of the secondary battery 1b, the charging cutoff voltages Ve1 to Ven transmitted (set) to the charging apparatus 2a' by the processing unit 6 are lower than the charging cutoff voltages Ve1 to Ven transmitted (set) to the charging apparatus 2b'.

In FIG. 14, the charging cutoff voltages Ve1 to Ven transmitted (set) to the charging apparatus 2a' are equal to a voltage Va, while in FIG. 15, the charging cutoff voltages Ve1 to Ven transmitted (set) to the charging apparatus 2b' equal to a voltage Vb, and in this case, Va<Vb. As a result, the amount of electricity applied that is supplied to the secondary battery 1a, which is placed in a temperature environment at a high temperature and on which there are little effects of stratification and in which charging efficiency is high, is less than the amount of electricity applied that is supplied to the secondary battery 1b, which is placed in a temperature environment at a low temperature and in which stratification has progressed and in which charging efficiency is low, thereby resulting in the difference (variation) in the amount of electricity charged that is actually charged to the secondary batteries 1a and 1b being small.

When the constant-current charging C1 has ended (YES in Step S35, time T2), the duration tc1 timed by the timing unit 212 is acquired by the target applied electricity amount acquisition unit 213 (Step S36), the table of the amounts of electricity applied of the storage unit 217 is referenced, and an amount of electricity applied that is stored in correlation with the duration tc1 is acquired by the target applied electricity amount acquisition unit 213 as the target amount of electricity applied Qt (Step S37).

Next, the table of charging efficiency coefficients stored in storage unit 217 is referenced, and the charging efficiency coefficient Kc correlated with the thermal history value Hr received from the processing unit 6 is acquired by the supplemental charging time correction unit 216 (Step S38). The charging efficiency coefficient Kc is multiplied by the target amount of electricity applied Qt acquired by the target applied electricity amount acquisition unit 213, and the target amount of electricity applied Qt is corrected by the supplemental charging time correction unit 216 (Step S39).

As a result, since the charging efficiency coefficient Kc becomes smaller as the thermal history value Hr becomes larger, the target amount of electricity applied Qt becomes smaller as the thermal history value Hr becomes larger and is corrected such that the supplemental charging time tn becomes shorter. Here, if correction of the target amount of electricity applied Qt (supplemental charging time tn) was assumed to not be executed by the supplemental charging time correction unit 216, the charging cutoff voltages Ve1 to Ven would be set to small values due to the processing of Steps S11 to S15 and Steps S21 to S25 by the processing unit 6 such that amount of electricity applied during multistage constant-current charging is decreased for the secondary battery having the larger value of the thermal history value Hr, and in a secondary battery having a thermal history value Hr, the amount of electricity applied Qc decreases despite attempting to decrease the difference (variation) between the amounts of electricity charged that are actually charged the secondary batteries 1a and 1b as previously described, and in Step S45, there is the risk of the supplemental charging time tn being set to a long time, and the amount of electricity applied increasing due to prolongation of the charging time of the final constant-current charging Cn, thereby offsetting the effect of reducing variation in the amounts of electricity applied by the processing unit 6.

However, according to the battery charging system 100', the supplemental charging time tn is corrected by the supplemental charging time correction unit 216 such that the target amount of electricity applied Qt becomes smaller and the supplemental charging time tn becomes shorter as the thermal history value Hr be greater, the risk of offsetting the effect of reducing variations in the amount of electricity charged by the processing unit 6 is diminished.

Next, in Step S41, the charging current I output from the constant current circuit 23 is set to the charging current value Ic2 by the charging control unit 211, the second-stage constant-current charging C2 is started (at time T2), and the secondary batteries 1a and 1b are charged (Step S41). Next, a judgment is made by the charging control unit 211 as to whether or not the terminal voltage V of the secondary batteries 1a and 1b is equal to or greater than the second-stage charging cutoff voltage Ve2, if the terminal voltage V is less than Ve2, the second-stage constant-current charging C2 is continued (NO in Step S42), while if the terminal voltage V is equal to or greater than Ve2, the second-stage constant-current charging C2 is ended (YES in Step S42).

Constant-current charging is subsequently repeated while sequentially decreasing charging current values, and when the n−1 round (one round prior to the final round) of constant-current charging (n−1) ends (YES in Step S44), the supplemental charging time tn is calculated using the above-mentioned formula (1) by the supplemental charging time calculation unit 215 based on the amount of electricity applied Qc, the target amount of electricity applied Qt and the charging current value (set current value) Icn accumulated by the applied electricity amount detection unit 214 (Step S45).

Next, the charging current I output from the constant current circuit 23 is set to a charging current value Icn by the charging control unit 211, nth-stage (final) constant-current charging Cn is started (time T3), and the secondary batteries 1a and 1b are charged (Step S46).

An elapsed time t after the start of the constant-current charging Cn is measured by the timing unit 212, and a comparison is made between the elapsed time t and the supplemental charging time tn by the charging control unit 211 (Step S47). When the elapsed time t becomes equal to or greater than the supplemental charging time tn (YES in Step S47), the charging control unit 211 sets the current output by the constant current circuit 23 to zero, and multistage constant-current charging ends (Step S48).

Moreover, notification of the end of multistage constant-current charging is then made by the charging control unit 211 to the processing unit 6 (Step S49) to end processing.

As has been described above, according to the processing of Steps S46 to S48, since the amount of electricity applied to the secondary batteries 1a and 1b throughout the entire multistage constant-current charging is acquired by the target applied electricity amount acquisition unit 213, and the secondary batteries 1a and 1b are charged in the final constant-current charging Cn such that the amount of electricity applied becomes the target amount of electricity applied Qt for which the effects of temperature (effects of stratification) have been corrected by the supplemental charging time correction unit 216, the supplemental charging time calculation unit 215 improves the accuracy of fully charging the secondary batteries 1a and 1b.

Furthermore, the processing unit 6 may be made to acquire the maximum values of temperatures ta and tb during the above-mentioned setting period as thermal history values Hr in Steps S12 to S14 and Steps S22 to S24. As a result, acquisition processing of the thermal history values Hr can be simplified.

Furthermore, the processing unit 6 may also be made to determine the thermal history through which the secondary batteries 1a and 1b have gone through based on temperature information from the temperature measurement units 7a and 7b in close proximity to the secondary batteries 1a and 1b, and issue a command to change the amounts of applied electricity from the charging apparatuses 2a and 2b connected to the series circuits. Furthermore, a method for changing the amounts of electricity applied in each series circuit based on the thermal history through which the series circuits have gone through can at least be selected from the two methods indicated below.

In a first method, the processing unit 6 reduces the amount of electricity applied to the secondary battery 1a or 1b for which the time during which temperature was high is longer. More specifically, temperatures measured by the temperature measurement units 7a and 7b are processed by the processing unit 6 along with times measured by a timer (not shown). The processing here refers to a process consisting of, for example, calculating the sum (T=Tata+ . . . +Tztz) of the products (Tata . . . Tztz) of temperatures (Ta . . . Tz) and the times at which a secondary battery was placed at those temperatures (ta . . . tz), and then deriving the amounts of electricity applied to be output to the charging apparatuses 2a and 2b corresponding to that sum. If the time at which the secondary battery 1b was placed at a high temperature was tentatively assumed to be longer than that of the secondary battery 1a (and according to this example, if T of the secondary battery 1b is larger than T of the secondary battery 1a), then the processing unit 6 may issue a command such that the amount of electricity applied to the charging apparatus 2a is smaller than that applied to the charging apparatus 2b corresponding to the difference between their sum T.

In a second method, the processing unit 6 reduces the amount of electricity applied to the secondary battery 1a or 1b that is at a higher temperature. More specifically, the maximum temperatures (Tmax) of each of the temperatures measured by the temperature measurement units 7a and 7b are stored by the processing unit 6. If the maximum temperature Tmax of the secondary battery 1b was tentatively assumed to be larger than the maximum temperature Tmax of the secondary battery 1a, then the processing unit 6 issues a command such that the amount of electricity applied to the charging apparatus 2a is smaller than that applied to the charging apparatus 2b corresponding to the difference between their Tmax.

In the case of either of the above-mentioned first and second methods, if, for example, the secondary battery 1a has a longer history in a low-temperature environment than the secondary battery 1b (or is at a lower temperature than the secondary battery 1b), a larger amount of electricity applied is generated by the charging apparatus 2a than the charging apparatus 2b. By employing such a configuration, since the secondary battery 1a can be accurately determined to have more serious stratification as a result of having a longer history at a low temperature and secondary battery 1a can be made to generate a larger amount of oxygen gas by charging at a larger amount of electricity than the secondary battery 1b, elimination of stratification can be allowed to proceed. On the other hand, since the secondary battery 1b having mild stratification is charged at a lower amount of electricity than the secondary battery 1b, the amount of oxygen gas generated is lower ultimately making it difficult for elimination of stratification to proceed. Accompanying these mutual effects, it also becomes easier to align the degrees of elimination of stratification between the series circuits, thereby making it possible to more easily eliminate the major cause of battery deterioration of "variations in the degree of deterioration between series circuits". Furthermore, the amount of electricity applied can be changed by changing the charging current or charging cutoff voltage in the charging apparatuses 2a and 2b.

Figure 16:
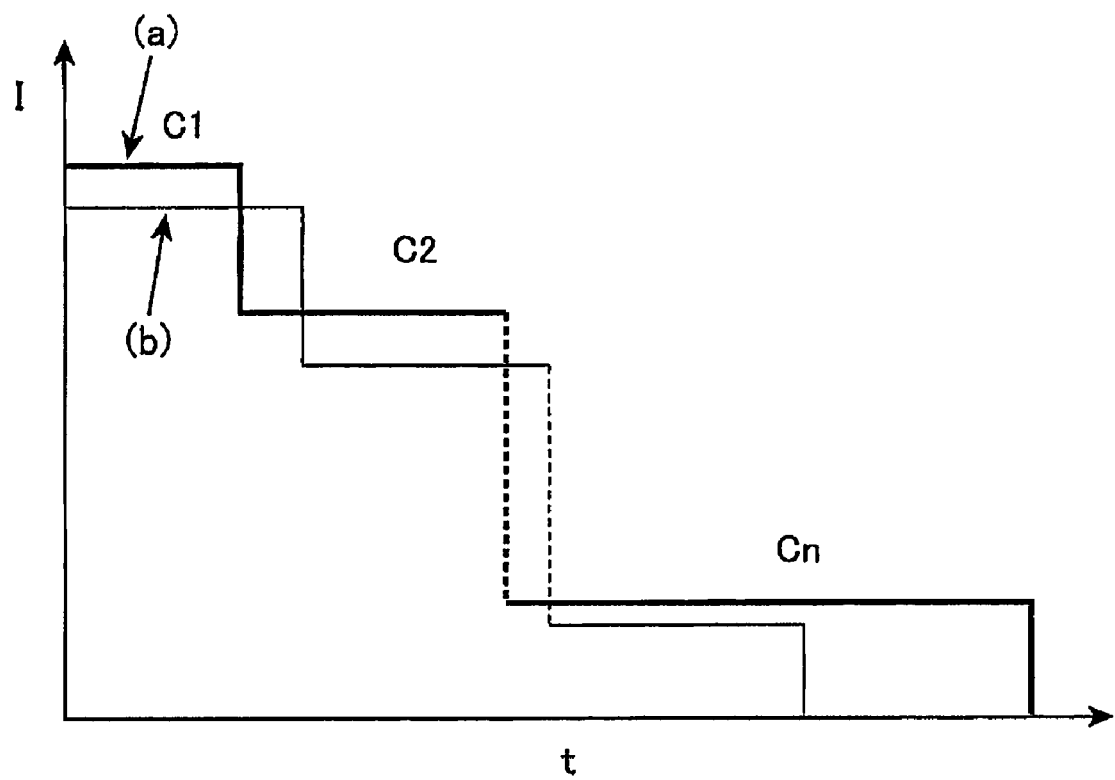
FIG. 16 is a schematic diagram representing charging behavior for each secondary battery during n-stage constant-current charging, wherein (a) shows the behavior of a secondary battery in which the degree of stratification is serious, while (b) shows the behavior of a secondary battery in which stratification is mild.

FIG. 16 is a schematic diagram representing charging behavior for each secondary battery during n-stage constant-current charging, wherein (a) shows the behavior of a series circuit in which the degree of stratification is serious, while (b) shows the behavior of a series circuit in which stratification is mild. Furthermore, in FIG. 3, charging current (I) is plotted on the vertical axis while required charging time (t) is plotted on the horizontal axis.

As shown in FIG. 16, as a result of required charging time being longer for the secondary battery of (a) having a serious degree of stratification than the secondary battery of (b) having a mild degree of stratification, the varying degrees of stratification are aligned for each secondary battery in the same manner as in FIGS. 6A and 6B. By reducing variations in stratification between each secondary battery in this manner, the risk of a reduction in overall battery capacity of the assembled battery is diminished.

Moreover, as shown in FIG. 16, by changing the amount of electricity applied (charging current value) in each series circuit based on the thermal history that each series circuit has gone through, a more active stratification elimination reaction (oxygen gas generation reaction) can be promoted in those series circuits in which stratification is more serious (namely, those series circuits having a longer history in a low temperature environment). In other words, the degree of elimination of stratification can be more effectively aligned between series circuits.

In addition, the amount of electricity applied may also be changed for each series circuit based on a table for determining the amount of electricity applied corresponding to the thermal history of a valve-regulated lead-acid battery. Enabling the processing unit 6 to have a table for determining the amount of electricity applied corresponding to thermal history and changing the amount of electricity applied for each series circuit while referencing quantified thermal history and the table instead of using a method in which detailed commands are issued for each amount of electricity applied to be output to the charging apparatuses 2a and 2b based on thermal history quantified by the processing unit 6 is preferable since processing is relived of the complexity (accompanying complex fine adjustment) attributable to issuing detailed commands for the amount of electricity applied (namely, intricately changing the output conditions of the charging apparatuses 2a and 2b). Furthermore, at least the following two methods can be selected for "changing the amount of electricity applied for each series circuit based on a table for determining the amount of electricity applied corresponding to the thermal history of a valve-regulated lead-acid battery".

In the first method, the table is set such that the amount of electricity applied decreases the longer the time during which the temperature of the valve-regulated lead-acid battery was high. More specifically, the processing unit 6 processes temperatures measured by the temperature measurement units 7a and 7b together with the time measured by a timer (not shown). The processing referred to here consists of, for example, calculating the sum (T=Tata+ . . . +Tztz) of the products (Tata . . . Tztz) of factors relating to temperature (Ta . . . Tz) and the times at which a series circuit was placed at those temperatures (ta . . . tz). The processing unit 6 then references the difference between both sums T with the table stored by the processing unit 6. The table is set such that the difference between the sums T is unified to a fixed charging current provided it is within a fixed range. The processing unit 6 issues a command to the charging apparatus 2a to make the amount of electricity applied lower than that of the charging apparatus 2b if, for example, the time at which the secondary battery 1b was at a high temperature is longer than that of the secondary battery 1a (and according to this example, if the value of T of the secondary battery 1b is greater than the value of T of the secondary battery 1a) based on the result of referencing this table.

In the second method, the table is set such that the amount of electricity applied is decreased as the temperature of the valve-regulated lead-acid battery be higher. More specifically, the processing unit 6 respectively stores the maximum temperatures (Tmax) of the temperatures measured by the temperature measurement units 7a and 7b. The processing unit 6 then references the difference between both Tmax with the table stored by the processing unit 6. The table is set such that difference between Tmax is unified to a constant current value provided the difference between Tmax is within a fixed range. The processing unit 6 issues a command to the charging apparatus 2a to make the amount of electricity applied lower than that of the charging apparatus 2b if, for example, the maximum temperature Tmax of the secondary battery 1b is greater than the maximum temperature Tmax of the secondary battery 1a based on the result of referencing this table.

Fourth Embodiment

Studies have been conducted in the past to suitably control charging according to battery temperature by measuring the surface temperature of each battery and altering charging control according to that temperature. However, if heat-generating components of a charger are in close proximity to an assembled battery, battery surface temperature ends up being susceptible to the effects of the heat-generating component, thereby resulting in the problem of being unable to suitably control temperature as a result of being unable to accurately measure battery internal temperature. This effect differs according to the positional relationship between the heat-generating component and the battery.

Therefore, the assembled battery charging method and battery charging system according to a fourth embodiment of the present invention is a method that uses an assembled battery charging method in which, for example, series circuits (secondary batteries), in which a plurality of valve-regulated lead-acid batteries are connected in series, are connected in parallel to a load. In this charging method, n-stage constant-current charging is carried out that changes a current value n−1 times (where n is an integer of 2 or more) by respectively connecting charging apparatuses to each series circuit and having each charging apparatus detect the charging voltage of each series circuit. The amount of electricity charged in each series circuit is changed in consideration of the ambient temperature to which each series circuit is exposed.

In this manner, by changing the amount of electricity charged in each series circuit based on the effects of ambient temperature to which each series circuit is exposed (for example, the arrangement of series circuits relative to each other, or heat generated from other equipment installed in a vehicle and radiated heat generated by the equipment), a more active stratification elimination reaction (oxygen gas generation reaction) can be promoted by increasing the amount of electricity charged the more serious the stratification of a series circuit (the more likely a series circuit is exposed to low temperatures as a result of not being affected by ambient temperature). Namely, the degree of elimination of stratification can be more effectively aligned between series circuits.

Figure 17:
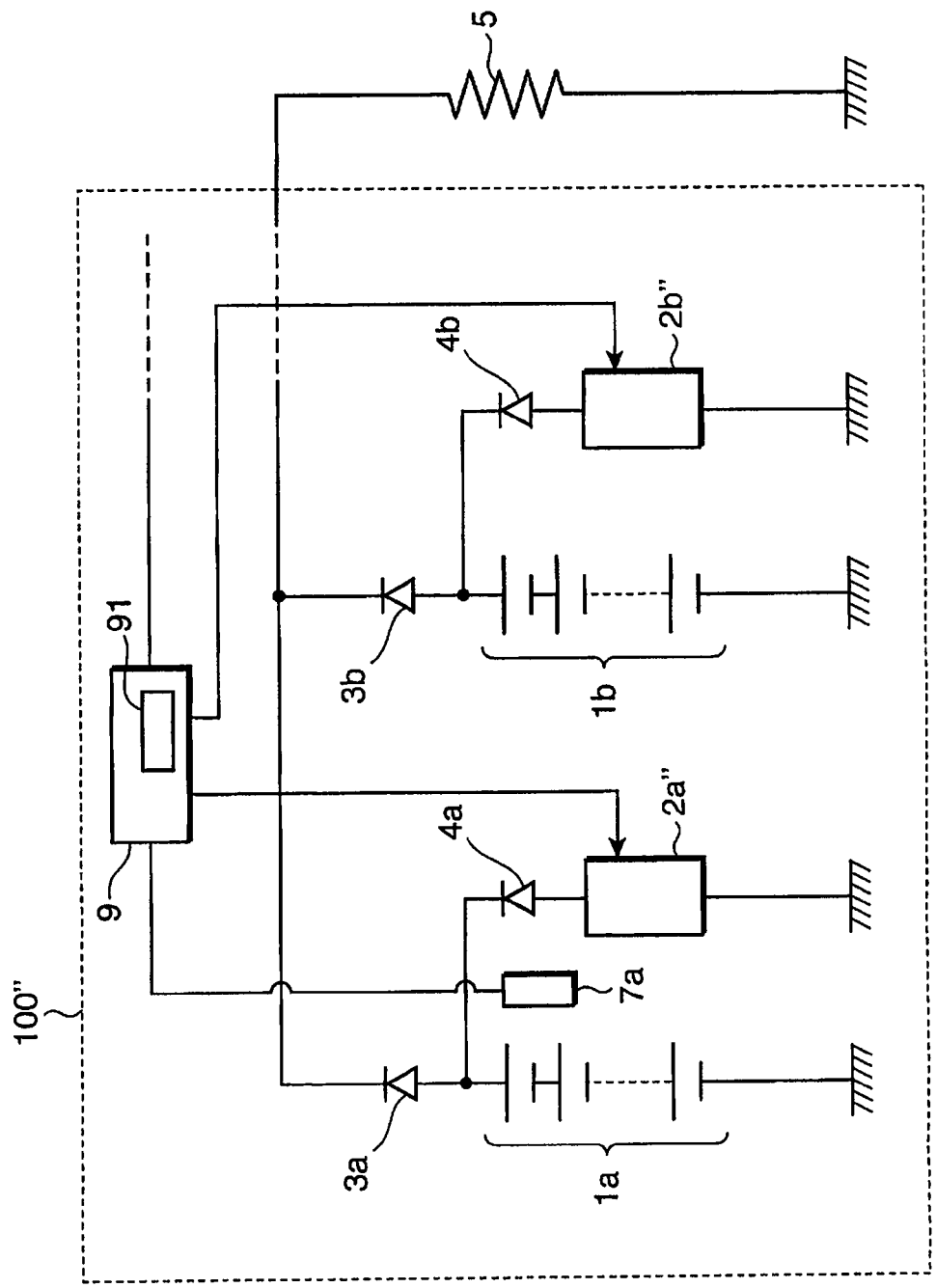
FIG. 17 is a block diagram showing an example of a battery charging system according to a fourth embodiment of the present invention.
Figure 18:
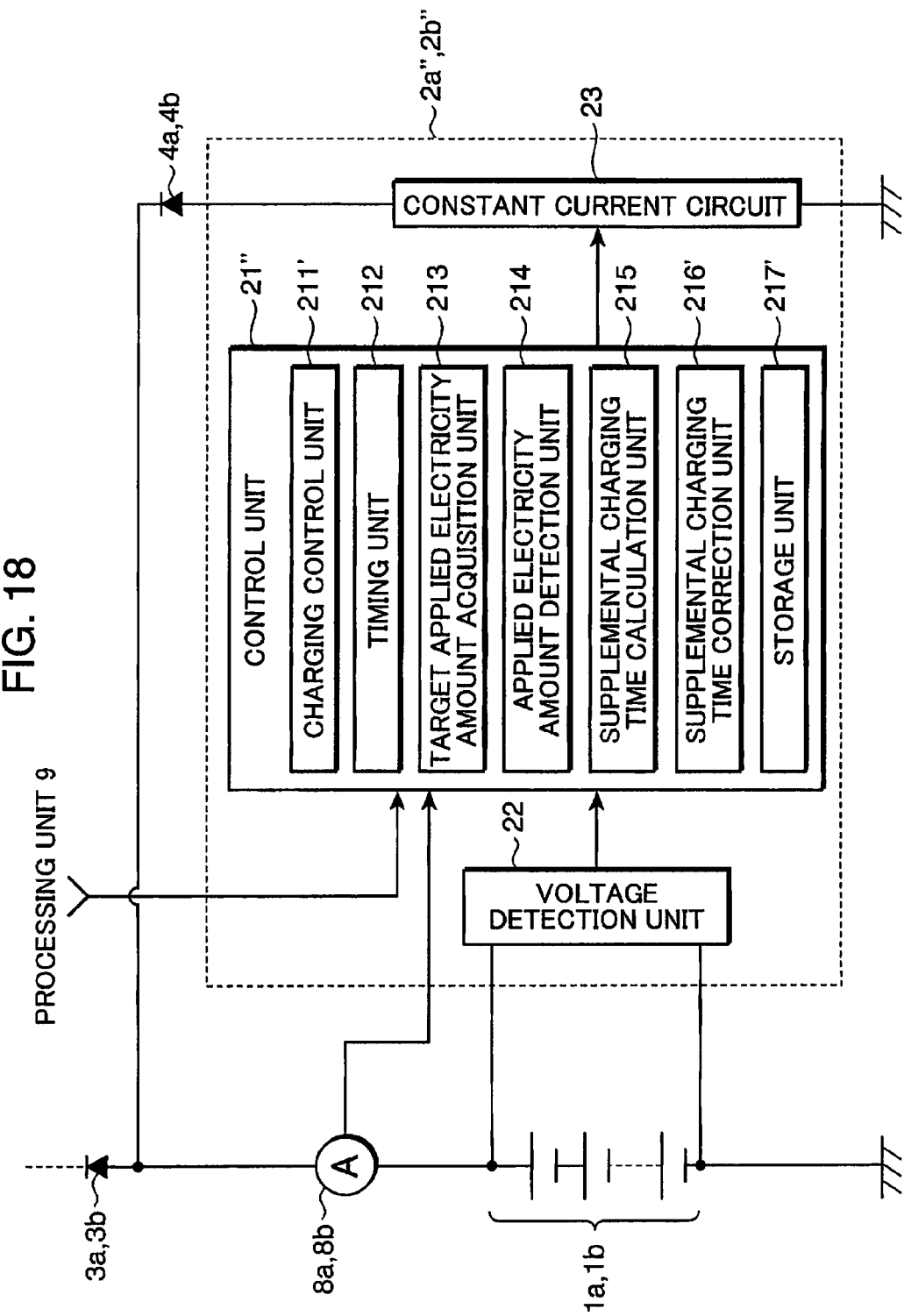
FIG. 18 is a block diagram showing an example of the configuration of the charging apparatuses shown in FIG. 17.

The following provides an explanation of a specific embodiment according to the fourth embodiment. FIG. 17 is a block diagram showing an example of a battery charging system 100" according to the fourth embodiment. In addition, FIG. 18 is a block diagram showing an example of the configuration of charging apparatuses 2a" and 2b" shown in FIG. 17.

The battery charging system 100" changes charging current from the charging apparatuses 2a and 2b connected to the series circuits according to a command from the processing unit 6 in consideration of the ambient temperatures to which the secondary batteries 1a and 1b are exposed. Furthermore, "changing the charging current in each series circuit in consideration of the ambient temperatures to which the series circuits are exposed" refers to a method in which the effects of ambient temperature that have been determined in advance on the basis of experimental results and simulations (for example, arrangement of mutual series circuits, of a temperature difference Td between battery internal temperature and battery surface temperature subjected to the effects of heat from other equipment installed in the vehicle and radiant heat generated according to the arrangement of other equipment) are stored by a processing unit 9, and charging current or charging cutoff voltage is changed between the secondary batteries 1a and 1b based on those stored contents. For example, if the secondary battery 1a is more easily exposed to low temperatures than the secondary battery 1b as a result of not being affected by ambient temperature, then a larger amount of charged electricity is applied to the secondary battery 1a by setting the charging apparatus 2a connected to the secondary battery 1a to a higher charging cutoff voltage than the charging apparatus 2b connected to the secondary battery 1b based on a command from the processing unit 9.

According to this method, the amount of oxygen gas generated by the secondary battery 1a, which is easily exposed to low temperatures as a result of not being affected by ambient temperature and in which stratification is more serious, is greater than that of the secondary battery 1b, and as a result, elimination of stratification of the secondary battery 1a proceeds more easily. On the other hand, the amount of oxygen gas generated by the secondary battery 1b having mild stratification is less than that of the secondary battery 1a, and a result, elimination of stratification of the secondary battery 1b proceeds with greater difficulty. Accompanying these mutual effects, the degree of elimination of stratification between series circuits is more easily aligned, and the major cause of assembled battery deterioration of "variation in the degree of deterioration between series circuits" is more easily eliminated.

More specifically, the battery charging system 100" shown in FIG. 17 differs from the battery charging system 100' shown in FIG. 8 in that operation of the processing unit 9 (applied electricity amount setting unit) differs from that of the processing unit 6, in that the temperature measurement unit 7b is not provided, and in that the charging apparatuses 2a" and 2b" are provided with a charging control unit 211' instead of the charging control unit 211, and are provided with a supplemental charging time correction unit 216' instead of the supplemental charging time correction unit 216.

The charging control unit 211' provided by the control unit 21" in the charging apparatuses 2a" and 2b" shown in FIG. 18 differs from the charging control unit 211 shown in FIG. 9 in that multistage constant-current charging is executed based on the charging cutoff voltages Ve1 to Ven set by the processing unit 9.

In addition, the supplemental charging time correction unit 216' differs from the supplemental charging time correction unit 216 shown in FIG. 9 in that it acquires charging efficiency coefficients Kc based on internal temperatures of the secondary batteries 1a and 1b estimated by the processing unit 9. In addition, the charging efficiency coefficient table preliminarily stored in a storage unit 217' differs from that stored in the storage unit 217 in that it is a look up table (LUT) that correlates internal temperatures Ti with the charging efficiency coefficients Kc.

Since other constituents are the same as those of the battery charging system 100' shown in FIG. 8, an explanation thereof is omitted, and the following explanation is only provided for those characteristic aspects of the present embodiment.

Furthermore, although an example is shown in which the timing unit 212, the target applied electricity amount acquisition unit 213, the applied electricity amount detection unit 214, the supplemental charging time calculation unit 215, the supplemental charging time correction unit 216', and the storage unit 217' are respectively provided in the charging apparatuses 2a" and 2b", a configuration may also be employed in which each of these units is provided, for example, in the processing unit 9, and the supplemental charging times to corresponding to each secondary battery obtained by the supplemental charging time calculation unit 215 and the supplemental charging time correction unit 216' is transmitted from the processing unit 9 to the control unit 21" in the charging apparatuses 2a" and 2b".

The processing unit 9 is a control circuit configured using, for example, a microcomputer. A storage unit 91 (temperature information storage unit) configured by, for example, ROM, is provided in the processing unit 9. Temperature information indicating the temperature difference Td, which is the difference (relationship) between internal temperatures of the secondary batteries 1a and 1b and temperatures measured by the temperature measurement unit 7a, is stored for the secondary batteries 1a and 1b in the processing unit 91 after, for example, having been determined experimentally in advance.

The temperature difference Td is calculated by, for example, subtracting a measured temperature measured by the temperature measurement unit 7a from the internal temperatures of the secondary batteries 1a and 1b, and when an internal temperature is higher than a measured temperature, the value of the temperature difference Td indicates a positive value, while when an internal temperature is lower than a measured temperature, the value of the temperature difference Td indicates a negative value.

The processing unit 9 calculates and sets the charging cutoff voltage Ve using the following formula (A) based on full charging voltages Vf of the secondary batteries 1a and 1b at a preset reference temperature T0, a temperature coefficient k representing the relationship between temperature and full charging voltage, a measured temperature Tr measured by the temperature measurement unit 7a, and the temperature difference Td stored in the processing unit 91.

$$Ve=Vf-k\times(Tr+Td-T0) \quad (A)$$

The temperature coefficient k is a coefficient indicating the amount of change in charging cutoff voltages Ve1 to Ven per 1° C. change in temperature, and in the case the secondary batteries 1a and 1b are lead-acid batteries, k=0.03, for example. In addition, the term (Tr+Td) in formula (A) is the internal temperature Ti.

In addition, the processing unit 9 estimates the internal temperatures Ti of the secondary batteries 1a and 1b by adding the measured temperature Tr and the temperature difference Td, and respectively transmits the estimated values to the charging apparatuses 2a″ and 2b″.

Figure 19:
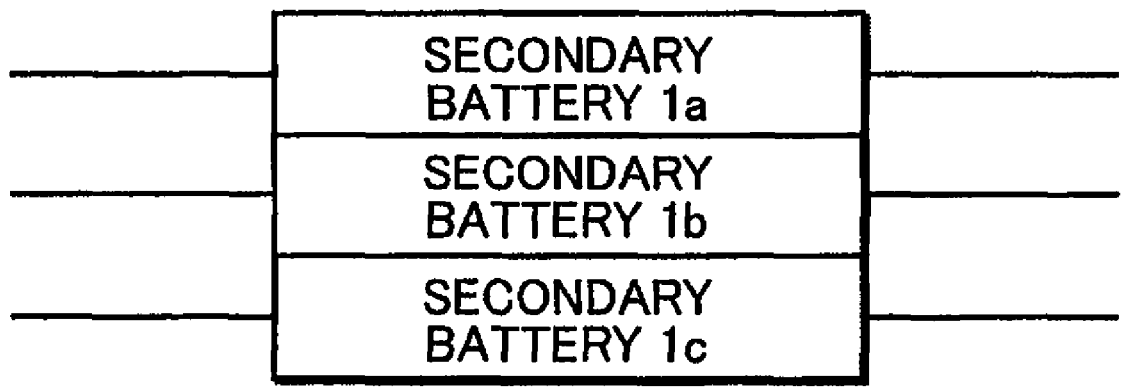
FIG. 19 is an explanatory drawing showing an example of the arrangement of each secondary battery.

FIG. 19 is an explanatory drawing showing a state in which three secondary batteries, consisting of a secondary battery 1c in addition to the secondary batteries 1a and 1b, are arranged in a somewhat closely packed arrangement. FIG. 20 is an explanatory drawing for explaining an example of temperature information stored in the storage unit 91. The temperature information of the explanatory drawing of FIG. 20 shows an example of the results of measuring outside air temperatures Ta in the vicinity of the secondary batteries 1a, 1b an 1c, surface temperatures Ts of the secondary batteries 1a, 1b and 1c, and internal temperatures Ti of the secondary batteries 1a, 1b and 1c with the secondary batteries 1a, 1b and 1c arranged as shown in FIG. 19. Each temperature was measured while applying standard charging and discharging currents to the secondary batteries 1a, 1b and 1c that are assumed to be used at the time of actual use thereof.

As shown in FIG. 20, the surface temperatures Ts of the secondary batteries 1a, 1b and 1c reached 30.6° C., 35.8° C. and 31.2° C. when the outside air temperature Ta was 25.6° C. due to self-heating of the secondary batteries 1a, 1b and 1c accompanying charging and discharging thereof, and the surface temperature of the secondary battery 1b, which is interposed between the other two secondary batteries on both sides thereof, was the highest.

At this time, when an opening was formed in the secondary batteries 1a, 1b and 1c and the internal temperatures Ti thereof were measured, the internal temperatures Ti were 31.6° C., 33.9° C. and 32.3° C. This being the case, in the secondary batteries 1a, 1b and 1c, the temperature differences Tis between the internal temperatures Ti and the surface temperatures Ts (temperature differences Tis=internal temperature Ti−surface temperature Ts) were respectively 1.0° C., −1.9° C., and 1.1° C., the temperature differences Tsa between the surface temperatures Ts and the outside air temperatures Ta (temperature differences Tsa=surface temperature Ts−outside air temperature Ta) were respectively 5.0° C., 10.2° C. and 5.6° C., and the temperature differences Tss between the surface temperature of the secondary battery 1a and the surface temperatures of each of the other secondary batteries (temperature differences Tss=surface temperature Ts−surface temperature Ts of secondary battery 1a) were respectively 0.0° C., 5.2° C. and 0.6° C.

Here, when the temperature measurement unit 7a is arranged so as to measure the outside air temperatures Ta of the secondary batteries 1a, 1b and 1c, the temperature difference Tsa+temperature difference Tis+temperature difference Tss in the temperature information shown in FIG. 20 indicates the temperature difference Td. In addition, when the temperature measurement unit 7a is arranged so as to measure the surface temperature Ts of the secondary battery 1a, the temperature difference Tis+the temperature difference Tss in the temperature information shown in FIG. 20 indicates the temperature difference Td.

FIG. 21 shows the charging cutoff voltages Ve set corresponding to the secondary batteries 1a, 1b and 1c by the processing unit 9 in the case of arranging the temperature measurement unit 7a so as to measure the surface temperature Ts of the secondary battery 1a at a measured temperature Tr measured by the temperature measurement unit 7a of 30.6° C., a reference temperature T0 of 25° C., and a full charging voltage Vf of 14.4 V.

Figure 22:
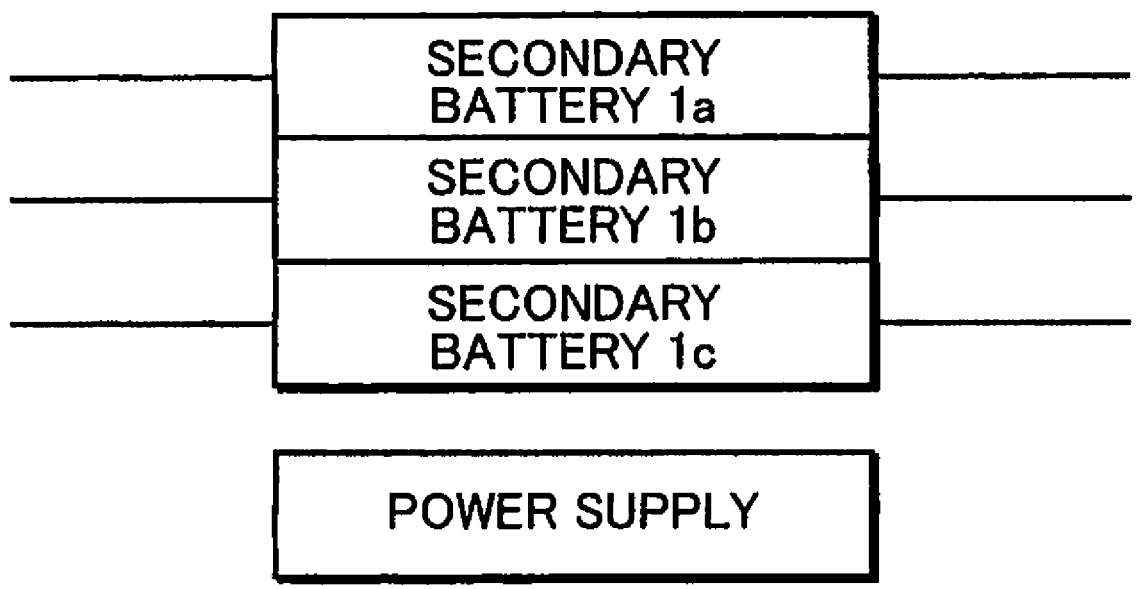
FIG. 22 is an explanatory drawing showing another example of the arrangement of each secondary battery.

FIG. 22 is an explanatory drawing showing a state in which the secondary batteries 1a, 1b and 1c are arranged in a somewhat closely packed arrangement, and a power supply serving as a heat-generating body is arranged on the side of the secondary battery 1c. FIG. 23 is an explanatory drawing for explaining an example of temperature information stored in the storage unit 91. The temperature information of the explanatory drawing of FIG. 23 shows an example of the results of measuring outside air temperatures Ta in the vicinity of the secondary batteries 1a, 1b and 1c, surface temperature Tp of the power supply, surface temperatures Ts of the secondary batteries 1a, 1b and 1c, and internal temperatures Ti of the secondary batteries 1a, 1b and 1c in a state in which the secondary batteries 1a, 1b and 1c and the power supply are arranged as shown in FIG. 22 so that the secondary battery 1c is most susceptible to the effects of radiant heat from the power supply. Each temperature was measured while applying standard charging and discharging currents to the secondary batteries 1a, 1b and 1c that are assumed to be used at the time of actual use thereof.

As shown in FIG. 23, the surface temperatures Is of the secondary batteries 1a, 1b and 1c were 30.6° C., 31.3° C. and 34.0° C. when the outside air temperature Ta was 26.3° C. and the power supply surface temperature Tp was 49.2° C., and the surface temperature of the secondary battery 1c was the highest as a result being susceptible to the effects of radiant heat from the power supply.

At this time, when the internal temperatures Ti of the secondary batteries 1a, 1b and 1c were measured by forming openings therein, the internal temperatures Ti were 31.6° C., 32.3° C. and 31.5° C. This being the case, the temperature differences Tis between the internal temperatures Ti and surface temperatures Ts of the secondary batteries 1a, 1b and 1c (temperature difference Tis=internal temperature Ti−surface temperature Ts) were 1.0° C., 1.0° C. and −2.5° C., the temperature differences Tsa between the surface temperatures Ts and the outside air temperatures Ta (temperature difference Tsa=surface temperature Ts−outside air temperature Ta) were 3.1° C., 4.2° C. and 5.8° C., and the temperature differences Tss between the surface temperature of the secondary battery 1a and the surface temperatures of each of the secondary batteries (temperature difference Tss=surface temperature Ts−surface temperature Ts of secondary battery 1a) were 0.0° C., 1.5° C. and 4.0° C.

Here, when the temperature measurement unit 7a is arranged so as to measure the outside air temperatures Ta in the vicinity of the secondary batteries 1a, 1b and 1c, the value of the temperature difference Tsa+temperature difference Tis+temperature difference Tss in the temperature information shown in FIG. 23 indicates the temperature difference Td. In addition, when the temperature measurement unit 7a is arranged so as to measure the surface temperature Ts of the secondary battery 1a, the value of the temperature difference Tis+temperature difference Tss in the temperature information shown in FIG. 23 indicates the temperature difference Td.

FIG. 24 shows charging cutoff voltages Ve set for the secondary batteries 1a, 1b and 1c by the processing unit 9 in the case the temperature measurement unit 7a was set so as to measure the surface temperature Ts of the secondary battery 1a, the measured temperature Tr measured by the temperature measurement unit 7a was 30.6° C., the reference temperature T0 was 25° C., and the full charging voltage Vf was 4.4 V.

Figure 25:
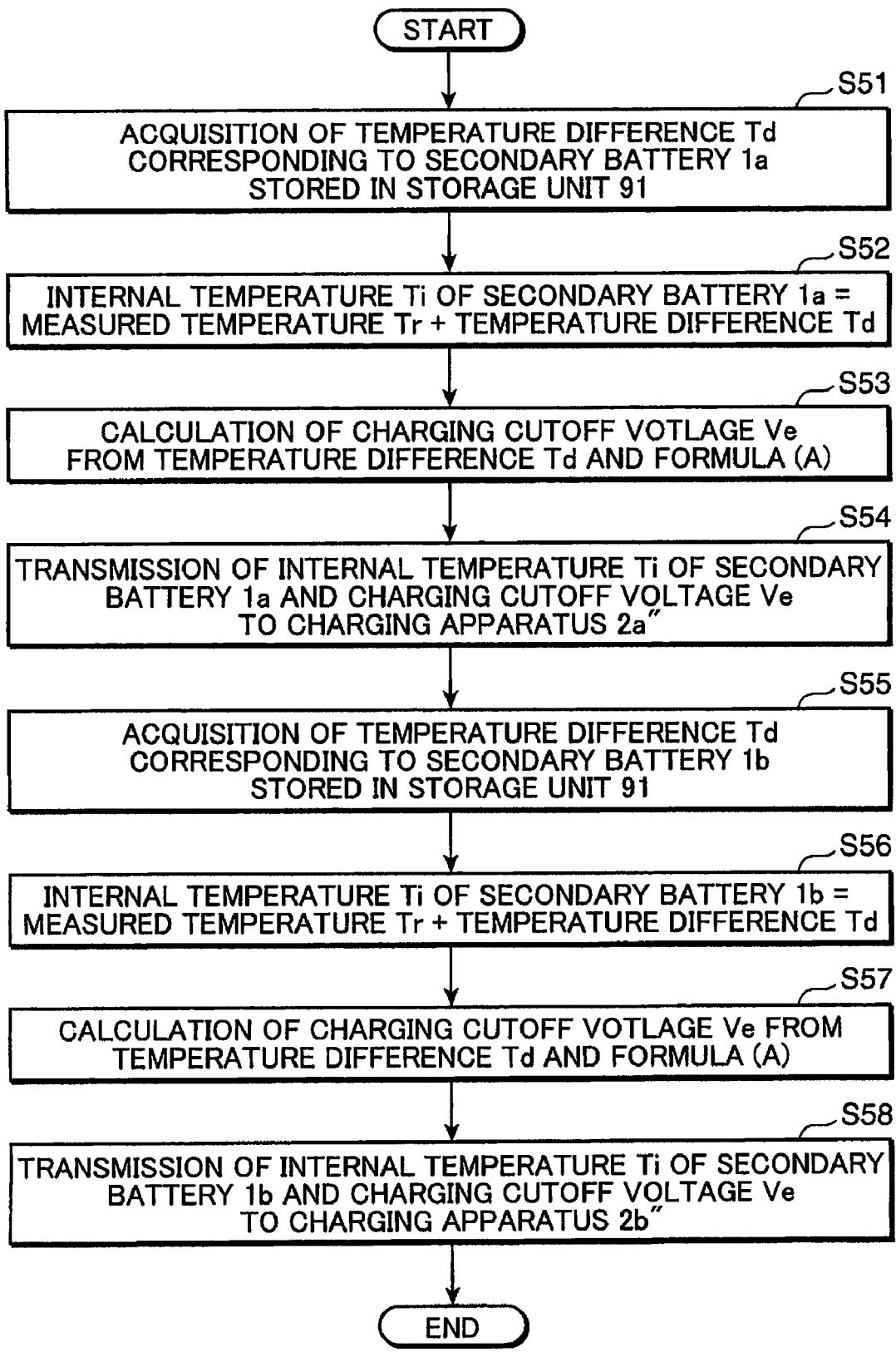
FIG. 25 is a flow chart showing an example of the operation of the processing unit shown in FIG. 17.

Next, an explanation is provided of the operation of the battery charging system 100" configured in the manner described above. FIG. 25 is a flow chart showing an example of the operation of the processing unit 9 shown in FIG. 17. First, the processing unit 9 references the storage unit 91 and acquires a temperature difference Td corresponding to the secondary battery 1a from temperature information stored in the storage unit 91 (Step S51).

Next, the processing unit 9 adds the measured temperature Tr measured by the temperature measurement unit 7a and the temperature difference Td and estimates the internal temperature Ti of the secondary battery 1a (Step S52). The processing unit 9 then uses the temperature difference Td corresponding to the secondary battery 1a and the formula (A) to calculate the charging cutoff voltage Ve (Step S53), and transmits the estimated internal temperature Ti and the charging cutoff voltage Ve of the secondary battery 1a to the charging apparatus 2a" (Step S54).

In the subsequent Steps S55 to S58, the processing unit 9 transmits the estimated internal temperature Ti and the charging cutoff voltage Ve for the secondary battery 1b to the charging apparatus 2b" by executing the same processing as Steps S51 to S54 for the secondary battery 1b.

As has been described above, the actual internal temperatures Ti are estimated for the secondary batteries 1a and 1b that are exposed to different temperature conditions, such as by being arranged between other secondary batteries or by being susceptible to the effects of radiant heat from a heat source such as a power supply, and charging cutoff voltages Ve are set corresponding to the internal temperatures Ti by the processing of Steps S51 to S58.

According to the processing of Steps S51 to S58, as a result of the charging cutoff voltage Ve being set to a lower voltage to reduce the total amount of electricity applied for a secondary battery having a large temperature difference Td, namely a secondary battery having a high internal temperature Ti that is resistant to the occurrence of stratification (has mild stratification), according to the temperature conditions to which the secondary battery is exposed, the required charging time during multistage constant-current charging to be described later is shortened and the effect of eliminating stratification is reduced.

On the other hand, as a result of setting the charging cutoff voltage Ve to a higher voltage to increase the total amount of electricity applied in a secondary battery having a small temperature difference Td, namely a secondary battery having a low internal temperature Ti that is susceptible to the occurrence of stratification (has serious stratification), according to the temperature conditions to which the secondary battery is exposed, the required charging time during multistage constant-current charging is prolonged and the effect of eliminating stratification is increased.

This being the case, since the effect of eliminating stratification is reduced for a secondary battery that is resistant to the occurrence of stratification (has mild stratification), while the effect of eliminating stratification is increased for a secondary battery that is susceptible to the occurrence of stratification (has serious stratification), variations in the degrees of stratification between each secondary battery are reduced.

As a result of reducing variations in the degree of stratification between each secondary battery in this manner, the degree of stratification is reduced even in a valve-regulated lead-acid battery in which stratification has progressed the most, thereby diminishing the risk of a reduction in battery capacity due to sulfation. This being the case, the risk of a reduction in battery capacity of the assembled battery overall is also diminished.

Figure 26:
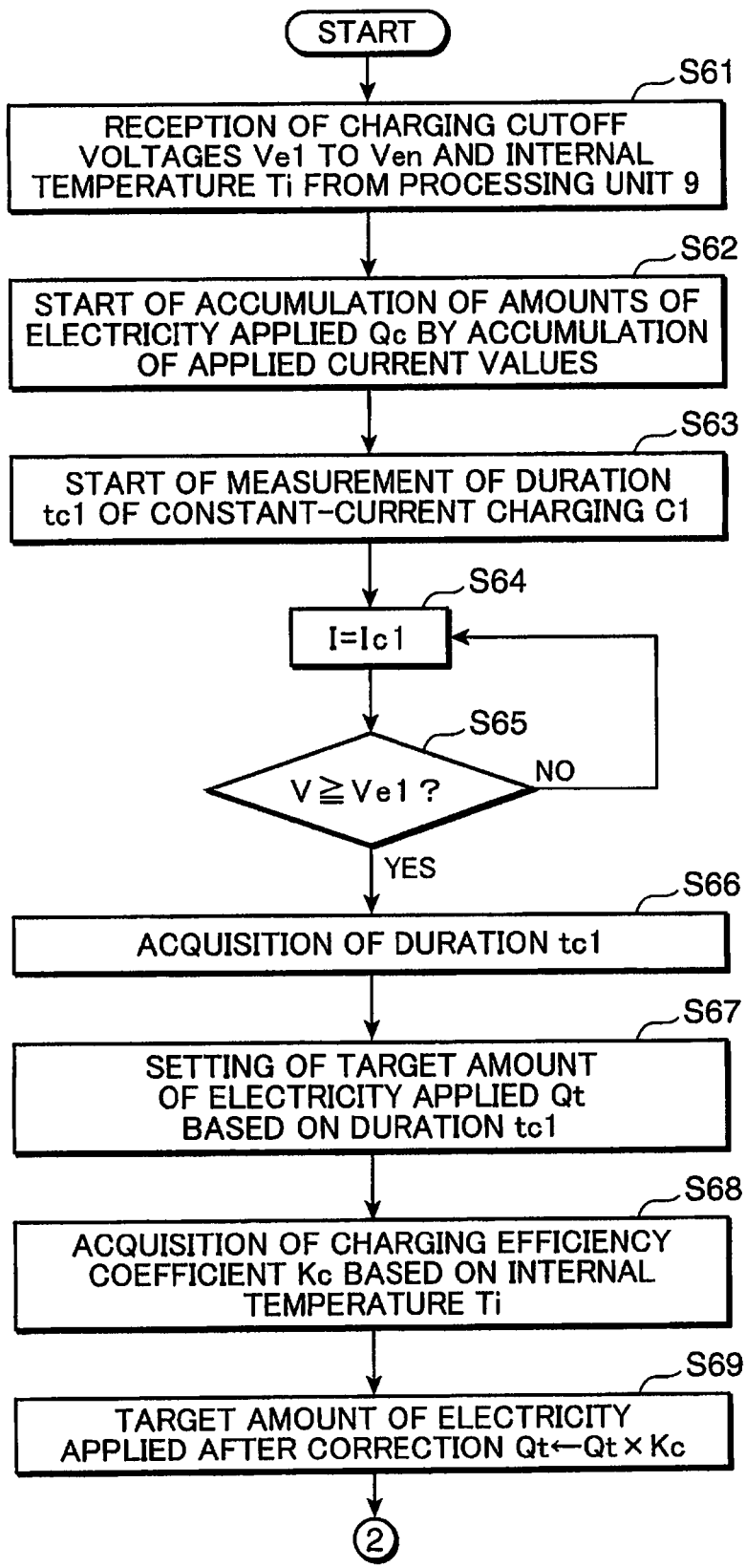
FIG. 26 is a flow chart showing an example of the operation of the charging apparatuses shown in FIG. 18.
Figure 27:
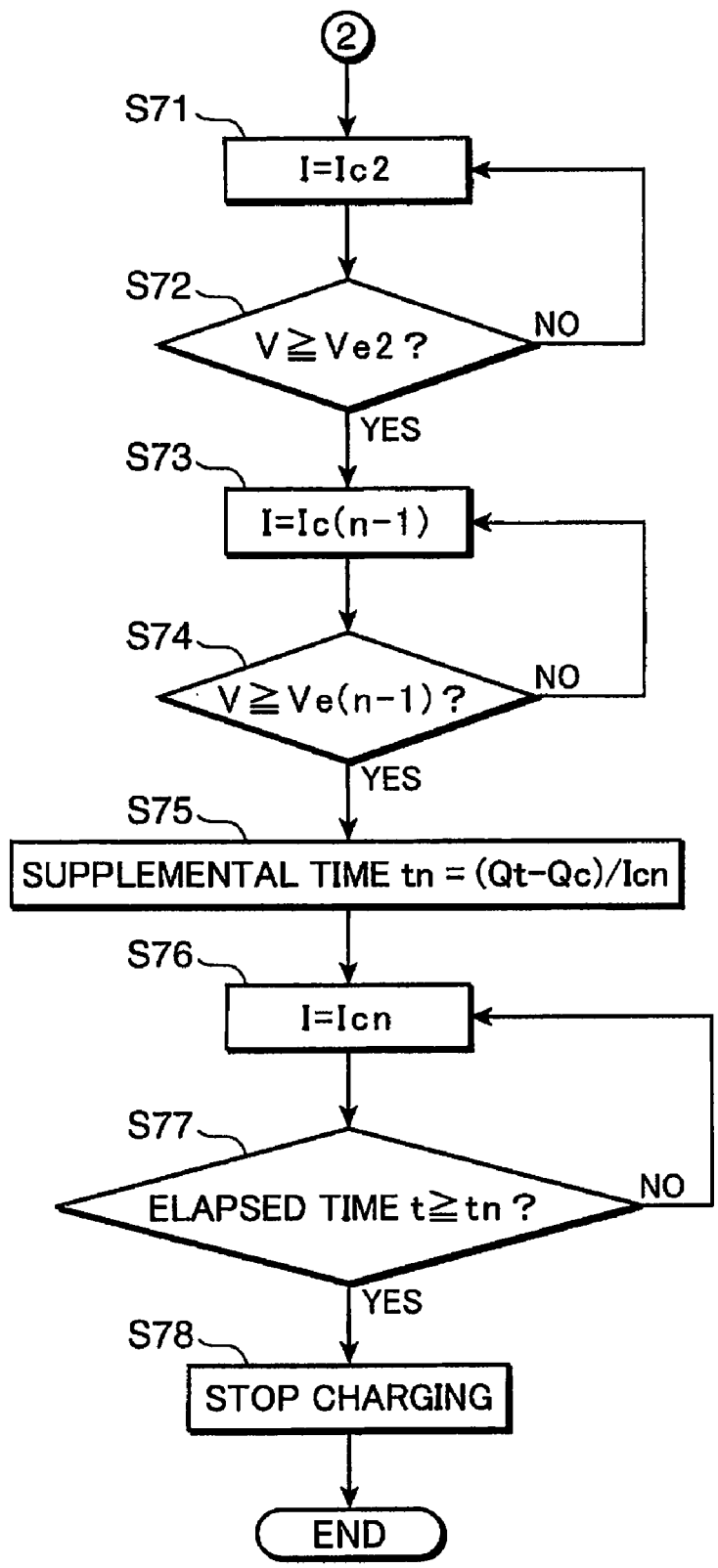
FIG. 27 is a flow chart showing an example of the operation of the charging apparatuses shown in FIG. 18.

FIGS. 26 and 27 are flow charts showing an example of the operation of the charging apparatuses 2a" and 2b" shown in FIG. 18. The charging apparatuses 2a" and 2b" respectively execute the processing shown in FIGS. 26 and 27 in parallel. The following provides a collective explanation of the operation of the charging apparatuses 2a" and 2b".

Figure 28:
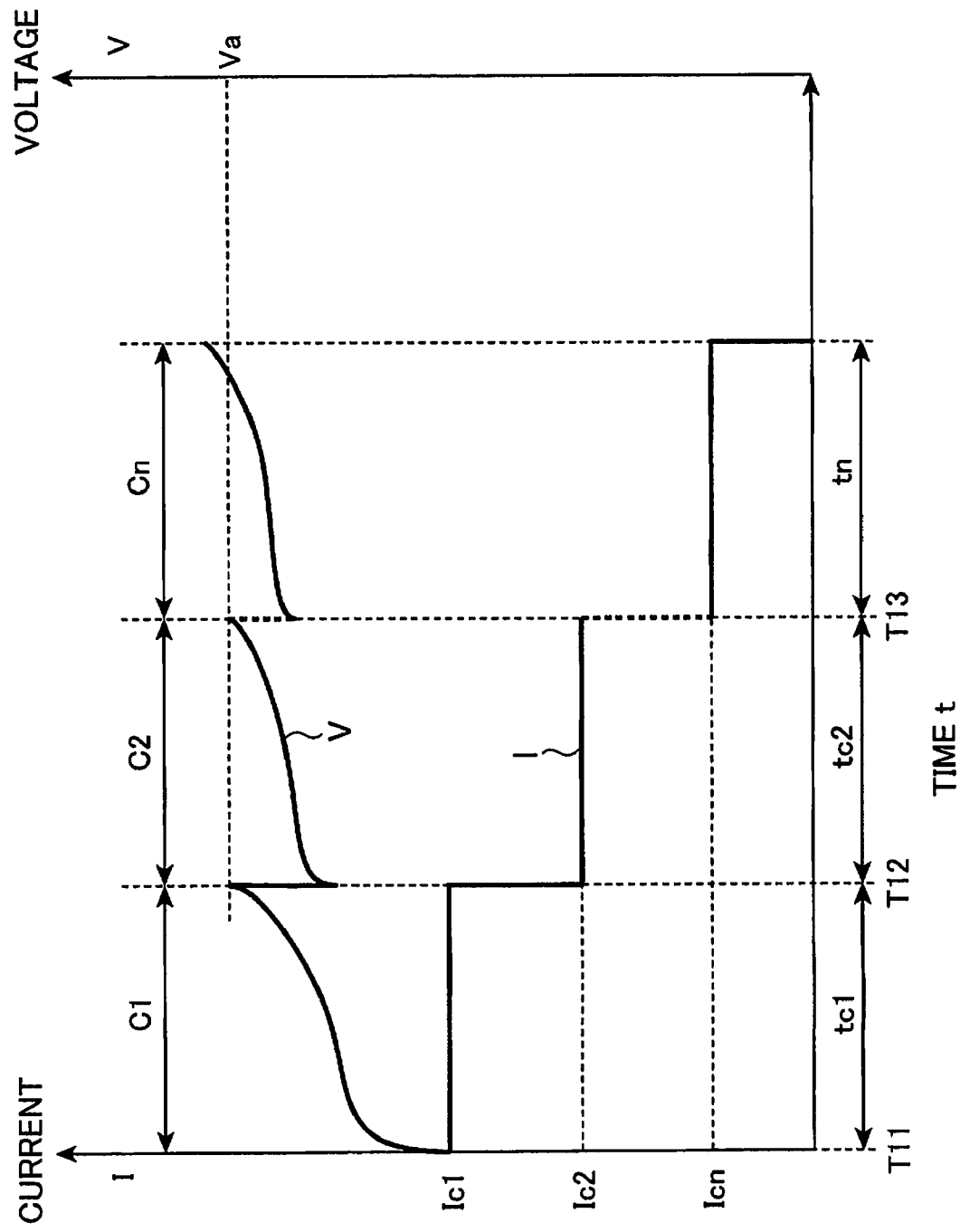
FIG. 28 is an explanatory drawing showing an example of changes in terminal voltage V and charging current I of a secondary battery accompanying charging by a charging apparatus shown in FIG. 18.
Figure 29:
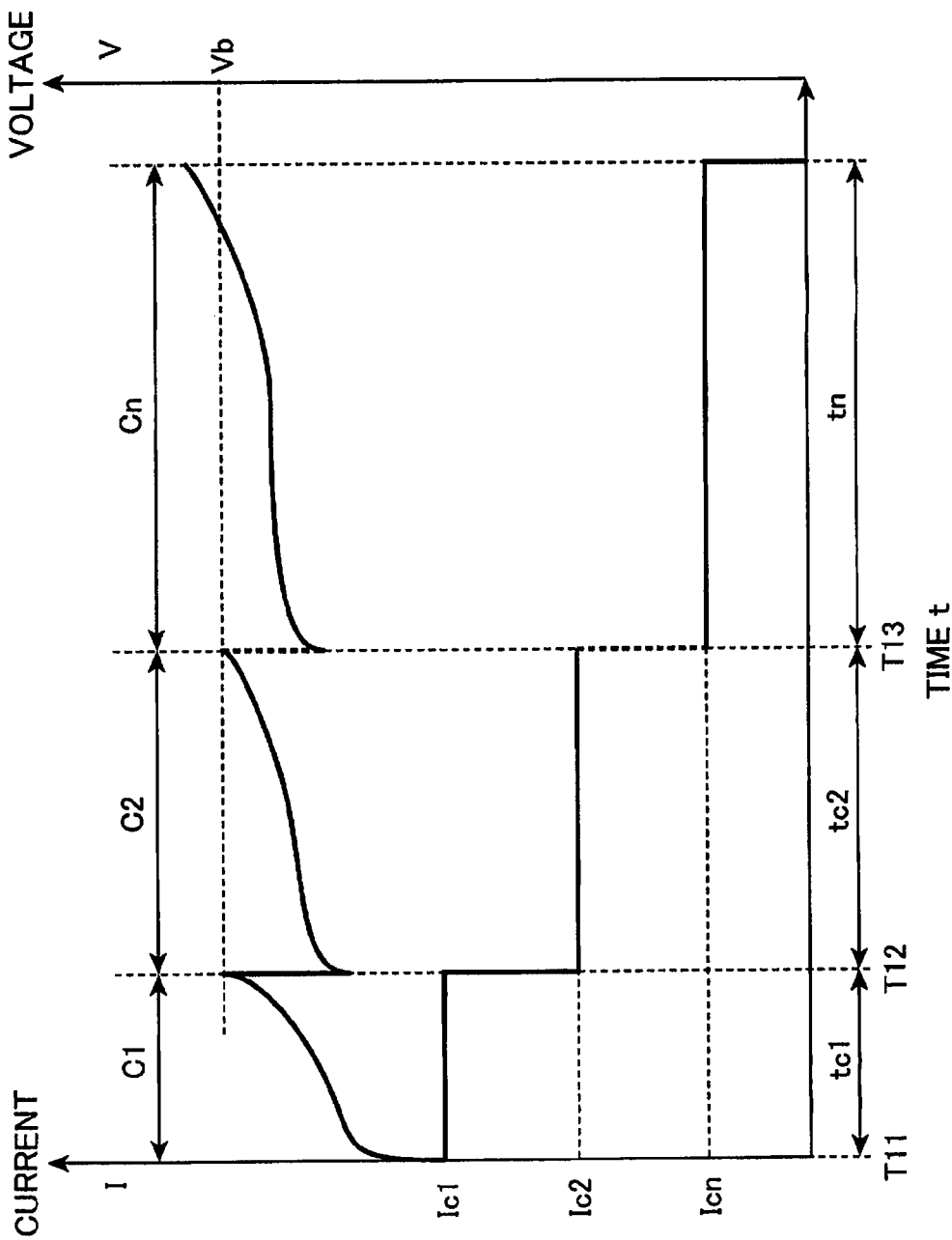
FIG. 29 is an explanatory drawing showing an example of changes in terminal voltage V and charging current I of a secondary battery accompanying charging by a charging apparatus shown in FIG. 18.

In addition, FIG. 28 is an explanatory drawing showing an example of changes in the terminal voltage V and the charging current I of the secondary battery 1a accompanying charging by the charging apparatus 2a" shown in FIG. 18. FIG. 29 is an explanatory drawing showing an example of changes in the terminal voltage V and the charging current I of the secondary battery 1b accompanying charging by the charging apparatus 2b". FIGS. 28 and 29 show an example in which the secondary battery 1b (FIG. 29) is subjected to temperature conditions causing it to be exposed to a lower temperature than that of the secondary battery 1a (FIG. 28), have a smaller temperature difference Td than the secondary battery 1a, and exhibit more progressed stratification.

First, the control unit 21" receives the charging cutoff voltages Ve1 to Ven and the internal temperature Ti from the processing unit 9 (Step S61).

Next, current values detected by the current detection units 8a and 8b are accumulated by the applied electricity amount detection unit 214 in, for example time units, accumulation of the amount of electricity applied Qc is begun (Step S62), and measurement of the duration tc1 of the constant-current charging C1 is begin by the timing unit 212 (Step S63).

In Step S64, the charging current I output from the constant current circuit 23 is set to the constant current value Ic1 by the charging control unit 211', the first-stage constant-current charging C1 is begun (at time T11), and the secondary batteries 1a and 1b are charged (Step S64). Next, a judgment is made by the charging control unit 211' as to whether or not the voltages V of the secondary batteries 1a and 1b are equal to or greater than the first-stage charging cutoff voltage Ve1, and if the terminal voltage V is less than Ve1, the first-stage constant-current charging C1 is continued (NO in Step S65), while if the terminal voltage V is equal to or greater than Ve1, the first-stage constant-current charging C1 ends (YES in Step S65, at time T12).

Here, in the case, for example, the secondary battery 1a is placed in an environment at temperature conditions that make it susceptible to exposure to higher temperatures than the secondary battery 1b (make it more likely for the internal temperature of the secondary battery 1a to reach a high temperature), the temperature difference Td indicated in the temperature information stored in the storage unit 91 has a larger value for the secondary battery 1a than the secondary battery 1b, and as a result thereof, the charging cutoff voltages Ve1 to Ven transmitted (set) to the charging apparatus 2a" by the processing unit 9 are lower than the charging cutoff voltages Ve1 to Ven transmitted (set) to the charging apparatus 2b″.

In the example of FIG. 28, the charging cutoff voltages Ve1 to Ven transmitted (set) to the charging apparatus 2a″ are represented by Va, while in the example of FIG. 29, the charging cutoff voltages Ve1 to Ven transmitted (set) to the charging apparatus 2b″ are represented by Vb, and in this case, Va<Vb. Thus, the amount of electricity applied that is supplied to the secondary battery 1a, which is placed in an environment under temperature conditions that easily expose it to high temperatures and for which there are thought to be little effects of stratification resulting in high charging efficiency, is less than the amount of electricity applied that is supplied to the secondary battery 1b, which is placed in an environment under temperature conditions that easily expose it to low temperatures and for which stratification is considered to progress resulting in low charging efficiency, and as a result thereof, the difference (variation) in the amounts of electricity applied that are actually charged the secondary batteries 1a and 1b is decreased.

When the constant-current charging C1 ends (YES in Step S65, at time T12), the duration tc1 measured by the timing unit 212 is acquired by the target applied electricity amount acquisition unit 213 (Step S66), the table of amounts of electricity applied of the storage unit 217 is referenced by the target applied electricity amount acquisition unit 213, and the amount of electricity applied that is stored in correlation with the duration tc1 is acquired as the target amount of electricity applied Qt (Step S67).

Next, the table of charging efficiency coefficients stored in the storage unit 217 is referenced by the supplemental charging time correction unit 216′, and a charging efficiency coefficient Kc is acquired that is correlated with the internal temperature Ti received from the processing unit 9 (Step S68). The charging efficiency coefficient Kc is then multiplied by the target amount of electricity applied Qt, which was acquired by the target applied electricity amount acquisition unit 213, by the supplemental charging time correction unit 216′ to correct the target amount of electricity applied Qt (Step S69).

As a result, the target amount of electricity applied Qt is corrected to be smaller and the supplemental charging time tn is corrected to be shorter as the internal temperature Ti be higher. Here, if, for example, correction of the target amount of electricity applied Qt (supplemental charging time tn) by the supplemental charging time correction unit 216′ were not executed, the charging cutoff voltages Ve1 to Ven would be set to smaller values by the processing of Steps S51 to S58 of the processing unit 9 such that the amount of electricity applied during multistage constant-current charging would be decreased as the internal temperature Ti of a secondary battery be higher, a secondary battery having a high internal temperature Ti would be set to a long supplemental charging time tn in Step S75 by decreasing the amount of electricity applied Qc regardless of the difference (variation) in the amounts of electricity charged that are actually charged the secondary batteries 1a and 1b, and the charging time of the final constant-current charging Cn would be prolonged resulting in an increase in the amount of electricity applied, thereby resulting in the risk of offsetting the effect of reducing variations in the amount of electricity charged demonstrated by the processing unit 9.

However, according to the battery charging system 100″, since the target amount of applied electricity Qt is corrected to be smaller and the supplemental charging time tn is corrected to be shorter by the supplemental charging time correction unit 216′ the higher the internal temperature Ti, the risk of the effect of reducing variations in the amount of electricity applied by the processing unit 9 being offset is diminished.

Next, in Step S71, the charging current I output from the constant current circuit 23 is set to the charging current value Ic2 by the charging control unit 211′, second-stage constant-current charging C2 is begun (at time T12), and the secondary batteries 1a and 1b are charged (Step S71). Next, a judgment is made by the charging control unit 211′ as to whether or not the terminal voltage V of the secondary batteries 1a and 1b is equal to or greater than the second-stage charging cutoff voltage Ve2, and if the voltage V is less than Ve2 (NO in Step S72), the second-stage constant-current charging C2 is continued, while if the voltage V is equal to or greater than Ve2 (YES in Step S72), the second-stage constant-current charging C2 ends.

Subsequently, constant-current charging is repeated while sequentially decreasing charging current values, and when the n−1 round (one round prior to the final round) of constant-current charging (n−1) ends (YES in Step S74), the supplemental charging time tn is calculated using the above-mentioned formula (1) by the supplemental charging time calculation unit 215 based on the amount of electricity applied Qc, the target amount of electricity applied Qt and the charging current value (set current value) Icn accumulated by the applied electricity amount detection unit 214 (Step S75).

Next, the charging current I output from the constant current circuit 23 is set to a charging current value Icn by the charging control unit 211′, nth-stage (final) constant-current charging Cn is started (at time T13), and the secondary batteries 1a and 1b are charged (Step S76).

An elapsed time t after the start of the constant-current charging Cn is measured by the timing unit 212, and a comparison is made between the elapsed time t and the supplemental charging time tn by the charging control unit 211′ (Step S77). When the elapsed time t becomes equal to or greater than the supplemental charging time tn (YES in Step S77), the charging control unit 211′ sets the current output by the constant current circuit 23 to zero, and multistage constant-current charging ends (Step S78).

As has been described above, according to the processing of Steps S76 to S78, since the amount of electricity applied to the secondary batteries 1a and 1b throughout the entire multistage constant-current charging is acquired by the target applied electricity amount acquisition unit 213, and the secondary batteries 1a and 1b are charged in the final constant-current charging Cn such that the amount of electricity applied becomes the target amount of electricity applied Qt for which the effects of temperature (effects of stratification) have been corrected by the supplemental charging time correction unit 216′, the supplemental charging time calculation unit 215 improves the accuracy of fully charging the secondary batteries 1a and 2b.

Moreover, as shown in FIG. 16, the amount of electricity applied (charging current value) in each series circuit is changed in consideration of the ambient temperature to which each series circuit is exposed. Even if the required charging times were the same, since elimination of stratification by generation of oxygen gas proceeds easily if the amount of electricity applied is extremely large, elimination of stratification proceeds more in a series circuit arranged at a location where ambient temperature is low and stratification is serious, thereby making it possible to align the degrees to which stratification is eliminated between the series circuits.

Although the description heretofore has indicated an assembled battery charging method that uses only n-stage constant-current charging, it goes without saying that the effects of the present invention are also obtained by using n-stage constant-current charging as the main charging constituent and combining with another charging method (such as pulse charging or trickle charging).

Furthermore, the battery charging systems 100' and 100" may also employ a configuration in which processing is executed in the same manner as Step 06 instead of Steps S47 and S77 without provided with the timing unit 212, target applied electricity amount acquisition unit 213, applied electricity amount detection unit 214, supplemental charging time calculation unit 215, supplemental charging time correction unit 216 or 216' and storage unit 217 or 217' in the control unit 21' or 21", and without executing Steps S32, S33, S36 to S39, S45, S49, S62, S63, S66 to S69 and S75.

In addition, the control unit 21' and 21" may also be configured to not be provided with the supplemental charging time correction unit 216 or 216' and to not execute Steps S38, S39, S68 and S69.

Namely, a battery charging system in accordance with one aspect of the present invention is provided with: an assembled battery, in which a plurality of secondary batteries are connected in parallel using valve-regulated lead-acid batteries in which separators impregnated with electrolyte are arranged between mutually opposed plate-like positive electrodes and negative electrodes; and a plurality of charging units that are provided corresponding to the respective secondary batteries and that charge the corresponding secondary battery, respectively, wherein each charging unit executes multistage constant-current charging in which constant-current charging is repeated a preset plurality of times for supplying current of a prescribed set current value to each corresponding secondary battery until the terminal voltage of the each corresponding secondary battery reaches a prescribed charging cutoff voltage, and also the set current value is reduced each time the constant-current charging is repeated.

In addition, an assembled battery charging method in accordance with one aspect of the present invention is a method for charging an assembled battery in which a plurality of secondary batteries are connected in parallel using valve-regulated lead-acid batteries in which separators impregnated with electrolyte are arranged between mutually opposed plate-like positive electrodes and negative electrodes, including: a charging step of executing, by a plurality of charging units provided corresponding to the respective secondary batteries, multistage constant-current charging by repeating constant-current charging a preset plurality of times for supplying current of a prescribed set current value to each corresponding secondary battery until the terminal voltage of the each corresponding secondary battery reaches a prescribed charging cutoff voltage, and also by reducing the set current value each time the constant-current charging is repeated.

According to this configuration, when carrying out multistage constant-current charging of an assembled battery in which a plurality of secondary batteries are connected in parallel using valve-regulated lead-acid batteries, constant-current charging, in which current of a prescribed set current value is supplied to each secondary battery until the terminal voltage thereof reaches a prescribed charging cutoff voltage, is repeated a plurality of times while reducing the charging current value each time. This being the case, during the initial constant-current charging when the charging current value is large, since increases in terminal voltage are faster for secondary batteries in which stratification has progressed (in which stratification is serious) than in secondary batteries in which stratification has not progressed (in which stratification is mild), constant-current charging is completed in a short period of time for secondary batteries in which stratification has progressed.

If initial constant-current charging during which the secondary batteries are charged at a large current value is completed in a short period of time, since the amount of electricity that charges secondary batteries in which stratification is serious due to constant-current charging at the start of multistage constant-current charging is lower than that of secondary batteries in which stratification is mild, in secondary batteries in which stratification is serious, the shortage is charged by constant-current charging in which the charging current value at the end of multistage constant-current charging is small. This being the case, since the time period during which secondary batteries in which stratification is serious are charged at a small current value becomes longer than that of secondary batteries in which stratification is mild, the overall charging time by multistage constant-current charging becomes longer than secondary batteries in which stratification is mild. Thus, charging time of secondary batteries in which stratification is serious becomes longer, while charging time of secondary batteries in which stratification is mild becomes shorter.

Here, since stratification is eliminated the longer the charging time, even if there are mutual variations in the degree of stratification among a plurality of secondary batteries connected in parallel, as a result of charging time becoming longer and stratification being eliminated to a greater degree in secondary batteries in which stratification is serious than in those in which stratification is mild, variations in the degree of stratification are reduced. As a result of variations in stratification being reduced between each secondary battery, the degree of stratification in the valve-regulated lead-acid battery having the most serious stratification is reduced, thereby diminishing the risk of decreases in battery capacity attributable to stratification. This being the case, the risk of a decrease in battery capacity of the entire assembled battery is also diminished.

In addition, the secondary batteries are preferably configured by connecting a plurality of valve-regulated lead-acid batteries in series.

In the case of connecting a plurality of valve-regulated lead-acid batteries in series, since the amount of electricity that can be charged and discharged of the entire series circuit ends up being restricted by the valve-regulated lead-acid battery contained in the series circuit in which battery capacity has decreased the most, the decrease in battery capacity caused by variations in stratification becomes prominent. Thus, the effect of reducing variations in stratification as previously described, namely the effect of reducing decreases in battery capacity, is greater than in the case of the secondary batteries being composed of a single valve-regulated lead-acid battery.

In addition, the length in the direction of gravity of the portion of the positive electrode and negative electrode covered by an active material is preferably 100 mm or more.

In the case the length in the direction of gravity of the portion of the positive electrode and negative electrode covered by an active material is 100 mm or more, stratification, and thus variations in stratification between each secondary battery occur more easily than in the case the length is less than 100 mm. Thus, the effect resulting from reducing variations in stratification as described above, and namely the effect of reducing decreases in battery capacity, can be expected to be greater in the case of using a valve-regulated lead-acid battery in which the length is 100 mm or more than in the case of using a valve-regulated lead-acid battery in which the length is less than 100 mm.

In addition, temperature measurement units, which respectively measure the temperature of the secondary batteries, and an applied electricity amount setting unit, which respectively set a total amount of electricity applied that is an amount of electricity supplied by each charging unit to the corresponding secondary battery by executing the constant-current charging a plurality of times based on each temperature measured by each of the temperature measurement units during a preset setting period prior to the start of the multistage constant-current charging, are preferably further provided.

In addition, a temperature measurement step of respectively measuring the temperature of the secondary batteries during a preset setting period prior to the start of the multistage constant-current charging, and an applied electricity amount setting step of respectively setting a total amount of electricity applied that is an amount of electricity supplied by each of the charging units to the corresponding secondary battery by executing the constant-current charging a plurality of times based on each temperature measured in the temperature measurement step, may be further comprised.

Stratification of a valve-regulated lead-acid battery occurs more easily the lower the temperature. Thus, prior to the start of multistage constant-current charging, stratification is thought to be serious in secondary batteries at a low temperature, and is thought to be mild in secondary batteries at a high temperature. Since charging efficiency decreases as stratification becomes more serious, if the secondary battery at a low temperature prior to the start of charging and a secondary battery at a high temperature prior to the start of charging are charged by supplying the same amount of applied electricity, the amount of electricity charged that is actually charged is lower in the secondary battery at a low temperature prior to the start of charging.

Therefore, by respectively setting a plurality of rounds of constant-current charging, namely the total amount of electricity applied that is the amount of electricity supplied to a corresponding secondary battery during multistage constant-current charging, based on the temperature of each secondary battery during a setting period prior to executing multistage constant-current charging, variations in the amount of electricity charged that is actually supplied to each secondary battery can be reduced.

In addition, the applied electricity amount setting unit preferably calculate, for each of the secondary batteries, an integrated value of each temperature measured by each of the temperature measurement units during the setting period, and set each total amount of electricity applied such that the total amount of electricity applied is decreased for the secondary battery having the larger integrated value.

Stratification of a valve-regulated lead-acid battery occurs more easily the longer the battery has been at a low temperature. Therefore, an integrated value during a setting period of the temperature of each secondary battery measured by each temperature measurement unit is respectively calculated corresponding to each secondary battery, and each total amount of electricity applied is set such that the total amount of electricity applied decreases the larger the integrated value of a secondary battery, or in other words, such that the total amount of electricity applied increases the smaller the integrated value of a secondary battery. As a result, since the total amount of electricity applied is increased for a secondary battery that is thought to have spent a longer amount of time at a low temperature and in which stratification has progressed more resulting in a decrease in charging efficiency, variations in the amounts of electricity charged that are actually charged each secondary battery can be reduced.

In addition, the applied electricity amount setting unit may be made to acquire, for each of the secondary batteries, a maximum value of each temperature measured by each of the temperature measurement units during the setting period, and set each total amount of electricity applied such that the total amount of electricity applied is decreased for the secondary battery having the larger maximum value.

According to this configuration, processing can be simplified in comparison with the case of accumulating the temperatures of each secondary battery during the setting period.

In addition, a first storage unit is preferably further provided that stores information indicating the temperature of each secondary battery in correlation with information relating to the total amount of electricity applied, and the applied electricity amount setting unit preferably set each total amount of electricity applied according to the information relating to the total amount of electricity applied that is stored in the first storage unit in correlation with each temperature measured by each of the temperature measurement units.

In addition, a first storage unit may be further provided that stores the integrated values in correlation with information relating to the total amount of electricity applied, and the applied electricity amount setting unit may set each total amount of electricity applied according to the information relating to the total amount of electricity applied that is stored in the first storage unit in correlation with the integrated values such that the total amount of electricity applied is decreased for the secondary battery having the larger integrated value.

In addition, a first storage unit may be further provided that stores the integrated values in correlation with information relating to the total amount of electricity applied, and the applied electricity amount setting unit may set each total amount of electricity applied according to the information relating to the total amount of electricity applied that is stored in the first storage unit in correlation with the maximum values such that the total amount of electricity applied is decreased for the secondary battery having the larger maximum value.

According to these configurations, since each total amount of electricity applied can be set based on each temperature by referencing a first storage unit, processing can be simplified.

In addition, a temperature measurement unit that measures a temperature relating to the plurality of secondary batteries; a temperature information storage unit that stores in advance temperature information indicating a relationship between the temperature to which each secondary battery is exposed and the temperature measured by the temperature measurement unit; and an applied electricity amount setting unit, which respectively set a total amount of applied electricity that is an amount of electricity supplied by each of the charging units to the corresponding secondary battery by executing the constant-current charging a plurality of times based on the temperature information stored in the temperature information storage unit and the temperature measured by the temperature measurement unit, are preferably further provided.

In addition, a temperature measurement step of measuring a temperature relating to the plurality of secondary batteries, a temperature information storage step of storing in advance temperature information indicating a relationship between the temperature to which each secondary battery is exposed and the temperature measured in the temperature measurement step, and an applied electricity amount setting step of respectively setting a total amount of applied electricity that is an amount of electricity supplied by each of the charging units to the corresponding secondary battery by executing the constant-current charging a plurality of times based on temperature information stored in the temperature information storage step and the temperature measured in the temperature measurement step, are preferably further comprised.

The degree of stratification of a secondary battery differs according to temperature conditions. Differences occur in the temperature conditions to which each secondary battery exposed due to the effect of, for example, a positional relationship between a heat-generating body and a secondary battery. Therefore, according to these configurations, temperature conditions of each secondary battery are stored in advance as temperature information indicating a relationship between the actual temperature to which each secondary battery is exposed and a temperature measured in a temperature measurement step by a temperature measurement unit, and the total amount of applied electricity, which is the amount of electricity supplied by each charging unit to a corresponding secondary battery by the plurality of rounds of constant-current charging, is respectively set based on this temperature information and an actually measured temperature. Here, since required charging time becomes longer and the effect of eliminating stratification increases the larger the total amount of applied electricity, stratification occurring due to differences in temperature conditions to which each secondary battery is exposed is easily reduced.

In addition, the temperature information is preferably information that indicates, for each of the secondary batteries, a temperature difference between an actually measured temperature measured by the temperature measurement unit and the internal temperature of each of the secondary batteries, and the applied electricity amount setting unit preferably estimate, for a secondary battery that indicates an internal temperature higher than the actually measured temperature in the temperature information stored in the temperature information storage unit, the internal temperature of the secondary battery by adding a temperature difference indicated in the temperature information to an actually measured temperature measured by the temperature measuring unit, and estimate, for a secondary battery that indicates an internal temperature lower than the actually measured temperature in the temperature information stored in the temperature information storage unit, the internal temperature of the secondary battery by subtracting a temperature difference indicated in the temperature information from the actually measured temperature measured by the temperature measuring unit, and sets each total amount of electricity applied such that the total amount of electricity applied is decreased for the secondary battery having the higher estimated internal temperature.

According to this configuration, the internal temperature of a secondary battery that indicates an internal temperature higher than a measured temperature is estimated by adding a temperature difference indicated in temperature information to an actually measured temperature measured by a temperature measurement unit. In addition, the internal temperature of a secondary battery that indicates an internal temperature lower than a measured temperature is estimated by subtracting a temperature difference indicated in temperature information from an actually measured temperature measured by a temperature measurement unit. Each total amount of electricity applied is then set such that the total amount of applied electricity is decreased, required charging time is shortened and stratification reduction effects are diminished for a secondary battery having a higher estimated internal temperature, namely a secondary battery in which the degree of stratification is considered to be mild, and conversely, such that the total amount of applied electricity is increased, required charging time is prolonged, and stratification reduction effects are enhanced for a secondary battery having a lower estimated internal temperature, namely a secondary battery in which the degree of stratification is considered to have progressed. As a result, variations in the degree of stratification between each secondary battery are reduced.

In addition, the applied electricity amount setting unit preferably set the total amount of electricity applied by decreasing the total amount of electricity applied by lowering the charging cutoff voltage, and increasing the total amount of electricity applied by raising the charging cutoff voltage, during the plurality of rounds of constant-current charging in multistage constant-current charging executed by each charging unit.

According to this configuration, the applied electricity amount setting unit are able to set the total amount of electricity applied by decreasing the total amount of applied electricity by lowering a charging cutoff voltage used in each round of constant-current charging executed by each charging unit, and increasing the total amount of applied electricity by raising the charging cutoff voltage.

In addition, the applied electricity amount setting unit preferably calculate and set the charging cutoff voltage Ve using the following formula (A) when defining a full charging voltage at a reference temperature $T0$ preset for each secondary battery as $Vf$, defining a temperature coefficient that represents the relationship between temperature and a full charging voltage as $k$, defining an actually measured temperature measured by the temperature measurement unit as $Tr$, and defining a temperature difference indicated by the temperature information as $Td$:

$$Ve = Vf - k \times (Tr + Td - T0) \quad\quad\quad (A).$$

According to this configuration, since the total amount of electricity applied can be decreased and required charging time can be shortened the larger the value of the temperature difference $Td$, which reflects the temperature conditions to which each secondary battery is exposed, as a result of the applied electricity amount setting unit calculating and setting the charging cutoff voltage Ve using formula (A), variations in the degree of stratification between each secondary battery can be reduced.

In addition, the applied electricity amount setting unit preferably set the total amount of electricity applied by reducing the total amount of electricity applied by lowering the charging cutoff voltage, and increasing the total amount of electricity applied by raising the charging cutoff voltage, during the plurality of rounds of constant-current charging in multistage constant-current charging executed by each of the charging units.

According to this configuration, since the total amount of electricity applied can be changed simply by changing the setting of the charging cutoff voltage, the total amount of electricity applied can be changed by simple processing.

In addition, the setting period is preferably a period from the execution of the previous round of multistage constant-current charging until the multistage constant-current charging is newly started by each of the charging units.

When the multistage constant-current charging described above is executed, variations in the degree of stratification between each secondary battery are reduced as previously described. Thus, even if the total amount of electricity applied was set based on a temperature prior to executing the previous round of multistage constant-current charging, the total amount of electricity applied is set while including consideration of the effect of stratification that has already been eliminated, and the actual state of stratification of each secondary battery is not accurately reflected in the total amount of electricity applied. However, if the period from the execution of the previous round of multistage constant-current charging until the multistage constant-current charging is newly started is used as a setting period, since the effects of stratification that is thought to have been eliminated by the previous round of multistage constant-current charging are excluded from the total amount of electricity applied, the accuracy at which the degree of stratification is reflected in the total amount of electricity applied can be improved.

In addition, each of the charging units preferably continues the finally executed constant-current charging among the constant-current charging repeated during the multistage constant-current charging, for a prescribed supplemental charging time regardless of the terminal voltage of the secondary battery.

In addition, a supplemental charging step may further be comprised in which the finally executed constant-current charging among constant-current charging repeated during multistage constant-current charging in the charging step is continued, for a prescribed supplemental charging time regardless of the terminal voltage of the secondary battery.

Since a set current value, namely a charging current value, is decreased each time constant-current charging is repeated during multistage constant-current charging, the current value in the final constant-current charging becomes an extremely small value, and the change in terminal voltage accompanying charging becomes extremely small. Consequently, there is increased susceptibility to the effects of noise in the vicinity of the charging cutoff voltage, thereby increasing the likelihood of the occurrence of an erroneous determination of charging ending conditions. Therefore, by ending the finally executed constant-current charging after having continued the final constant-current charging for prescribed supplemental charging time regardless of the terminal voltage of the secondary battery, it no longer necessary to make a comparison of charging cutoff voltage and terminal voltage that requires a precise determination, thereby diminishing the risk of an erroneous determination of charging ending conditions.

In addition, each of the charging units preferably continues the finally executed constant-current charging among constant-current charging repeated during the multistage constant-current charging, for a prescribed supplemental charging time regardless of the terminal voltage of the secondary battery, and the battery charging system further comprising a supplemental charging time correction unit that corrects each of the supplemental charging time used in each charging unit such that the supplemental charging time becomes shorter as an integral value calculated by the applied electricity amount setting unit for the secondary battery corresponding to each of the charging units increases.

According to this configuration, each supplemental charging time is corrected such that each supplemental charging time becomes shorter as the integral value increases, or in other words, becomes longer as the integral value decreases. As a result, since the supplemental charging time of the final constant-current charging becomes longer and the amount of electricity that is charged a secondary battery increases the greater stratification has progressed and the more charging efficiency has decreased, variations in the amounts of electricity charged that are actually charged each secondary battery are reduced.

In addition, each of the charging units continues the finally executed constant-current charging among constant-current charging repeated during the multistage constant-current charging, for a prescribed supplemental charging time regardless of the terminal voltage of the secondary battery, and the battery charging system further comprising a supplemental charging time correction unit that corrects each of the supplemental charging time used in each charging unit such that the supplemental charging time becomes shorter as a maximum value acquired by the applied electricity amount setting unit for the secondary battery corresponding to each of the charging units increases.

According to this configuration, each supplemental charging time is corrected such that each supplemental charging time becomes shorter as the maximum value increases, or in other words, becomes longer as the maximum value decreases. As a result, since the supplemental charging time of the final constant-current charging becomes longer and the amount of electricity that is charged a secondary battery increases the greater stratification has progressed and the more charging efficiency has decreased, variations in the amounts of electricity charged that are actually charged each secondary battery are reduced.

In addition, each of the charging units continues the finally executed constant-current charging among constant-current charging repeated during the multistage constant-current charging, for a prescribed supplemental charging time regardless of the terminal voltage of the secondary battery, and the battery charging system further comprising a supplemental charging time correction unit that corrects each of the supplemental charging time used in each of the charging units such that the supplemental charging time becomes shorter as an internal temperature estimated by the applied electricity amount setting unit rises.

According to this configuration, each supplemental charging time is corrected such that each supplemental charging time becomes shorter the higher the estimated value of internal temperature of each secondary battery, and becomes longer the lower the estimated value of internal temperature. As a result, since the charging time of the final constant-current charging becomes longer and the amount of electricity that is charged a secondary battery increases as the internal temperature be lower, namely the greater stratification has progressed and the more charging efficiency has decreased, variations in the amounts of electricity charged that are actually charged each secondary battery are reduced.

In addition, a timing unit that measures, for each of the secondary batteries, the duration of the initially executed constant-current charging among the constant-current charging repeated during the multistage constant-current charging, a second storage unit that stores the duration of the initially executed constant-current charging for each secondary battery in correlation with the amount of electricity applied that is required to fully charge a secondary battery to be charged, a target applied electricity amount acquisition unit that acquires an amount of applied electricity stored in the second storage unit in correlation with the duration of the initially executed constant-current charging for each of the secondary batteries that is measured by the timing unit, as a target amount of electricity applied that is a target value of the amount of electricity applied that is to be supplied to each of the secondary batteries during the multistage constant-current charging, an applied electricity amount detection unit that respectively detects the amount of electricity applied that is supplied to each secondary battery by each of the charging units from the start of the multistage constant-current charging to prior to the start of the finally executed constant-current charging, and a supplemental charging time calculation unit that calculates the supplemental charging time by dividing the difference between the target amount of electricity applied acquired by the target applied electricity amount acquisition unit and the amount of electricity applied that is detected by the applied electricity amount detection unit, by a set current value in the finally executed constant-current charging, are preferably further provided.

A correlation exists between the amount of electricity charged for the secondary battery and the duration of the initially executed constant-current charging. Therefore, the duration of the initially executed constant-current charging and the amount of electricity applied required to fully charge the secondary batteries are stored in mutual correlation in the second storage unit. The amount of electricity applied that is stored in the second storage unit in correlation with the duration of the initially executed constant-current charging for each secondary battery is obtained as a target amount of electricity applied that is a target value of the amount of electricity applied that is to be supplied to each secondary battery in multistage constant-current charging. Moreover, supplemental charging times are calculated by the supplemental charging time calculation unit by dividing the difference between the target amount of electricity applied acquired by the target applied electricity amount acquisition unit and the amount of electricity applied detected by the applied electricity amount detection unit by a set current value in the finally executed constant-current charging.

This being the case, the duration of the finally executed constant-current charging is set such that the amount of electricity applied that is supplied to the secondary batteries throughout the entire multistage constant-current charging is equal to a target amount of electricity applied. Since the target amount of electricity applied is obtained as the amount of electricity applied required to fully charge the secondary batteries, the secondary batteries can be accurately fully charged.

INDUSTRIAL APPLICABILITY

The lead-acid battery control method and power supply system according to the present invention are suitable for use in cold climates by comprising an assembled battery composed valve-regulated lead-acid batteries for the purpose of providing a motive power source of transport vehicles, and have a considerable effect on industrial development.

The invention claimed is:
1. A battery charging system, comprising:
an assembled battery, in which a plurality of secondary batteries are connected in parallel using valve-regulated lead-acid batteries in which separators impregnated with electrolyte are arranged between mutually opposed plate-like positive electrodes and negative electrodes; and
a plurality of charging units that are provided corresponding to the respective secondary batteries and that charge the corresponding secondary battery, respectively, wherein
each of the charging units:
executes multistage constant-current charging in which constant-current charging is repeated a preset plurality of times for supplying current of a prescribed set current value to each corresponding secondary battery until the terminal voltage of the each corresponding secondary battery reaches a prescribed charging cutoff voltage, and also the set current value is reduced each time the constant-current charging is repeated.
2. The battery charging system according to claim 1, wherein the secondary batteries are configured by connecting a plurality of valve-regulated lead-acid batteries in series.

3. The battery charging system according to claim 1, wherein the length in the direction of gravity of portions covered with an active material in the positive electrodes and the negative electrodes is 100 mm or more.
4. The battery charging system according to claim 1, further comprising:
a plurality of temperature measurement units, which respectively measure the temperature of the secondary batteries; and
an applied electricity amount setting unit, which respectively set a total amount of electricity applied that is an amount of electricity supplied by each of the charging units to the corresponding secondary battery by executing the constant-current charging a plurality of times based on each temperature measured by each of the temperature measurement units during a preset setting period prior to the start of the multistage constant-current charging.
5. The battery charging system according to claim 4, wherein the applied electricity amount setting unit calculate, for each of the secondary batteries, an integrated value of each temperature measured by each of the temperature measurement units during the setting period, and set each total amount of electricity applied such that the total amount of electricity applied is decreased for the secondary battery having the larger integrated value.
6. The battery charging system according to claim 4, wherein the applied electricity amount setting unit acquire, for each of the secondary batteries, a maximum value of each temperature measured by each of the temperature measurement units during the setting period, and set each total amount of electricity applied such that the total amount of electricity applied is decreased for the secondary battery having the larger maximum value.
7. The battery charging system according to claim 4, further comprising a first storage unit that stores information indicating each temperature of each of the secondary batteries in correlation with information relating to the total amount of electricity applied, wherein
the applied electricity amount setting unit set each total amount of electricity applied according to the information relating to the total amount of electricity applied that is stored in the first storage unit in correlation with each temperature measured by each of the temperature measurement units.
8. The battery charging system according to claim 5, further comprising a first storage unit that stores the integrated values in correlation with information relating to the total amount of electricity applied, wherein
the applied electricity amount setting unit set each total amount of electricity applied according to the information relating to the total amount of electricity applied that is stored in the first storage unit in correlation with the integrated values such that the total amount of electricity applied is decreased for the secondary battery having the larger integrated value.
9. The battery charging system according to claim 6, further comprising a first storage unit that stores the maximum values in correlation with information relating to the total amount of electricity applied, wherein
the applied electricity amount setting unit set each total amount of electricity applied according to the information relating to the total amount of electricity applied that is stored in the first storage unit in correlation with the maximum values such that the total amount of electricity applied is decreased for the secondary battery having the larger maximum value.

10. The battery charging system according to claim 1, further comprising:
- a temperature measurement unit that measures a temperature relating to the plurality of secondary batteries;
- a temperature information storage unit that stores in advance temperature information indicating a relationship between the temperature to which each of the secondary batteries is exposed and the temperature measured by the temperature measurement unit; and
- an applied electricity amount setting unit, which respectively set a total amount of applied electricity that is an amount of electricity supplied by each of the charging units to the corresponding secondary battery by executing the constant-current charging a plurality of times based on the temperature information stored in the temperature information storage unit and the temperature measured by the temperature measurement unit.

11. The battery charging system according to claim 10, wherein the temperature information is information that indicates, for each of the secondary batteries, a temperature difference between an actually measured temperature measured by the temperature measurement unit and the internal temperature of each of the secondary batteries, and
- the applied electricity amount setting unit estimate, for a secondary battery that indicates an internal temperature higher than the actually measured temperature in the temperature information stored in the temperature information storage unit, the internal temperature of the secondary battery by adding a temperature difference indicated in the temperature information to an actually measured temperature measured by the temperature measuring unit, and estimate, for a secondary battery that indicates an internal temperature lower than the actually measured temperature in the temperature information stored in the temperature information storage unit, the internal temperature of the secondary battery by subtracting a temperature difference indicated in the temperature information from the actually measured temperature measured by the temperature measuring unit, and sets each total amount of electricity applied such that the total amount of electricity applied is decreased for the secondary battery having the higher estimated internal temperature.

12. The battery charging system according to claim 11, wherein the applied electricity amount setting unit set the total amount of electricity applied by decreasing the total amount of electricity applied by lowering the charging cutoff voltage, and increasing the total amount of electricity applied by raising the charging cutoff voltage, during the plurality of rounds of constant-current charging in multistage constant-current charging executed by each of the charging units.

13. The battery charging system according to claim 12, wherein the applied electricity amount setting unit calculate and set the charging cutoff voltage Ve using the following formula (A) when defining a full charging voltage at a reference temperature T0 preset for each of the secondary batteries as Vf, defining a temperature coefficient that represents the relationship between temperature and a full charging voltage as k, defining an actually measured temperature measured by the temperature measurement unit as Tr, and defining a temperature difference indicated by the temperature information as Td:

$$Ve = Vf - k \times (Tr + Td - T0) \quad \text{(A)}.$$

14. The battery charging system according to claim 5, wherein the applied electricity amount setting unit set the total amount of electricity applied by decreasing the total amount of electricity applied by lowering the charging cutoff voltage, and increasing the total amount of electricity applied by raising the charging cutoff voltage, during the plurality of rounds of constant-current charging in multistage constant-current charging executed by each of the charging units.

15. The battery charging system according to claim 4, wherein the setting period is a period from the end of the execution of the previous round of multistage constant-current charging until the multistage constant-current charging is newly started by each of the charging units.

16. The battery charging system according to claim 1, wherein each of the charging units continues the finally executed constant-current charging among the constant-current charging repeated during the multistage constant-current charging, for a prescribed supplemental charging time regardless of the terminal voltage of the secondary battery.

17. The battery charging system according to claim 5, wherein each of the charging units continues the finally executed constant-current charging among constant-current charging repeated during the multistage constant-current charging, for a prescribed supplemental charging time regardless of the terminal voltage of the secondary battery, and
- the battery charging system further comprising a supplemental charging time correction unit that corrects each of the supplemental charging time used in each of the charging units such that the supplemental charging time becomes shorter as the integrated value calculated by the applied electricity amount setting unit for the secondary battery corresponding to each of the charging units increases.

18. The battery charging system according to claim 6, wherein each of the charging units continues the finally executed constant-current charging among constant-current charging repeated during the multistage constant-current charging, for a prescribed supplemental charging time regardless of the terminal voltage of the secondary battery, and
- the battery charging system further comprising a supplemental charging time correction unit that corrects each of the supplemental charging time used in each of the charging units such that the supplemental charging time becomes shorter as a maximum value acquired by the applied electricity amount setting unit for the secondary battery corresponding to each of the charging units increases.

19. The battery charging system according to claim 11, wherein each of the charging units continues the finally executed constant-current charging among constant-current charging repeated during the multistage constant-current charging for a prescribed supplemental charging time regardless of the terminal voltage of the secondary battery, and
- the battery charging system further comprising a supplemental charging time correction unit that corrects each of the supplemental charging time used in each of the charging units such that the supplemental charging time becomes shorter as an internal temperature estimated by the applied electricity amount setting unit rises.

20. The battery charging system according to claim 16, further comprising a timing unit that measures, for each of the secondary batteries, the duration of the initially executed constant-current charging among the constant-current charging repeated during the multistage constant-current charging,
- a second storage unit that stores the duration of the initially executed constant-current charging for each of the secondary batteries in correlation with the amount of electricity applied that is required to fully charge a secondary battery to be charged,
a target applied electricity amount acquisition unit that acquires an amount of applied electricity stored in the second storage unit in correlation with the duration of the initially executed constant-current charging for each of the secondary batteries that is measured by the timing unit, as a target amount of electricity applied that is a target value of the amount of electricity applied that is to be supplied to each of the secondary batteries during the multistage constant-current charging,
an applied electricity amount detection unit that respectively detects the amount of electricity applied that is supplied to each of the secondary batteries by each of the charging units from the start of the multistage constant-current charging to prior to the start of the finally executed constant-current charging, and
a supplemental charging time calculation unit that calculates the supplemental charging time by dividing the difference between the target amount of electricity applied acquired by the target applied electricity amount acquisition unit and the amount of electricity applied that is detected by the applied electricity amount detection unit, by a set current value in the finally executed constant-current charging.

21. An assembled battery charging method for an assembled battery in which a plurality of secondary batteries are connected in parallel using valve-regulated lead-acid batteries in which separators impregnated with electrolyte are arranged between mutually opposed plate-like positive electrodes and negative electrodes, comprising:
a charging step of executing, by a plurality of charging units provided corresponding to the respective secondary batteries, multistage constant-current charging by repeating constant-current charging a preset plurality of times for supplying current of a prescribed set current value to each corresponding secondary battery until the terminal voltage of the each corresponding secondary battery reaches a prescribed charging cutoff voltage, and also by reducing the set current value each time the constant-current charging is repeated.

22. The assembled battery charging method according to claim 21, further comprising:
a temperature measurement step of respectively measuring the temperature of the secondary batteries during a preset setting period prior to the start of the multistage constant-current charging; and
an applied electricity amount setting step of respectively setting a total amount of electricity applied that is an amount of electricity supplied by each of the charging units to the corresponding secondary battery by executing the constant-current charging a plurality of times based on each temperature measured in the temperature measurement step.

23. The assembled battery charging method according to claim 21, further comprising:
a temperature measurement step of measuring a temperature relating to the plurality of secondary batteries;
a temperature information storage step of storing in advance temperature information indicating a relationship between the temperature to which each of the secondary batteries is exposed and the temperature measured in the temperature measurement step; and
an applied electricity amount setting step of respectively setting a total amount of applied electricity that is an amount of electricity supplied by each of the charging units to the corresponding secondary battery by executing the constant-current charging a plurality of times based on temperature information stored in the temperature information storage step and the temperature measured in the temperature measurement step.

24. The assembled battery charging method according to claim 21, further comprising: a supplemental charging step of continuing finally executed constant-current charging among constant-current charging repeated during multistage constant-current charging in the charging step, for a prescribed supplemental charging time regardless of the terminal voltage of the secondary battery.

* * * * *